US012152846B2

(12) United States Patent
Arbouw et al.

(10) Patent No.: US 12,152,846 B2
(45) Date of Patent: Nov. 26, 2024

(54) SYSTEMS AND METHODS FOR WEAPON EVENT DETECTION

(71) Applicant: Special Tactical Services, LLC, Chesapeake, VA (US)

(72) Inventors: Paul Arbouw, Carmel, IN (US); Dale Mcclellan, Chesapeake, VA (US)

(73) Assignee: Special Tactical Services, LLC, Chesapeake, VA (US)

( * ) Notice: Subject to any disclaimer, the term of this patent is extended or adjusted under 35 U.S.C. 154(b) by 84 days.

(21) Appl. No.: 17/733,595

(22) Filed: Apr. 29, 2022

(65) Prior Publication Data

US 2023/0046334 A1 Feb. 16, 2023

Related U.S. Application Data

(63) Continuation-in-part of application No. 16/704,767, filed on Dec. 5, 2019, now Pat. No. 11,454,470.

(60) Provisional application No. 62/795,017, filed on Jan. 21, 2019.

(51) Int. Cl.

| | |
|---|---|
| ***F41A 17/06*** | (2006.01) |
| ***F41A 17/08*** | (2006.01) |
| ***F41A 19/01*** | (2006.01) |
| ***F41C 27/00*** | (2006.01) |
| ***F41G 3/06*** | (2006.01) |
| ***F41G 11/00*** | (2006.01) |
| ***G08B 21/02*** | (2006.01) |

(52) U.S. Cl.
CPC ............ *F41A 17/063* (2013.01); *F41A 17/08* (2013.01); *F41A 19/01* (2013.01); *F41C 27/00* (2013.01); *F41G 3/06* (2013.01); *F41G 11/003* (2013.01); *G08B 21/02* (2013.01)

(58) Field of Classification Search
CPC ........ F41A 17/00; F41A 17/063; F41A 17/08; F41A 19/01; F41C 27/00; F41G 3/06
See application file for complete search history.

(56) References Cited

U.S. PATENT DOCUMENTS

| | | | |
|---|---|---|---|
| 6,363,223 | B1 | 3/2002 | Gordon |
| 7,961,550 | B2 | 6/2011 | Calhoun |
| 8,339,257 | B2 | 12/2012 | Cazanas et al. |
| 8,706,440 | B2 | 4/2014 | McNelis et al. |
| 9,222,754 | B2 | 12/2015 | Lupher et al. |
| 9,395,156 | B2 | 7/2016 | Newzella et al. |

(Continued)

FOREIGN PATENT DOCUMENTS

AU 2009296712 A1 * 4/2010 ............ F41A 17/063

*Primary Examiner* — Benjamin P Lee
(74) *Attorney, Agent, or Firm* — Sughrue Mion, PLLC

(57) ABSTRACT

Systems, devices, and methods are provided, wherein a device is attachable to or integrated in a firearm and includes a plurality of sensors that are each configured to sense a respective attribute of the firearm or of an environment surrounding the firearm, and are further configured to provide corresponding signals based on sensing the respective attribute. The systems, devices, and methods may be configured to determine an event from among a plurality of events based on the corresponding signals provided by the plurality of sensors. Systems that include the device may record event data and transmit the event data to various user systems for situational awareness, record keeping, training, and other organizational or legal-process purposes.

9 Claims, 27 Drawing Sheets

(56) References Cited

U.S. PATENT DOCUMENTS

| | | | |
|---|---|---|---|
| 9,830,932 | B1 | 11/2017 | Gunderson et al. |
| 9,846,007 | B2 | 12/2017 | Young et al. |
| 10,089,845 | B2 | 10/2018 | Skorpik et al. |
| 10,180,309 | B1 | 1/2019 | Burke |
| 10,290,195 | B2 | 5/2019 | Skorpik et al. |
| 10,657,800 | B1 | 5/2020 | Fowler et al. |
| 10,586,109 | B1 | 6/2020 | Fowler et al. |
| 10,819,959 | B2 | 10/2020 | Palazzolo |
| 10,830,866 | B1 | 11/2020 | Onofrio et al. |
| 10,996,012 | B2 | 5/2021 | Deng et al. |
| 2010/0324859 | A1 | 12/2010 | McNelis et al. |
| 2011/0025491 | A1 | 2/2011 | Cazanas et al. |
| 2012/0300587 | A1 | 11/2012 | Azimi-Sadjadi et al. |
| 2014/0360081 | A1 | 12/2014 | Lupher et al. |
| 2015/0153137 | A1 | 6/2015 | Newzella et al. |
| 2016/0232774 | A1 | 8/2016 | Noland et al. |
| 2017/0059265 | A1 | 3/2017 | Winter et al. |
| 2017/0248388 | A1 | 8/2017 | Young et al. |
| 2019/0222771 | A1 | 7/2019 | Hedeen et al. |
| 2019/0281259 | A1 | 9/2019 | Palazzolo |
| 2020/0003512 | A1 | 1/2020 | Deng et al. |
| 2020/0011629 | A1 | 1/2020 | Deng et al. |
| 2020/0355454 | A1 | 11/2020 | Deng et al. |
| 2021/0110843 | A1 | 4/2021 | Davis et al. |

* cited by examiner

922

SYSTEMS AND METHODS FOR WEAPON EVENT DETECTION

CROSS-REFERENCE TO RELATED APPLICATIONS

This application is a continuation-in-part of U.S. patent application Ser. No. 16/704,767, filed on Dec. 5, 2019, which claims priority from U.S. Provisional Patent Application No. 62/795,017, filed Jan. 21, 2019, the disclosures of which are incorporated by reference herein in their entirety.

FIELD

This disclosure relates to method, systems, and devices for determination of firearm events, such as un-holstering, manipulation, and/or discharge. In methods, systems, and devices of the disclosure, collected data and interpretations/determinations may be stored and/or transmitted in real time for safety and information sharing purposes.

BACKGROUND OF RELATED ART

A concern, which many law enforcement, armed forces, or security personnel may encounter during a firearm confrontation, is the inability to timely communicate the escalating threat without compromising weapon handling. Orally engaging a threat limits the ability to audibly provide communication back to a centralized dispatch via radio or other communication means.

Proper firearm handling involves both hands of the operator, which further limits the ability for the operator to establish communications via a radio or other communication device that requires manual manipulation, operation or engagement.

The disclosures of U.S. Pat. No. 10,180,487, published Jan. 15, 2019, U.S. Pat. No. 9,022,785, published May 5, 2015, U.S. Pat. No. 8,936,193, published Jan. 20, 2015, U.S. Pat. No. 8,850,730, published Oct. 7, 2014, U.S. Pat. No. 8,117,778, published Feb. 21, 2012, U.S. Pat. No. 8,826,575, published Sep. 9, 2014, U.S. Pat. No. 8,353,121, published Jan. 15, 2013, U.S. Pat. No. 8,616,882, published Dec. 31, 2013, U.S. Pat. No. 8,464,452, published Jun. 18, 2013, U.S. Pat. No. 6,965,312, published Nov. 15, 2005, U.S. Pat. No. 9,159,111, published Oct. 13, 2015, U.S. Pat. No. 8,818,829, published Aug. 26, 2014, U.S. Pat. No. 8,733,006, published May 27, 2014, U.S. Pat. No. 8,571,815, published Oct. 29, 2013, U.S. Pat. No. 9,212,867, published Dec. 15, 2015, U.S. Pat. No. 9,057,585, published Jun. 16, 2015, U.S. Pat. No. 9,913,121, published Mar. 6, 2018, U.S. Pat. No. 9,135,808, published Sep. 15, 2015, U.S. Pat. No. 9,879,944, published Jan. 30, 2018, U.S. Pat. No. 9,602,993, published Mar. 21, 2017, U.S. Pat. No. 8,706,440, published Apr. 22, 2014, U.S. Pat. No. 9,273,918, published Mar. 1, 2016, U.S. Pat. No. 10,041,764, published Aug. 7, 2018, U.S. Pat. No. 8,215,044, published Jul. 10, 2012, U.S. Pat. No. 8,459,552, published Jun. 11, 2013, U.S. Pat. No. 7,961,550, published Jun. 14, 2011, U.S. Patent Application Publication No. 2016/0232774, published Aug. 11, 2016, and U.S. Patent Application Publication No. 2017/0248388, published Aug. 31, 2017 are incorporated by reference in their entirety.

SUMMARY

Some embodiments of the present disclosure address the above problems, and other problems with related art.

Some embodiments of the present disclosure relate to methods, systems, and computer program products that allow for the real-time determination of a firearm being unholstered, manipulated and/or discharged.

In some embodiments, collected data and event determinations may be stored on a device and/or transmitted in real time for safety and engagement awareness. Embodiments may include various means to communicate weapon manipulation, usage and discharge, in real time, or near real time, back to a centralized dispatch point.

In some embodiments, data captured is analyzed and interpreted in order to provide dispatch and additional responding personnel with increased levels of situational awareness of local conditions, including for example, direction of the threat engagement, elevation differences between the target and the host weapon, altitude of the host weapon (identified in height and/or interpreted as estimated building floors).

In some embodiments, data logging for reconstruction of incidents involving the weapon being discharged, institutional logistics involving the number of discharges of the weapon and associated maintenance of the weapon, advanced battle space awareness and any and all other functions not yet determined but associated either directly or indirectly with the operating of a weapon system equipped with the system may be provided.

In some embodiments, secondary operational functionality may be found in the form of flashlight, laser designator, IR illuminator, range finding, video and/or audio capture, or less lethal capabilities and any other unmentioned functionality applicable or desirable to be weapon mounted.

In some embodiments, a system may include an Environmental Sensor Unit (ESU), a holster capable of retaining a firearm equipped with an ESU, and a mobile data transmission device. Depending on the configuration of the system, not all components may be required or functionality may be integrated into a single configuration.

In some embodiments, the system is designed to predominantly function within an environment with an ambient operating temperature between −40° C. and +85° C.; more extreme conditions may be possible to be serviced with specific configurations of the system of the present disclosure. In some embodiments, the system is designed to be moisture resistant and possibly submersible under certain configurations of the system of the present disclosure.

In some embodiments, the system may include a holster with a portion of a magnet switch and an Environment Sensor Unit (ESU).

A combination of sensors, contained within the ESU may utilize a combination of detectable inputs in order to determine and interpret events such as firing of the weapon system, or any other discernible manipulation or operation of the weapon system, or conditions, variables or interpretations of the environment in which the weapon is present.

In some embodiments, the ESU may include a small size printed circuit board(s) (PCB) with, amongst its various electronics components and sensors, a power source. Certain versions may include a low power consumption display, or connect via a wired or wireless connection to a remotely mounted display. The electronics of the ESU may be located inside a housing (e.g., polymer or other suitable material), providing protection from environmental elements and providing a mechanism of attachment to a standard MIL-STD-1913 Picatinny rail or other attachment mechanism as specific to the intended host weapon system.

In some embodiments, the system may operate at low voltage, conserving energy for a long operational time duration. Backup power may be integrated to the PCB to allow for continued uptime in case of main power supply interruptions caused by recoil or other acceleration spike causing events.

In some embodiments, appropriate signal protection or encryption may secure communication between the ESU, the data transmission device, and the final data storage location. Signal encryption may cover any communication with secondary sensory inputs that are housed outside of, but in close proximity to, the ESU.

In contrast to comparative embodiments, some embodiments of the present disclosure provide a more practical application for monitoring shots fired, weapon location, and/or weapon maintenance recommendations, and for real time data transmission. Also, some embodiments of the present disclosure may be implemented without modification to a host weapon and may be handgun/rifle agnostic.

In some embodiments, the behavior/state of welfare of a weapon operator may be inferred.

In comparative embodiments, systems rely solely on interaction with a holster to determine weapon usage or system engagement, which is not always a practical option and also limits the conditions under which the systems can be relied upon. In contrast, some embodiments of the present disclosure allows for a holster to be a part of a system without explicitly relying upon the presence and usage of the holster.

In some embodiments, dashboard functionality for organizational consumption of historical weapon data or real time display of data on an incorporated (or associated) screen is provided. Such embodiments improve upon comparative embodiments that focus on data presentation at a remote location only. For example, such embodiments allow the combination of remote monitoring as well as representing data from multiple ESUs on a mobile device that is in possession of a weapon operator. Accordingly, such embodiments may avoid problems of comparative embodiments in which an officer has to rely on dispatch to communicate backup status, or situational oversight before providing backup to another officer.

In comparative embodiments, networked integration of functionality to operate with alignment within defined boundaries of an environment has historically been limited to hardwired and/or very limited functionality based upon very narrow and fixed conditions. In contrast, some embodiments of the present disclosure utilize real time awareness of a state of a secondary function, device, or sensor, allow an ESU to be much more flexible in how various functions interact (e.g. managing light output when a laser or cameras is used).

In some embodiments, speech commands may be implemented which allow for ESU control without having to physically interact with the device. In some embodiments, headsets or bone-conductive technology may be implemented to avoid sound interference of the environment.

In comparative embodiments, details are generally scarce on what data parameters are used to determine a discharge event and no contingency is in place when not all data is present or within indicated boundaries. The use of rotational force and temperature parameters may differ from a force/sound model, but such use may specifically rely on the presence of both sensory inputs and prevents a host weapon from being fitted with a blast shield or suppressor or similar device at muzzle. Embodiments of the present disclosure may solve such problems.

According to comparative embodiments, video for liability reasons may be addressed via a vehicle based camera or body worn camera. Also, while some weapon mounted cameras with light and/or laser options have entered the market, these options are limited to recording only and require manual data offloading for after-action processing. Some embodiments of the present disclosure improve on the comparative embodiments by enabling the capturing of video data for target distance determination, 3D environment recreation, and real time dispatch notification via either video or still images.

In an embodiment, an Environment Sensor Unit (ESU) system mounted on a projectile weapon is provided. The ESU may include a variety of environmental sensors that collects data for analysis as it pertains to the environment around the host-weapon and the manipulation of and behavior of the host weapon system; storage capability (e.g., memory) that stores the data with a date-time stamp and any additional data as configured in the system; a variety of sensors that may automatically turn on the system and obtain a reading and provide additional data that may be used for statistical and operational analysis; a wired or wireless data transmission means that communicates the data in real time to an operations center; and a wired or wireless means to configure the system settings and system related data. In an embodiment, the data may be transmitted once a connection is available (e.g. a wireless or hardwired connection), and the data transmitted may be or include all or some of data that has not been previously transmitted.

According to certain embodiments, a device is provided that is attachable to a firearm. The device has a pressure sensor configured to sense pressure change generated from the firearm and/or a sound sensor configured to sense sound generated from the firearm, and provide a corresponding signal; a weapon movement sensor configured to sense at least one movement of the firearm and provide a corresponding signal; at least one processor; and memory having computer instructions, the computer instructions configured to, when executed by the at least one processor, cause the at least one processor to determine an event of the firearm based on the corresponding signal provided by the pressure sensor (or the sound sensor) and the corresponding signal provided by the weapon movement sensor.

In an embodiment, the computer instructions may be configured to cause the at least one processor to determine the event of the firearm based on an evaluation of a pressure or change in pressure (or sound or change in sound), as sensed by the pressure sensor (or sound sensor), with a predetermined pressure or change in pressure (or predetermined sound or change in sound), and based on an evaluation of a velocity or acceleration, as sensed by the weapon movement sensor, with a predetermined velocity or acceleration. In the embodiments of the present disclosure, the evaluations may respectively involve a comparison of the pressure or change in pressure (or sound or change in sound), as sensed by the pressure sensor (or sound sensor), with the predetermined pressure or change in pressure (or predetermined sound or change in sound), and a comparison of the velocity or acceleration, as sensed by the weapon movement sensor, with the predetermined velocity or acceleration. The computer instructions may be configured to cause the at least one processor to determine the event as being a weapon discharge based on the pressure or change in pressure (or sound or change in sound), as sensed by the pressure sensor (or sound sensor), being greater than the predetermined pressure or change in pressure (or sound or change in sound), and based on the velocity or acceleration, as sensed by the weapon movement sensor, being greater than the predetermined velocity or acceleration. The computer instructions may be configured to cause the at least one processor to determine the event of the firearm based on the evaluation of the pressure or change in pressure (or sound or change in sound), as sensed by the pressure sensor (or sound sensor), with the predetermined pressure or change in pressure (or predetermined sound or change in sound), the evaluation of the velocity or acceleration, as sensed by the weapon movement sensor, with the predetermined velocity or acceleration, and a rise time of the pressure or change in pressure (or sound or change in sound) or a rise time of the velocity or acceleration.

The computer instructions may be configured to cause the at least one processor to: obtain a data boundary that is a standard deviation multiple above and below an average of pressure of pressure data; and determine the event of the firearm based on an evaluation of a pressure or change in pressure (or sound or change in sound), as sensed by the pressure sensor (or sound sensor), with the data boundary. The at least one processor may be configured to obtain at least a portion of the pressure data from the pressure sensor (or sound sensor), and obtain the data boundary from the pressure data. The computer instructions are configured to cause the at least one processor to determine the event of the firearm based on the evaluation of the pressure or change in pressure (or sound or change in sound), as sensed by the pressure sensor (or sound sensor), with the data boundary, and a rise time of the pressure or change in pressure (or sound or change in sound) before a boundary of the data boundary.

The computer instructions may be configured to cause the at least one processor to: obtain a data boundary that is a standard deviation multiple above and below an average of velocity or acceleration of weapon movement data; determine the event of the firearm based on an evaluation of a velocity or acceleration, as sensed by the weapon movement sensor, with the data boundary. The at least one processor may be configured to obtain at least a portion of the weapon movement data from the weapon movement sensor, and obtain the data boundary from the weapon movement data. The computer instructions may be configured to cause the at least one processor to determine the event of the firearm based on the evaluation of the velocity or acceleration, as sensed by the weapon movement sensor, with the data boundary, and a rise time of the velocity or acceleration before a boundary of the data boundary.

The device may also have a housing that includes the pressure sensor (or sound sensor), the weapon movement sensor, the at least one processor, and the memory, wherein the housing is configured to mount to an accessory rail of the firearm. The housing may further include a flashlight or a laser, and the computer instructions may be configured to cause the at least one processor to operate the flashlight or the laser based on an input from the weapon movement sensor. The weapon movement sensor may be a multi-axis MEMS. The computer instructions may be configured to cause the at least one processor to send a notification to an external processor, via wireless communication, the notification indicating the event of the firearm determined.

According to certain embodiments, a method may be provided. The method may include obtaining a signal provided by a pressure sensor (or sound sensor) configured to sense pressure generated from a discharge of a firearm; obtaining a signal provided by a weapon movement sensor configured to sense at least one movement of the firearm; and determining an event of the firearm, with one or more of at least one processor, based on the signal provided by the pressure sensor (or sound sensor) and the signal provided by the weapon movement sensor.

The determining may include determining the event of the firearm based on an evaluation of a pressure or change in pressure (or sound or change in sound), as sensed by the pressure sensor (or sound sensor), with a predetermined pressure or change in pressure (or sound or change in sound), and based on an evaluation of a velocity or acceleration, as sensed by the weapon movement sensor, with a predetermined velocity or acceleration. The event of the firearm may be determined to be a weapon discharge event based on the pressure or change in pressure (or sound or change in sound), as sensed by the pressure sensor (or sound sensor), being greater than the predetermined pressure or change in pressure (or sound or change in sound), and based on the velocity or acceleration, as sensed by the weapon movement sensor, being greater than the predetermined velocity or acceleration. In embodiments of the present disclosure, events of the firearm may be determined based on evaluations involving various numbers and types of sensors, depending on the event to be detected.

The method may also include obtaining a data boundary that is a standard deviation multiple above and below an average of pressure of pressure data, wherein the determining may include determining the event of the firearm based on an evaluation of a pressure or change in pressure (or sound or change in sound), as sensed by the pressure sensor (or sound sensor), with the data boundary.

According to certain embodiments, a system is provided. The system may include at least one processor configured to receive, via wireless communication, data indicating an occurrence of an event of a firearm from a device attached to the firearm; and memory including computer instructions, the computer instructions configured to, when executed by the at least one processor, cause the at least one processor to cause a display to display an image, including a first element and a second element, based on the data received from the device, wherein the first element has a display position corresponding to a position of the device, and the second element indicates the occurrence of the event of the firearm on which the device is attached. The at least one processor may be configured to populate, based on the data received from the device attached to the firearm, a digital form with information concerning the occurrence of the event of the firearm. The image may be a forensic recreation of the event in cartography, virtual reality, or augmented reality.

According to certain embodiments, a device attached to or integrated in a firearm is provided. The device may include: a plurality of sensors, each configured to sense a respective attribute of the firearm or of an environment surrounding the firearm, and further configured to provide corresponding signals based on sensing the respective attribute; at least one processor; and memory comprising computer instructions, the computer instructions configured to, when executed by the at least one processor, cause the at least one processor to determine an event from among a plurality of events based on the corresponding signals provided by the plurality of sensors.

According to certain embodiments, an event detection system is provided. The event detect system may include: a first user system including a first device attachable to or integrated in a first firearm, the first device including: a plurality of first sensors that are each configured to sense a respective first attribute of the first firearm or of an environment surrounding the first firearm, and are further configured to provide corresponding first signals based on sensing the respective first attribute, wherein the event detection system further includes, in the first device or in an external system that is remote from the first user system: at least one processor; and memory including computer instructions, the computer instructions configured to, when executed by the at least one processor, cause the at least one processor to determine an event from among a plurality of events based on the corresponding first signals provided by the plurality of first sensors of the first device.

According to certain embodiments, a method performed by at least one processor is provided. The method may include: obtaining corresponding signals from a plurality of sensors that are included in a device attachable to or integrated in a firearm, the plurality of sensors configured to sense a respective attribute of the firearm or of an environment surrounding the firearm, and are further configured to provide the corresponding signals based on sensing the respective attribute; and determining an event from among a plurality of events based on the corresponding signals provided by the plurality of sensors; and causing a notification to be outputted based on the event determined.

According to certain embodiments, a device attachable to a firearm is provided. The device includes: a pressure sensor configured to sense pressure generated from the firearm and provide a corresponding signal; a weapon movement sensor configured to sense at least one movement of the firearm and provide a corresponding signal; at least one processor; and memory including computer instructions, the computer instructions configured to, when executed by the at least one processor, cause the at least one processor to determine an event of the firearm based on the corresponding signal provided by the pressure sensor and the corresponding signal provided by the weapon movement sensor, wherein the computer instructions are configured to cause the at least one processor to determine the event of the firearm based on: an evaluation of a pressure or change in pressure, as sensed by the pressure sensor, with a predetermined pressure or change in pressure, and a rise time of the pressure or change in pressure; or an evaluation of velocity or acceleration, as sensed by the weapon movement sensor, with a predetermined velocity or acceleration, and a rise time of the velocity or acceleration.

It is to be understood that both the foregoing general description and the following detailed description are non-limiting and explanatory and are intended to provide explanation of non-limiting embodiments of the present disclosure.

BRIEF DESCRIPTION OF THE DRAWINGS

The various advantages of embodiments of the present disclosure will become apparent to one skilled in the art by reading the following specification and appended claims, and by referencing the following drawings, in which:

DETAILED DESCRIPTION

Reference will now be made in detail to non-limiting example embodiments of the present disclosure, examples of which are illustrated in the accompanying drawings.

"Rise-time," as described in the present disclosure, refers to the time it takes for a sensor reading to reach a certain level. In embodiments, rise-time may be measured in, for example, milliseconds or microseconds. Rise-time can be used to differentiate scenarios where the same sensor reading level is achieved, but the time required to reach the level determines the scenario causing the reading level. In embodiments, rise-time may be used to determine the time between reading start and maximum values within a reading cycle.

"Quaternion," as described in the present disclosure, refers to a complex number of the form w+xi+yj+zk, where w, x, y, z are real numbers and i, j, k are imaginary units that satisfy certain conditions. Quaternions find uses in both pure and applied mathematics. For example, quaternions are useful for calculations involving three-dimensional rotations such as in three-dimensional computer graphics, and computer vision analysis. In practical applications, including applications of embodiments of the present disclosure, they can be used alongside other methods such as Euler angles and rotation matrices, or as an alternative to them, depending on the application.

"Squib load," as described in the present disclosure, refers to a firearm malfunction in which a fired projectile does not have enough force behind it to exit the barrel, and thus becomes stuck.

"Overpressure ammunition," as described in the present disclosure, refers to small arms ammunition, commonly designated as +P or +P+, that has been loaded to a higher internal pressure than is standard for ammunition of its caliber, but less than the pressures generated by a proof round. This is done typically to produce rounds with a higher muzzle velocity and stopping power, such as ammunition used for defensive purposes. Because of this, +P ammunition is typically found in handgun calibers which might be used for defensive purposes. Hand-loaded or reloaded ammunition may also suffer from an incorrect powder recipe, which can lead to significant weapon damage and/or personal injury.

"Image," as described in the present disclosure, may refer to a still image and/or a video image.

Figure 1:
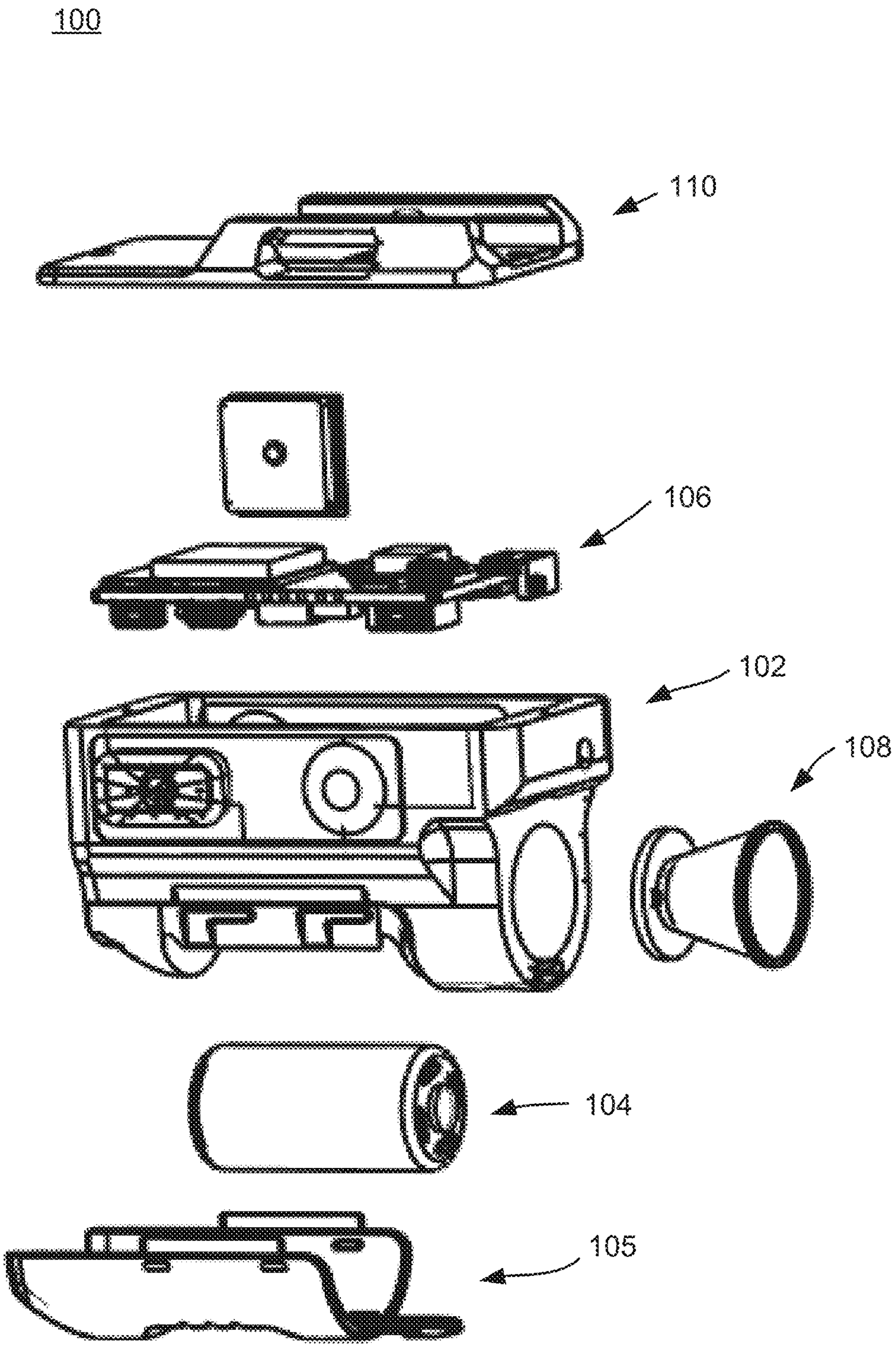
FIG. 1 illustrates a first exploded schematic view of an Environment Sensing Unit (ESU) of an embodiment.
Figure 2:
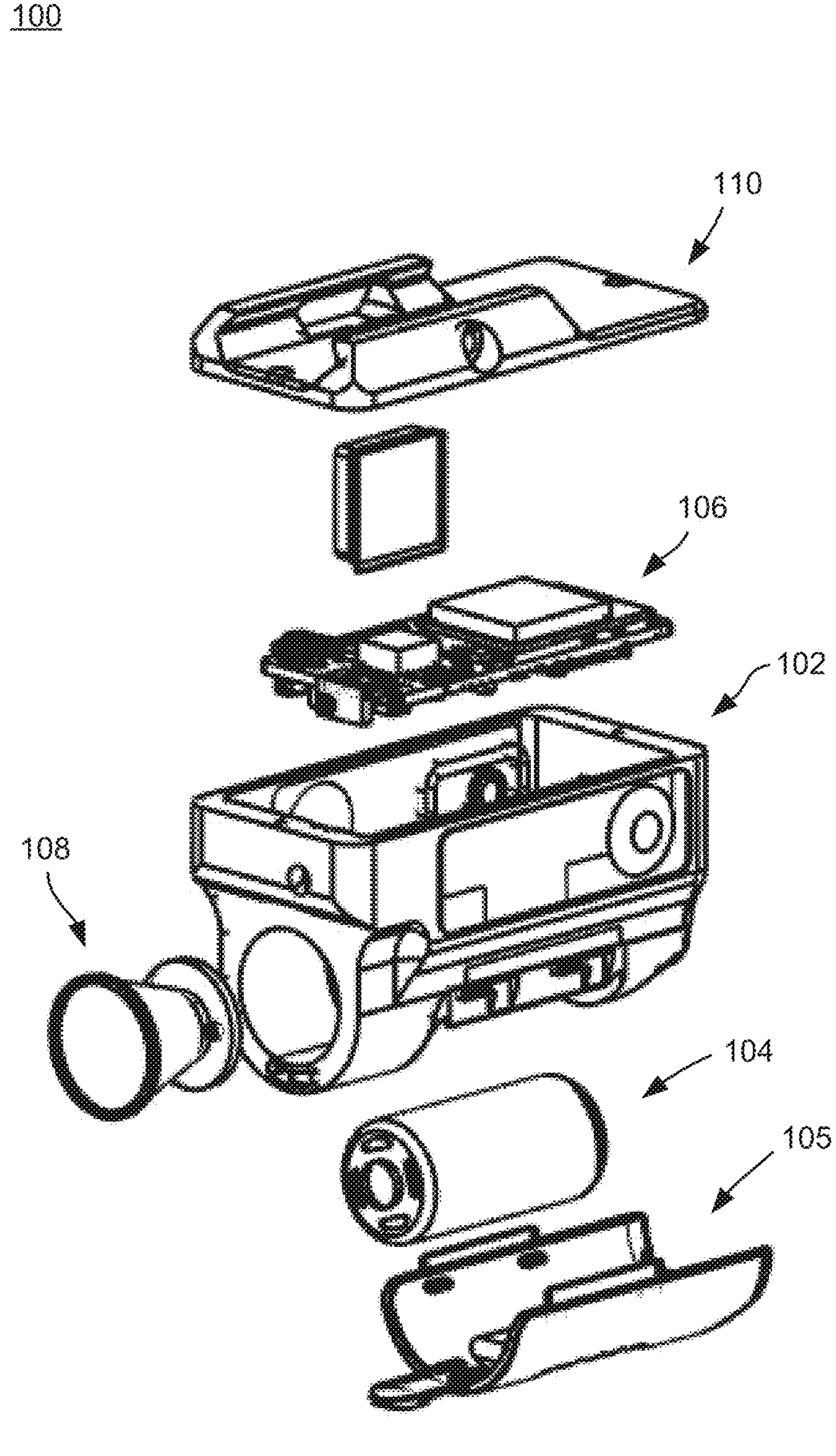
FIG. 2 illustrates a second exploded schematic view of an Environment Sensing Unit (ESU) of the embodiment.

As illustrated in FIGS. 1-2, a non-limiting example embodiment of the present disclosure may include an Environmental Sensing Unit (ESU) 100 having a housing 102, a power source 104, a power source cover 105, electronic components 106, a secondary feature 108, and a mounting mechanism 110. The secondary feature 108 may be, for example, a flashlight as illustrated in FIG. 1. However, the secondary feature 108 may alternatively be or additionally include any other device that is mounted to a rail of a firearm such as, for example, a laser designator, an IR illuminator, a range finding, a video and/or audio capture, or less lethal capabilities, and any other unmentioned functionality applicable or desirable to be weapon mounted.

Figure 5:
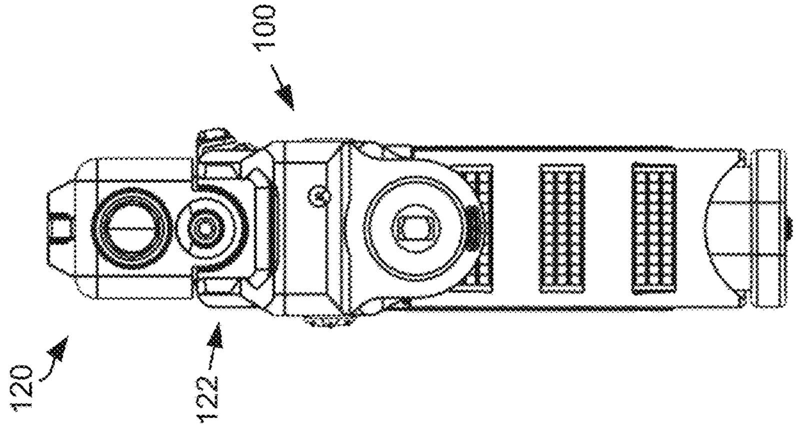
FIG. 5 illustrates a front view, from a user's perspective, of the handgun with the ESU of the embodiment.
Figure 3:
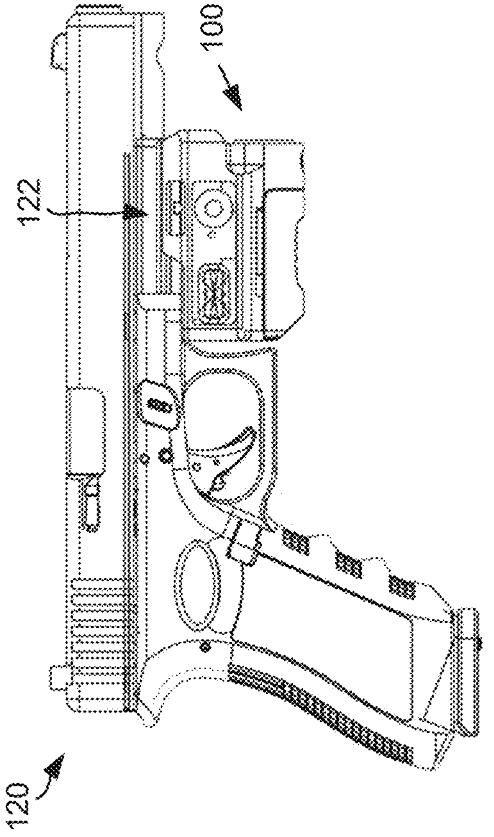
FIG. 3 illustrates a side view of a handgun with an ESU of the embodiment.
Figure 4:
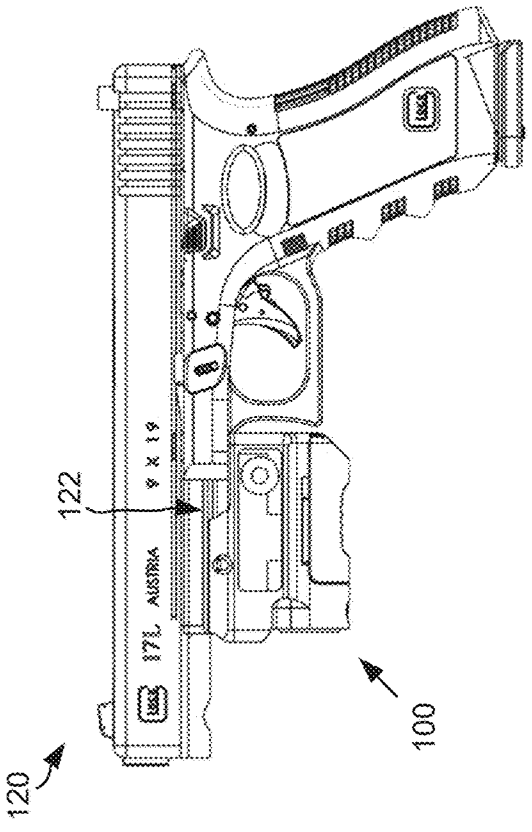
FIG. 4 illustrates another side view of the handgun with an ESU of the embodiment.

As illustrated in FIGS. 3-5, the ESU 100 may be mounted on the accessory rail 122 of a handgun 120 via the mounting mechanism 110. In an embodiment, the ESU 100 may alternatively be mounted on an accessory rail of any other type of firearm, or to a portion other than an accessory rail of any type of firearm.

Figure 6:
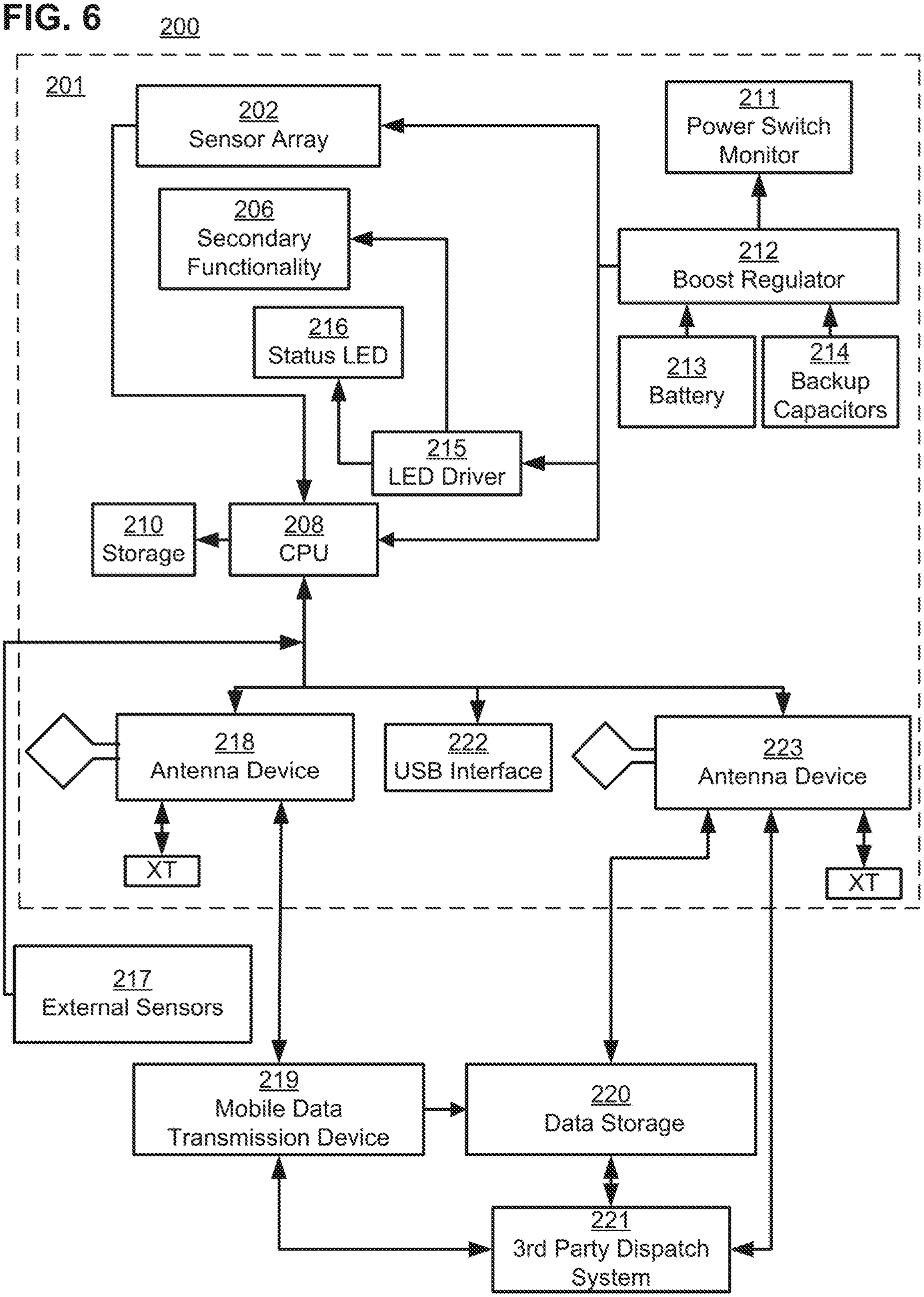
FIG. 6 illustrates a diagram of a system of an embodiment.

FIG. 6 is a block diagram of a system 200. As illustrated in FIG. 6, the system 200 may include an ESU system 201 that includes a sensor array 202, secondary functionality 206, CPU 208, storage 210, power monitor switch 211, boost regulator 212, battery 213, backup capacitors 214, LED driver 215, status LED 216, antenna device 218, USB interface 222, and antenna device 223. The components of the ESU system 201 may be integrated into a single device such as, for example, ESU 100, or provided separately in any combination. The system 200 may also include, external from the ESU system 201, external sensors 217, mobile data transmission device 219, data storage 220, and 3rd party dispatch system 221. In an embodiment, the external sensors 217 and the mobile data transmission device 219 may be attached to a user of the ESU system 201, separate from the ESU system 201, and the data storage 220 and the 3rd party dispatch system 221 may be provided remotely from the user of the ESU system 201.

With reference to FIG. 6, the ESU system 201 may include a power unit having the battery 213, backup capacitors 214, and the boost regulator 212 which may be configured to supply power to the sensor array 202, the secondary functionality 206, the LED driver 215, and the CPU 208. One or more analog or digital power switches may control power to one or more of such devices. The power switch monitor 211 may monitor whether, for example, the one or more power switches are allowing power to be supplied from the power unit to the sensor array 202, the secondary functionality 206, the LED driver 215, and the CPU 208.

The CPU 208 may be connected to storage 210 which stores computer program code that is configured to cause the CPU 208 to perform its functions. For example, the CPU 208 may control operation of the secondary functionality 206 and control the LED driver 215 to drive the status LED 216. The CPU 208 may receive and analyze sensor outputs of the sensor array 202. In an embodiment, the CPU 208 may additionally receive and analyze sensor outputs of the external sensors 217.

In some embodiments, the CPU 208 may control operation of any of the secondary functionality 206 based on inputs from the sensor array 202 and/or the external sensors 217. For example, the CPU 208 may turn on or turn up the brightness of a flashlight of the secondary functionality 206 based on the CPU 208 determining that a "search" movement is being performed with the weapon, based on sensor data from the sensor array (e.g., acceleration or velocity) indicating the weapon is moving in a certain pattern.

In an embodiment, the CPU 208 may perform communication with external systems and devices using any type of communication interface. For example, the CPU 208 may perform communication using one or more of an antenna device 218, a USB interface 222, and antenna device 223.

In an embodiment, the antenna device 218 may include a transceiver such as, for example, an ISM multi-channel transceiver, and use one of the standard type Unlicensed International Frequency technologies such as Wi-Fi, Bluetooth, ZigbeeTM, Z-waveTM, etc or a proprietary (e.g., military/law enforcement officer (LEO)) protocol. In an embodiment, the system 200 may further include a mobile data transmission device 219, such as a cell-phone, radio, or similar device. The antenna device 218 may communicate with the mobile data transmission device 219, and operate as either a primary or secondary data transmission means.

In an embodiment, the ESU system 201 may alternatively or additionally include an antenna device 223 as a cellular communication interface. The antenna device 223 may include a transceiver, such as a cellular multi-channel transceiver, and operate as either a primary or secondary data transmission means.

The antenna device 218 (via the mobile data transmission device 219) and the antenna device 223 may communicate with both or one of the data storage 220 and the 3rd party dispatch system 221. The data storage 220 may be, for example, a preconfigured internet or other network connected storage, including a cloud storage.

In an embodiment, the antenna device 223 may use a different antenna from the antenna device 218. The antenna device 218 may use a low power protocol(s) and enable local communication between the ESU system 201 (and the external sensors 217) with the mobile data transmission device 219. The antenna device 223 may use an LTE/cellular protocol(s) and enable data transmission to the data storage 220 and/or the third party dispatch system 221.

In an embodiment, the ESU system 201 may alternatively or additionally include any hardwired data transmission interface including, for example, USB interface 222.

Figure 7:
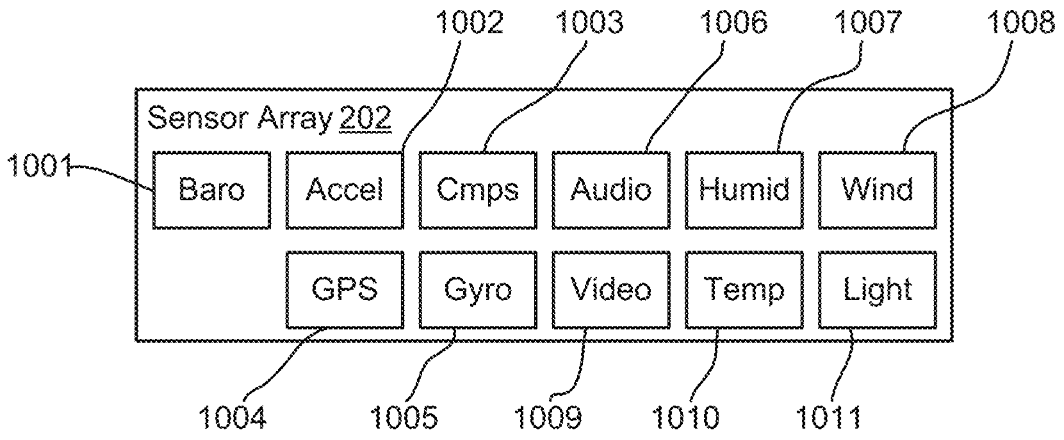
FIG. 7 illustrates a diagram of a sensor array of an embodiment.

As illustrated in FIG. 7, the sensor array 202 may include, for example, a barometric pressure sensor 1001, accelerometer 1002 (e.g., multi-axis MEMS), electronic compass 1003, electronic gyroscope 1005, and/or global positioning system (GPS) unit 1004. The GPS unit 1004 may be compliant with NAVSTAR and its associated anti-tamper and security architecture. The GPS unit 1004 may alternatively be configured as another positioning system (e.g., GLONASS, Galileo, NAVIC, and Quasi-Zenith) depending on mission requirements. In some embodiments, the sensor array 202 may alternatively or additionally include other sensors, such as audio/sound sensors 1006 (e.g., microphones), humidity sensors 1007, wind sensors 1008, video sensors 1009 (e.g., cameras), temperature sensors 1010, light sensors 1011, and/or any other sensory input desired. In embodiments, the sensor array 202 may alternatively or additionally include an overpressure transducer and an RF strain detector. In an embodiment, the configuration of the sensor array 202 may potentially eliminate a requirement of a smart mag/follower using a hall effect sensor.

Figure 8:
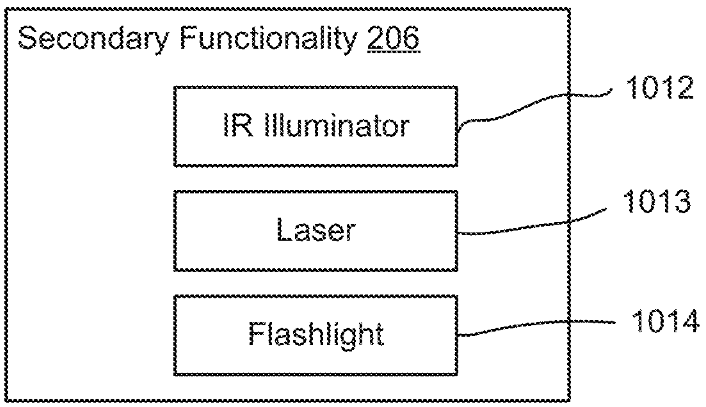
FIG. 8 illustrates a diagram of secondary functionality of an embodiment.

As illustrated in FIG. 8, the secondary functionality 206 may include, for example, an IR illuminator 1012, laser 1013 for aiming, flashlight 1014 (e.g., LED flashlight), and/or any other feature desired. The secondary functionality 206 may be implemented as the secondary feature 108 illustrated in FIG. 1.

Figure 9:
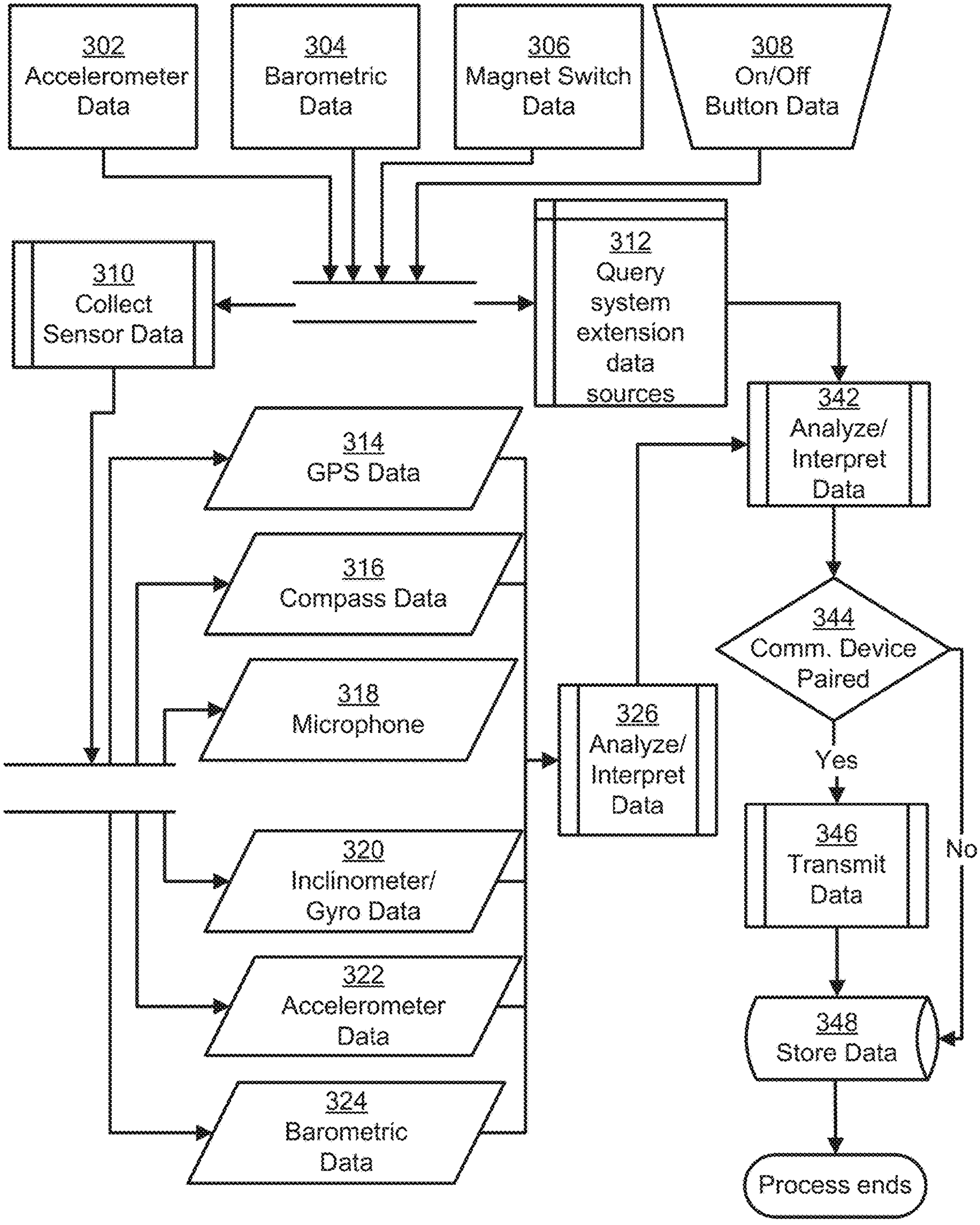
FIG. 9 illustrates a process of an embodiment.

FIG. 9 illustrates an operation flowchart, which may be performed by embodiments of the present disclosure. For illustration purposes, the operation flow chart is described below with reference to the system 200 illustrated in FIG. 6.

The CPU 208 may receive various inputs (e.g., accelerometer-, barometric-sensor, magnetic switch, and on/off button) from the sensor array 202 and/or other devices, such as external sensors 217, switches, and buttons, that may be used to determine a state of the weapon in or on which the ESU system 201 is provided. For example, the CPU 208 may detect and register a weapon unholstering, weapon discharge, and general weapon handling/manipulation based on the various sensor inputs. In an embodiment, the CPU 208 may put the ESU system 201 into an active state based on receiving such a sensor input of a predetermined state or amount. For example, the active state may occur upon a recoil action of the host weapon indicated by receiving accelerometer data trigger 302 and/or a barometric pressure spike indicated by receiving barometric data 304, disconnection of a magnet switch between the ESU and holster indicated by receiving magnet switch data 306, or a manual on/off button press on the ESU system 201 indicated by receiving on/off button data 308.

In an embodiment, receiving accelerometer data 302 above a preconfigured level and within a preconfigured rise-time (to accommodate for various calibers/loads, compensator equipped, and suppressed and unsuppressed fire); receiving barometric data 304 above a preconfigured level (to accommodate for various calibers/loads, compensator equipped, and suppressed and unsuppressed fire); receiving magnet switch data 306 indicating a break in the magnet switch connection; and/or receiving on/off button data 308 indicating a button press on the on/off button of the ESU 201 may initiate sensor data collection 310 and interpretation cycle as well as executes any secondary behaviors (like flashlight activation) based on configured rules. Such rules, sensor data, and data obtained from interpretation cycles may be stored in the storage 210. In an embodiment, upon sensor data collection cycle commencement, the ESU system 201 may poll the various input sensors and collect their readings simultaneously in the collect sensor data step 310. In parallel, in step 312, the ESU system 201 may query any system extension data sources that are configured (e.g., laser range finders, powered accessory rail status, body worn sensors, etc.). For example, the system extension data sources may be external sensors 217. The external sensors 217 may include, for example, a camera (e.g. a shoulder mounted camera) that may include its own GPS.

In an embodiment, the CPU 208 may perform one or more of steps 314-324 as a part of step 310. In step 314, the GPS reading is taken and the data prepared for analyzing/storage. The GPS reading may be used by the CPU 208 or a system that receives the GPS reading therefrom (e.g. third party dispatch system 221) to determine location of the ESU 201. In step 316, electronic compass reading is taken and the data prepared for analyzing/storage. The compass reading may be used by the CPU 208 or a system that receives the compass reading therefrom (e.g. third party dispatch system 221) to determine directional orientation of the ESU 201. In step 318, audio recording is provided for shot confirmation and/or audible environmental interactions and the data prepared for analyzing/storage. The audio may be recorded for a preconfigured loop duration for both shot detection and environment awareness. In step 320, a gyroscopic/incline sensor reading is taken and the data prepared for analyzing/storage. In Step 312, accelerometer sensor reading is taken and the data prepared for analyzing/storage. In step 324, barometric pressure reading data is taken and prepared for analyzing/storage.

In step 326, the CPU 208 analyzes the sensory input data stored from the sensor array 202 and applies rules to determine, for example, the state of the weapon in which the ESU system 201 is associated with. In embodiments of the present disclosure, step 326 may include analyzing and interpreting one or more of the different types of sensor data collected to determine the state of the weapon. For example, the CPU 208 may analyze one or more of microphone data, gyro/incline data, accelerometer data, barometric data, and any other data collected by the ESU system 201 to determine a discharge state of the weapon. As an alternative or additional example, the CPU 208 may determine another state of the weapon (e.g. weapon recoil, slide manipulation, up-/down-ward aim of the host weapon, free-fall of the host weapon, unholstering/holstering of the host weapon, "search" movements, weapon retention struggle, transition to an "at rest" position of the host weapon while unholstered, a lost weapon scenario, and similar movements and behaviors based on one or more of GPS data, compass data, microphone data, gyro/incline data, accelerometer data, barometric data, magnet switch data, or any other data collected by the ESU system 201.

In step 342, the CPU 208 may consider external data received during step 312 for scenario refinement and/or alternate scenario determination. Alternatively or additionally, in step 342, the CPU 208 may provide system configuration information (e.g., caliber as used in the host weapon, serial number, and any other configured data) and prepare it for storage, display to the user (if so configured), and/or transmission. The system configuration information may be pre-stored in the storage 210, or within another storage of the system 200, within or outside the ESU system 201. With respect to an embodiment of the present disclosure, the system configuration information is pre-stored in the storage 210. Accordingly, even when there is loss of signal between the mobile data transmission device 219, or the antenna device 223, with a storage or system (e.g. data storage 220 or third party dispatch system 221) external to a user of the ESU system 201, the CPU 208 may access the system configuration information. The system configuration information may include, for example, date and time of issuance of the ESU system 201 to the user; user name; badge number or another unique ID for the user; city, state, and agency of the user; host weapon model; host weapon serial number; host weapon caliber; a unique communication ID for the ESU system 201; an administrator user ID, etc.

In step 344, the CPU 208 may check the system configuration data for a paired communication device and whether the connection is active. In an embodiment, the CPU 208 may check whether the antenna device 218, the USB interface 222, or the antenna device 223 of the ESU system 201 is paired, and/or whether the antenna device 218 is paired with the mobile data transmission device 219. For example, the CPU 208 may check whether a transceiver of the antenna device 218 is paired with a transceiver of the mobile data transmission device 219, or whether a transceiver of the antenna device 223 is paired with a transceiver(s) of the data storage 220 or the third party dispatch system 221.

If the CPU 208 determined in step 344 that there is a paired and active communication device, the CPU 208 may transmit data obtained (e.g., from steps 326 and/or 342) to a configured data recipient source(s) via the communication device in step 346. The data may be sent to the antenna device 218, the USB interface 222, or the antenna device 223 of the ESU system 201 based on the appropriate pairing and/or predetermined rules. The configured data recipient source(s) may be, for example, data storage 220 and/or the 3rd party dispatch system 221. In some embodiments, the CPU 208 may alternatively or additionally send any of the sensor data obtained by the ESU system 201 to the configured data recipient source(s). The sensor data may be used by the configured data recipient source(s) for analysis/interpretation and display.

In step 348, the CPU 208 may cause the obtained data to be stored in local storage as, for example, storage 210. In an embodiment, the obtained data may be saved in local storage in step 348 in parallel with step 344, or before or after step 344. In step 348, the CPU 208 may alternatively or additionally cause the local storage to update a record with a transmission outcome (e.g., successful or unsuccessful) of the obtained data. Following, the data cycle process may end.

Figure 10:
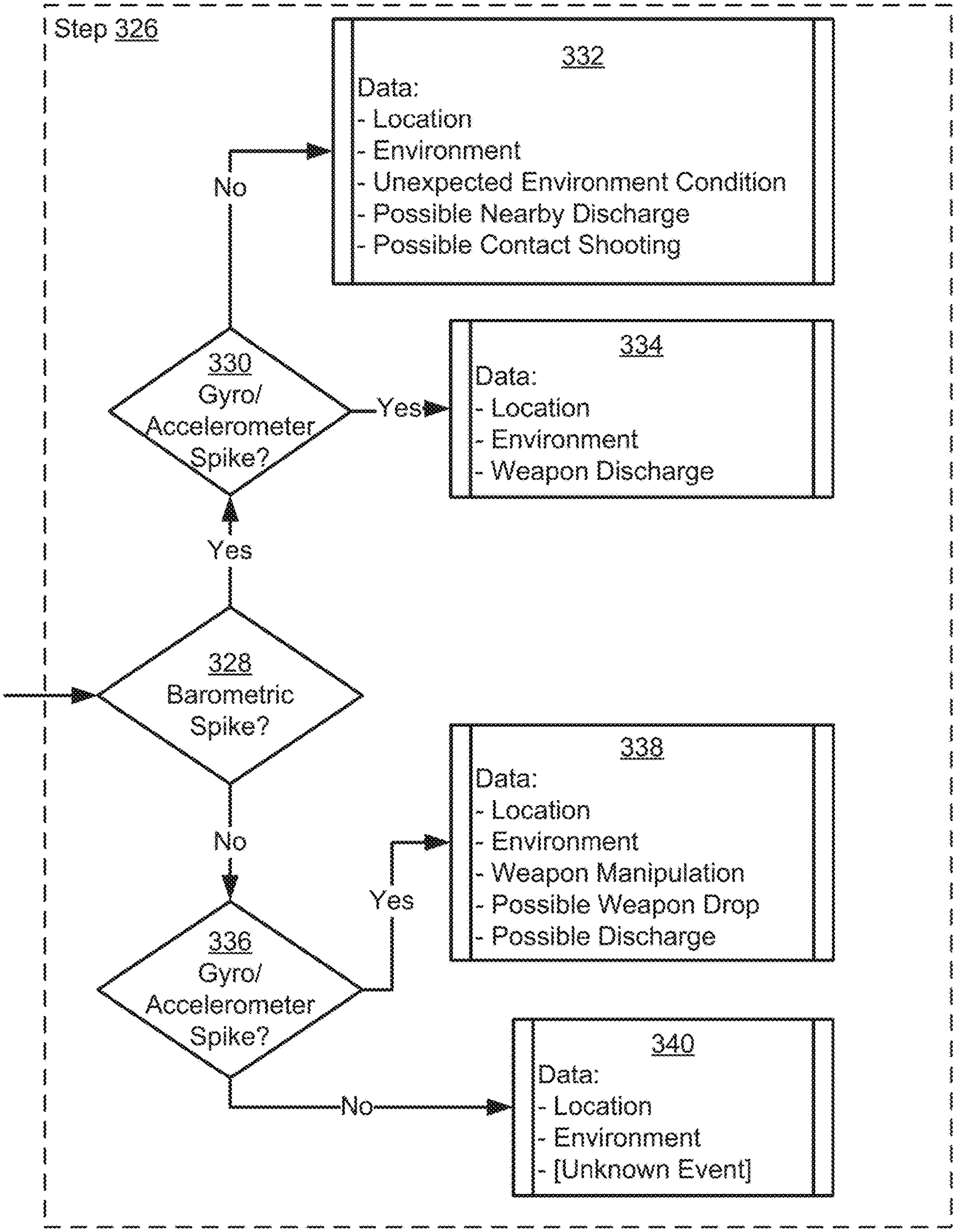
FIG. 10 illustrates a sub-process of the process of the embodiment.

FIG. 10 illustrates a non-limiting example of the analysis and interpretation step 326 of FIG. 9. As illustrated in FIG. 10, the CPU 208 may determine a possible state of the host weapon based on barometric data, and gyro or accelerometer data, and create a record that includes data such as location, environment, and one or more possible states of the weapon based on the sensor data retrieved by the CPU 208.

For example, if the CPU 208 determines that a barometric spike above a specified amount is present in the data of step 326, the CPU 207 determines in step 330 whether the accelerometer sensor data and/or gyroscopic incline data that was recorded is above a preset threshold level indicative of a weapon discharge, and determines the next step in the process based upon the determination.

If the CPU 208 determines that the barometric spike is above a specified amount in step 328, and no spike above the preset threshold level is determined in the accelerometer sensor data or gyroscopic incline data in step 330, the CPU 208 may determine and categorize the type of event in step 332 as, for example, a possible nearby discharge or a contact shooting. If a barometric spike is determined to be above a specified amount in step 328, and a spike above the preset threshold level is determined in the accelerometer sensor data and/or gyroscopic incline data in step 330, the CPU 208 may determine and categorize the type of event in step 334 as, for example, a discharge event.

If no barometric spike above a specified amount is determined in step 328, and a spike having a specific rise-time and force energy boundaries is determined by the CPU 208 to be present in the accelerometer sensor data and/or gyroscopic incline data in step 336, the CPU 208 may determine and categorize the type of event in step 338 as, for example, one or more of a weapon manipulation, possible weapon drop, possible suppressed discharge, or possible squib load based upon the values read.

In an embodiment, the CPU 208 may determine in step 338 whether the accelerometer sensor data and/or gyroscopic incline data, that was recorded, is indicative of a weapon discharge based on rise-time for the various axis force-readings. Accordingly, in embodiments, the CPU 208 may determine, for example, whether there was a squid load or a suppressed discharge.

If the CPU 208 determines that there is no barometric spike above a specified amount in step 328, and no spike having a specific rise-time and force energy boundaries is determined by the CPU 208 to be present in the accelerometer sensor data and/or gyroscopic incline data in step 336, the CPU 208 may determine and categorize the type of event in step 340 as, for example, a sensor activation of unknown nature. Accordingly, an investigation into the event triggering the sensor reading may be recommended and conducted for scenario detection enhancements.

In some embodiments, the step 326 may alternatively or additionally include determining and categorizing the type of event (e.g. weapon discharge) based on sound and movement data, sound and pressure data, or any other combination of data from sensors. According to embodiments, determinations based on sound data may be performed in similar manners to determinations based on pressure data as described in embodiments of the present disclosure.

In some embodiments, a part or all of the analysis/interpretation steps 326 and 342, illustrated in FIG. 9, may be performed by a remote system connected to the ESU system 201. The remote system may be, for example, the third party dispatch system 221 illustrated in FIG. 221. In such a case, the ESU system 201 may send a part or all of the sensor data it obtains (e.g. data from sensor array 202 and external sensors 217) to the remote system without performing a part or all of analysis/interpretation steps 326 and 342.

FIGS. 11-14 illustrate non-limiting example configurations of ESUs of the present disclosure that include one or more cameras 404 as a part of a sensor array of the ESUs. As illustrated in FIGS. 11-14, cameras 404 are placed in a range 401 of 180 degrees, the range centered at a front facing side of the ESUs. The range 401 extends 90 degrees, from the front facing side, to both a left and right side of the ESUs.

Figure 11:
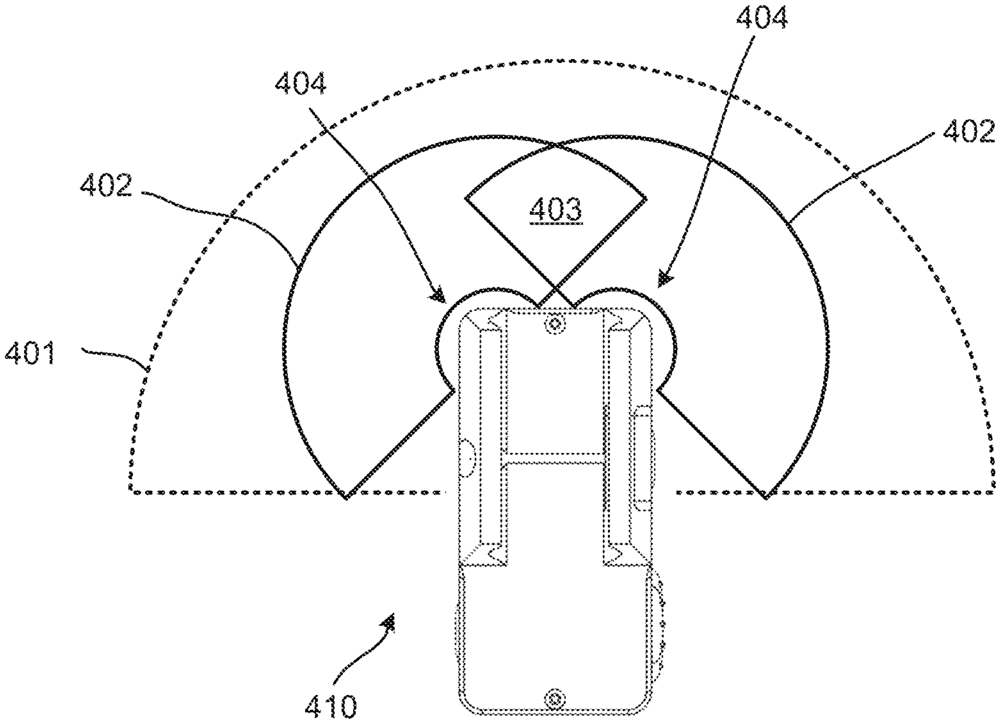
FIG. 11 illustrates an ESU with a two camera set up of an embodiment.

FIG. 11 illustrates an ESU 410 with two cameras 404, outward facing at 45 degrees from the front facing side of the ESU 410. The placement of the two cameras 404 provide camera views 402, which includes a 270 degree forward view with stereo video portion 403 for a 45 degree left and 45 degree right of center space. The forward facing stereo video portion 403 allow for 3D virtual reality video realization and distance determination for objects within that visual space.

Figure 12:
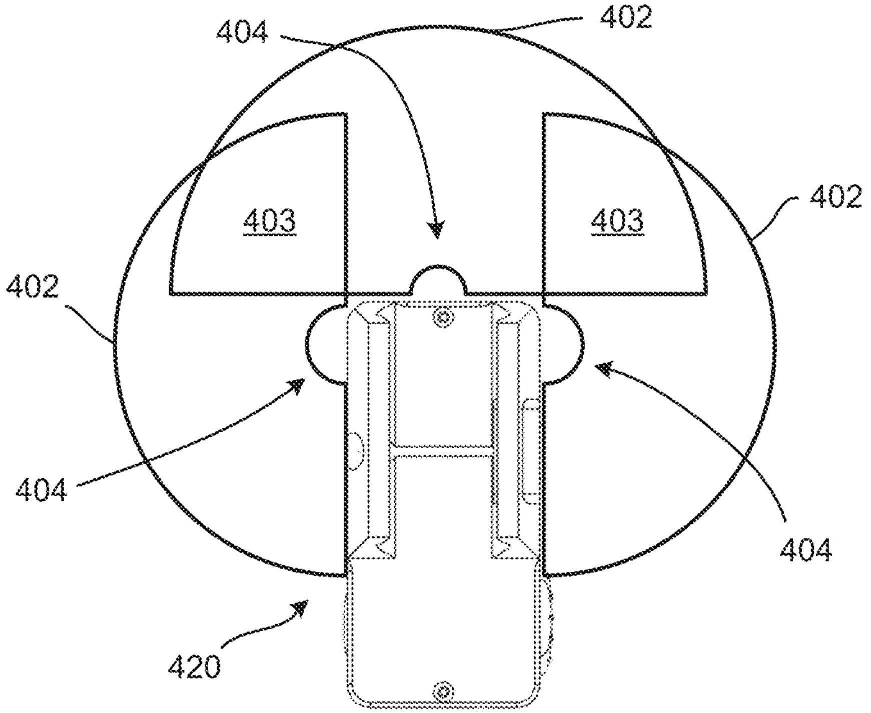
FIG. 12 illustrates an ESU with a three camera set up of an embodiment.

FIG. 12 illustrates an ESU 420 including a three camera setup, with one camera 404 on the left side fascia, providing a camera view 402 up to 180 degrees, a camera on the right side fascia, providing a camera view 402 up to 180 degrees, a camera 404 centered on the front facing fascia, providing a camera view 402 up to 180 degrees. The three camera setup results in overlapping areas, that are stereo video portions 403, in the front facing peripheral vision of the ESU 430 and the host weapon, allowing for 3D virtual reality video realization and distance determination for objects within that visual space.

Figure 13:
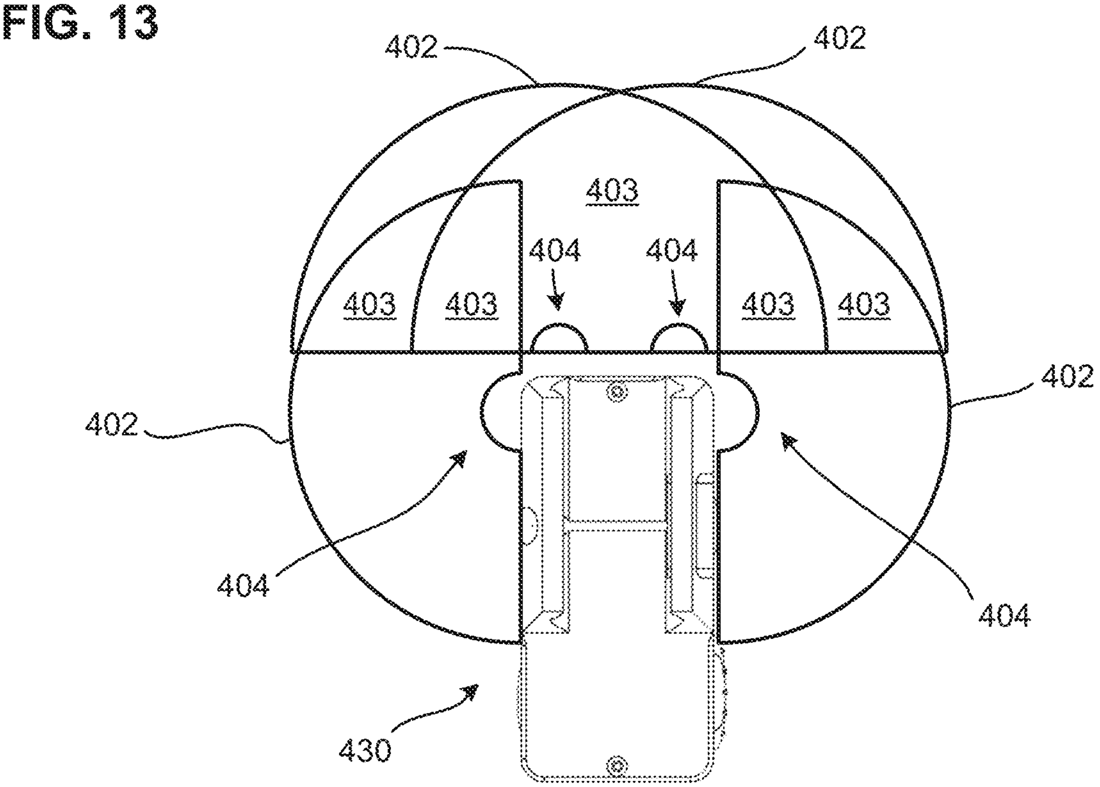
FIG. 13 illustrates an ESU with a four camera set up of an embodiment.

FIG. 13 illustrates an ESU 430 with a four camera setup, including a camera 404 on the left side fascia, providing a camera view 402 up to 180 degrees, a camera 404 on the right side fascia, providing a camera view 402 up to 180 degrees, a camera 404 left of center on the front facing fascia, providing a camera view 402 up to 180 degrees, and a camera 404 right of center on the front facing fascia, a camera view 402 up to 180 degrees. The four camera setup results in an overlapping 180 degree forward view of the ESU 430 and the host weapon. Accordingly, the ESU 430 includes stereo video portions 403 for a 180 degrees of forward view, allowing for 3D virtual reality video realization and distance determination for objects within that visual space. The overlapping areas from the side cameras 404 with the two front facing cameras 404 allow for additional angles of distance determination and 3D realization, via stereo video portions 403.

Figure 14:
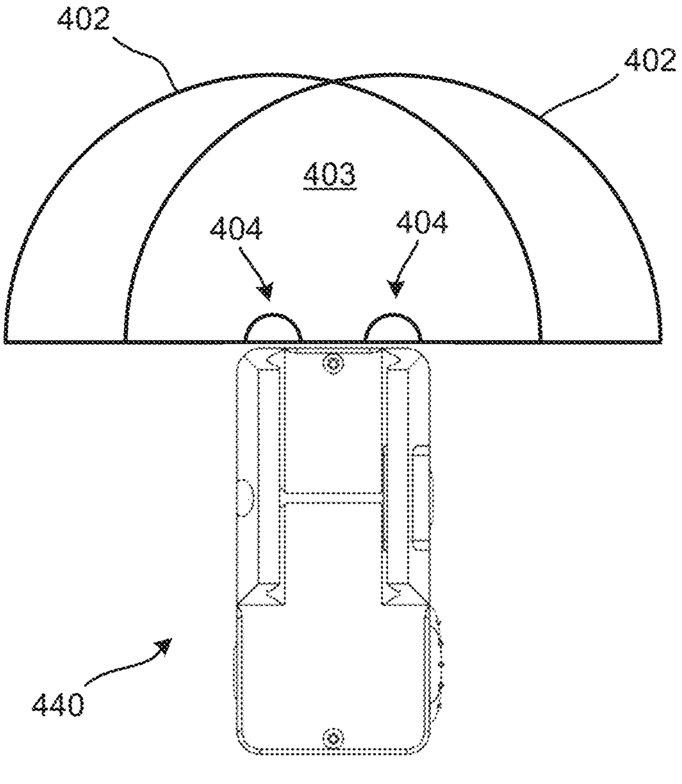
FIG. 14 illustrates an ESU with a two camera set up of an embodiment.

FIG. 14 illustrates an ESU 440 including a two camera setup, with a camera 404 left of center on the front facing fascia, providing a camera view 402 up to 180 degrees, and a camera 404 right of center on the front facing fascia, providing a camera view 402 up to 180 degrees. The two camera setup results in an overlapping 180 degree forward view of the ESU 440 and the host weapon. Accordingly, the ESU 440 includes a stereo video portion 403 for a 180 degrees of forward view, allowing for 3D virtual reality video realization and distance determination for objects within that visual space.

FIGS. 11-14 illustrate non-limiting example embodiments and are not comprehensive or inclusive of all camera layout options of ESUs of the present disclosure and are not comprehensive or inclusive of all camera positions along the fascia of the ESUs. The left, front and right fascia may incorporate any number of cameras at any angle between 0 and 90 degrees along the fascia of the ESU where it is placed. The left, front and right fascia may incorporate any number of cameras at any angle position along the fascia of the ESU where it is placed; including a corner position between fascias.

According to the above, embodiments of the present disclosure may capture video data for target distance determination, 3D environment recreation, and real time dispatch notification via either video feed or frame based image.

Figure 15:
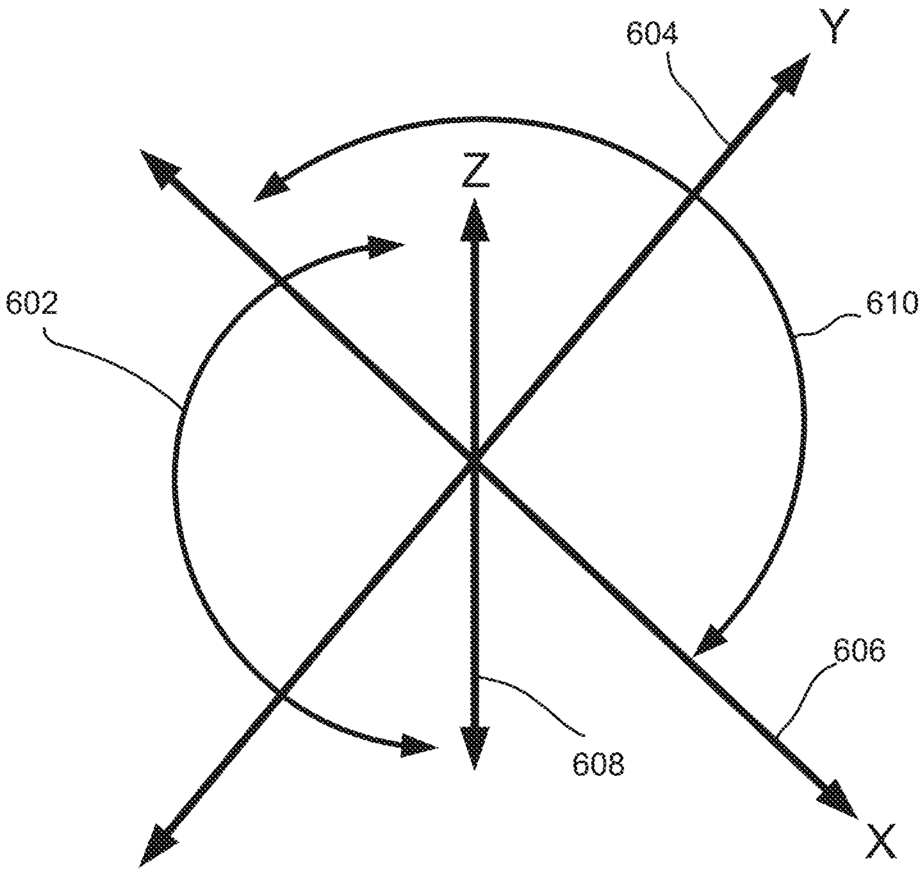
FIG. 15 illustrates a diagram of example linear and rotational forces.

FIG. 15 illustrates a diagram for demonstrating some of the linear and rotational forces and movements that may be captured and/or interpreted by one or more sensors of the sensor array 202 and at least one processor provided therewith. In an embodiment, the one or more sensors may be, for example, a multi-axis Micro-Electro-Mechanical system (MEMs) sensor for the purpose of identifying the forces or movements associated with a particular usage/interaction/behavior of a host weapon system. The MEMS may include, for example, one or more of a gyroscope, accelerometer, and a compass. In an embodiment, the one or more sensors of the sensor array 202 may provide data to the CPU 208 of the ESU, indicating one or more of movement(s) (e.g., translational and rotational movement) of the ESU, acceleration(s) based on such movement, and force(s) based on such acceleration(s), and the CPU 208 may determine, based on the data, one or more of the movement(s) (e.g., translational and rotational movement), the acceleration(s) based on such movement(s), and the force(s) based on such acceleration.

Linear forces include forces generated based on movements of an ESU with respect to the Y axis 604, X axis 606, and Z axis 608. The Y axis 604 may indicate a front-back axis of an ESU, and a host weapon associated with the ESU. For example, the Y axis 604 may indicate a bore axis of the host weapon. The X axis 606 may indicate a left-right axis of the ESU, and the host weapon associated with the ESU. The Z axis 608 may indicate an up-down axis of the ESU, and the host weapon associated with the ESU.

Rotational forces include torque forces (e.g., rZ, rY, and rZ) that are generated based on movement of the ESU around the Y axis 604, X axis 606, and Z axis 608. The torque forces include, for example, forces generated based on forces on rotational axis 602, rotated around Z axis 608, and rotational axis 610, rotated around the X axis 604.

Figure 16:
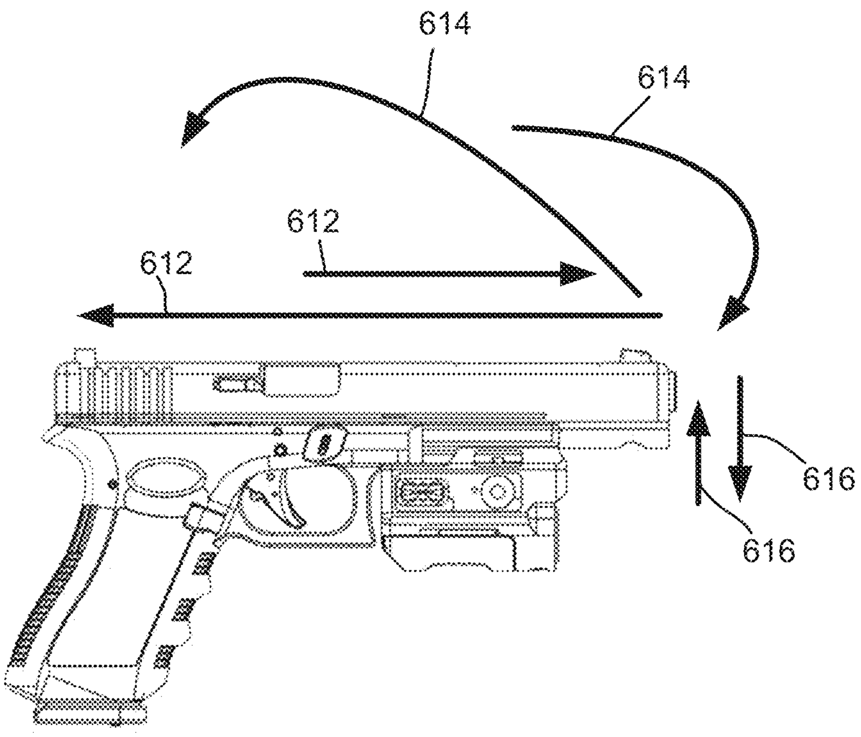
FIG. 16 illustrates a diagram of example linear and rotational forces with respect to an ESU and a host weapon of an embodiment.

In embodiments, ESU systems of the present disclosure may use one or more sensors of the sensor array 202 to track linear motion along the bore-axis/Y Axis 604 to identify host weapon recoil, slide manipulation, the host weapon being driven towards a target, movement between multiple targets, and similar movements and behaviors. With reference to FIG. 16, such linear motion tracked may be linear motion in directions 612.

Figure 17:
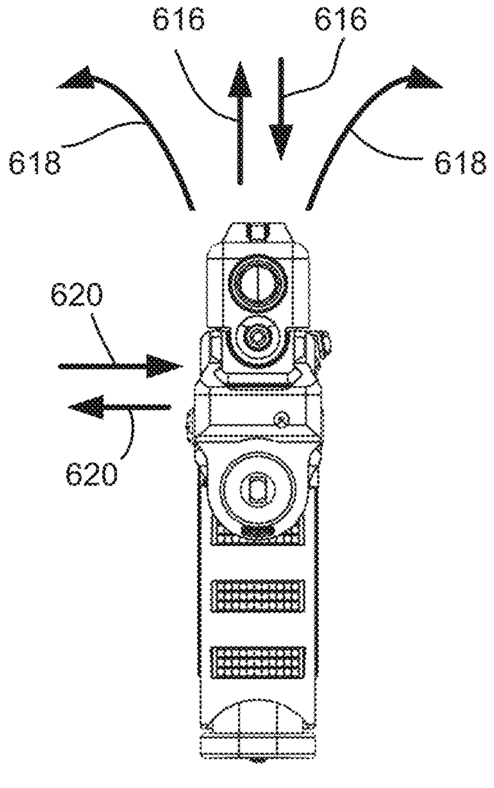
FIG. 17 illustrates a diagram of example linear and rotational forces with respect to an ESU and a host weapon of an embodiment.

It is noted that, while linear acceleration along directions 612 may be used to track host weapon recoil, host weapon recoil may also have acceleration components in tilt and rotational directions such as directions 614 and 618 described below with reference to FIGS. 16-17. ESU systems of the present disclosure may track all such directions to identify host weapon recoil.

In embodiments, ESU systems of the present disclosure may use one or more sensors of the sensor array 202 to track tilt rotation around the X axis 606 to identify host weapon recoil, slide manipulation, up-/down-ward aim of the host weapon, free-fall of the host weapon, unholstering/holstering of the host weapon, "search" movements related to the usage of flashlight functionality of the ESU, weapon retention struggle, and similar movements and behaviors. As an example, the tilt rotation tracked may originate from the y-axis plane, and rotate towards the Z axis 608. With reference to FIG. 16, such tilt rotation tracked may be rotation motion in directions 614.

In embodiments, ESU systems of the present disclosure may use one or more sensors of the sensor array 202 to track elevation change (vertical movement) of the host weapon along the Z axis 608 to identify unholstering/holstering of the host weapon, free-fall of the host weapon, transition to an "at rest" position of the host weapon while unholstered, and similar movements and behaviors. With reference to FIGS. 16-17, such linear motion tracked may be linear motion in directions 616.

In embodiments, ESU systems of the present disclosure may use one or more sensors of the sensor array 202 to track rotation around the bore axis/Y axis 604 to identify free-fall of the weapon, slide manipulation, "search" movements related to the usage of the flashlight functionality of the ESU, and similar movements and behaviors. As an example, the rotation tracked may indicate canting of the host weapon perpendicular to the bore axis/Y axis 604. With reference to FIG. 17, such rotation tracked may be rotation motion in directions 618. Movement in direction 618 is also known as "cant."

In embodiments, ESU systems of the present disclosure may use one or more sensors of the sensor array 202 to track horizontal movement of the host weapon along the X axis 606, perpendicular to the bore axis/Y axis, to identify racking of the host weapon, "search" movements related to the usage of the flashlight functionality of the ECU, tracking movement between multiple targets, transition to an "at rest" position of the weapon while unholstered, and similar movements and behaviors. With reference to FIG. 17, such linear motion tracked may be linear motion in directions 620.

According to embodiments, the at least one processor (e.g., CPU 208) of ECUs with a sensory array (e.g., sensory array 202) may detect and measure movement(s) from the origin point at the intersection of the X axis 606, the Y axis 604, and the Z axis 608 that is linear along one of the axis, and rotation(s) along any singular, or combination of, axis plane(s). In some embodiments, the movement data captured by one or more sensors of the sensor array may be used to generate quaternions to provide virtualization of the data for virtual and/or augmented reality display. For example, the CPU 208 may generate the quaternions based on the movement data captured by the sensor array 202. In some embodiments, the movement data captured by one or more sensors of the sensor array may be used to generate a system notification as part of dispatch notification and event element identification and timeline. For example, the CPU 208 may generate the system notification based on the movement data captures by the sensor array 202. The system notification may include, for example, the data obtained by the CPU 208 in step 326, illustrated in FIG. 10. That is, the data may include, for example, elements indicating location, environment, and possible event of a host weapon that is associated with an ESU.

Figure 18:
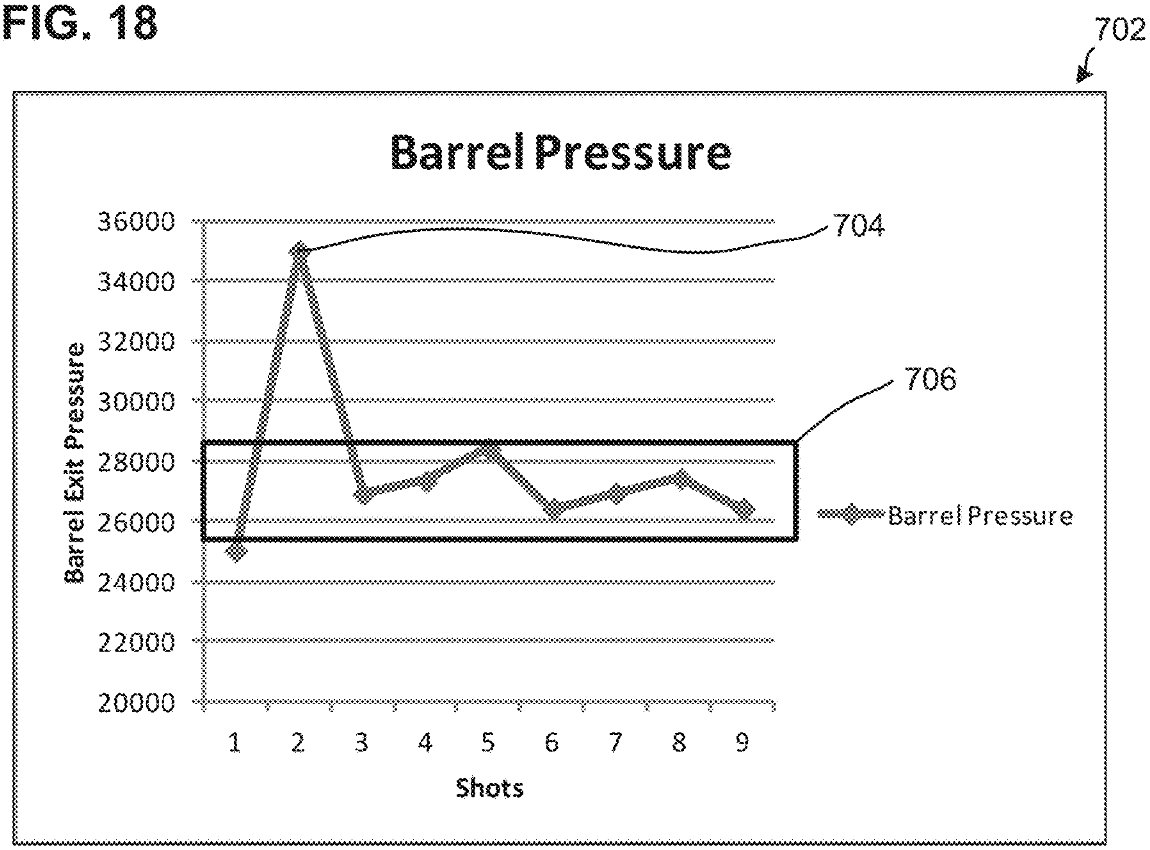
FIG. 18 illustrates a graph of barrel pressure of a host weapon.
Figure 19:
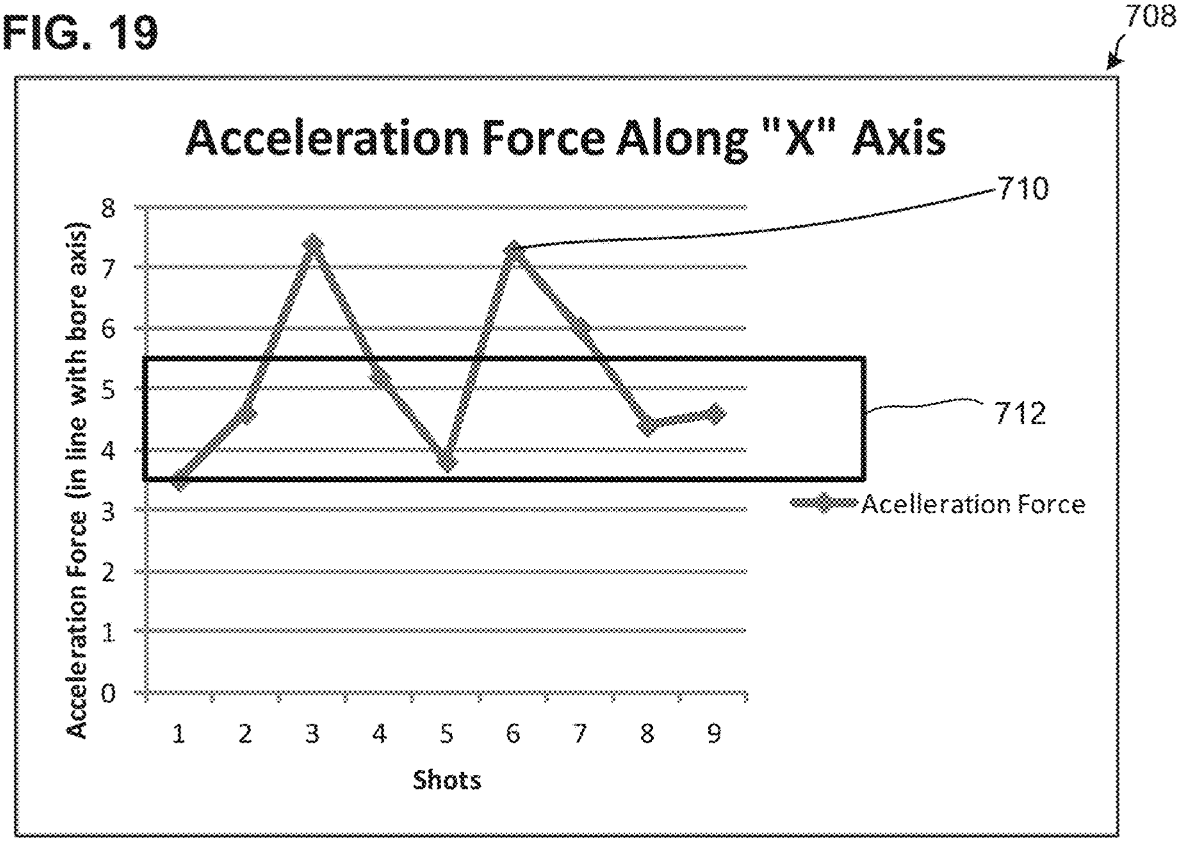
FIG. 19 illustrates a graph of acceleration force of a host weapon.
Figure 20:
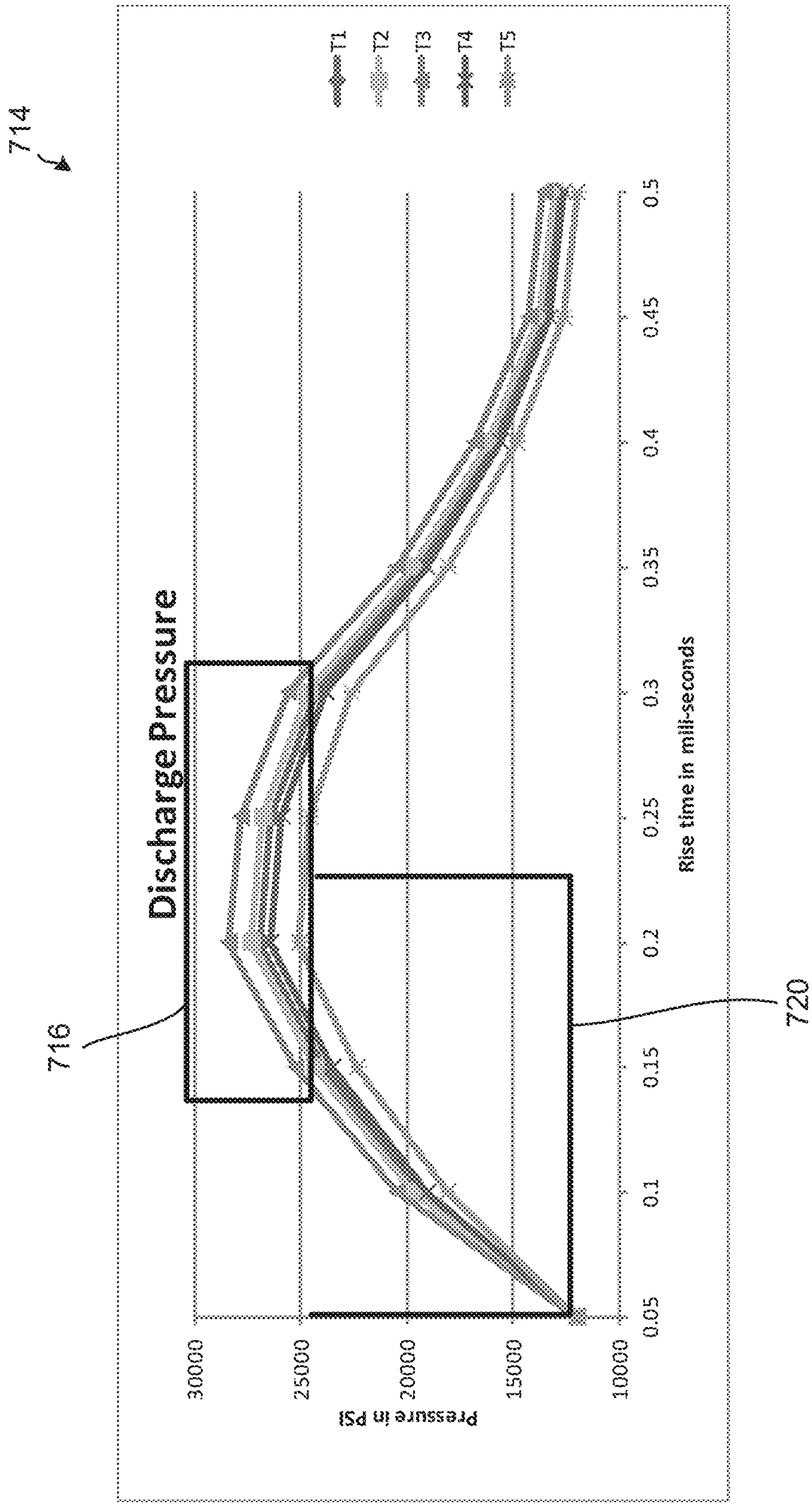
FIG. 20 illustrates a graph of discharge pressures of a host weapon.

With reference to FIGS. 18-20, example determination processes of host weapon behavior and scenarios based on sensory inputs (e.g., from sensor array 202) are described. In embodiments, the example determination processes may be performed by at least one processor of an ESU (e.g., CPU 208), and may be used to determine host weapon behavior in one or more of steps 326 and 342, illustrated in FIG. 9.

FIG. 18 illustrates a graph 702 of pressure of a host weapon that is detected by an ESU. The pressure may be detected based on, for example, a barometer of the sensor array 202 of the ESU. As illustrated in FIG. 18, a maximum pressure 704 that is measured may be used to determine an individual discharge event of the host weapon. For illustrative purposes, the measured maximum pressure 704 illustrated in FIG. 18 corresponds to the discharge of an over-pressured round.

In embodiments, the pressure measured by the ESU may be, for example, ambient pressure near the host weapon, muzzle pressure as gases exit the barrel or suppressor of the host weapon, or chamber pressure released from the chamber of the host weapon when the chamber opens and a shell ejects from the chamber. The pressure that is measured may depend on the mounting application of the ESU. For example, in a case where an ESU of the present disclosure is mounted to a front rail of a weapon, but not adjacent to where gases are expelled from the front end of the weapon (e.g. when the weapon uses a suppressor or a muzzle blast shield), the ESU may measure an impact of the muzzle pressure on ambient pressure near the weapon (e.g. a change of ambient pressure). In a case where an ESU of the present disclosure is mounted to a front accessory rail of a handgun, having no suppressor attached, the ESU may be adjacent to the muzzle and measure muzzle pressure. In a case where the ESU is mounted near the breach of a weapon, the ESU may measure the chamber pressure released from the chamber when the chamber opens. In embodiments, the at least one processor of the ESU may apply a data boundary 706 with respect to the pressure measured to determine a specific event of the host weapon. For example, the at least one processor may compare the maximum pressure 704 with the data boundary 706 to determine the specific event. The boundaries of the data boundary 706 may be a standard deviation (SD) obtained by the at least one processor from an average of pressure readings obtained by the at least one processor. In an embodiment, the average of the pressure readings may be an average maximum pressure of the pressure readings, or another average of the pressure readings. In embodiments, the data boundary 706 may be set to correspond to, for example, a normal discharge. Accordingly, when the maximum pressure 704 is within the data boundary 706, the at least one processor may determine the specific event to be a normal discharge. According to embodiments, sound may be measured by the ESU using a sound sensor (e.g. audio sensor 1006), and the determinations that are described above and performed based on pressure, may be similarly performed based on sound and a data boundary.

The pressure (or sound) readings, for obtaining the average and the SD, may be obtained wholly or partly from the data from one or more sensors (e.g., sensory array 202) included in the ESU. Alternatively or additionally, one or more of the pressure (or sound) readings may be provided to the ESU from an external source (e.g., data storage 220, or another ESU) via communication. The ESU may store information indicating the data boundary 706, the average, and the SD in memory of the ESU. The ESU may further update the data boundary 706 by updating the average and the SD based on new pressure (or sound) readings obtained.

Using a SD from the average pressure (or sound) readings allows for the establishment of standard operating pressures (or sounds) for the host weapon and the specific ammunition being fired. Utilizing onboard memory and/or organizational data with respect to the ESU to store pressure (or sound) readings obtained by the ESU, enables the ESU to increase scenario detection accuracy as a larger sample size of pressure (or sound) readings is obtained, which refines the operating parameters for the weapon/ammo selection of the host organization within their normal operating environment.

In embodiments, the pressure measured (e.g. maximum pressure 704) may be measured as a change in pressure, and the data boundaries obtained (e.g. data boundary 706) may be based on a change in pressure. For example, the average and the SD of the data boundary may indicate an average change of pressure and a standard deviation of the change of pressure, respectively. In an embodiment, the at least one processor of the ESU may determine that an exceptional situation (e.g., squib load, over-pressured ammunition, proof round, etc.) occurred, with respect to the host weapon, when the maximum pressure 704 obtained is outside the data boundary 706. That is, for example, the maximum pressure 704 is beyond the SD in either positive or negative direction. In the example illustrated in FIG. 18, the ESU may determine that over-pressured ammunition (e.g +P+ ammunition or a proof round) is fired from the host weapon due to the maximum pressure 704 being above the data boundary 706. In a case, where the maximum pressure 704 is within the data boundary 706, the ESU may determine that a standard firing situation occurred. In a case where the maximum pressure 704 is below the data boundary 706, the ESU may determine, for example, that a squib load occurred, or that no round was fired. According to embodiments, sound may be measured by the ESU using a sound sensor (e.g. audio sensor 1006), and the determinations that are described above and performed based on pressure, may be similarly performed based on sound.

In embodiments, the ESU may alternatively or additionally determine a rise-time associated with pressure detected (e.g. ambient pressure near the host weapon, muzzle pressure as gases exit the barrel or suppressor of the host weapon, or chamber pressure released from the chamber of the host weapon when the chamber opens and a shell ejects from the chamber), which the ESU may use to determine the scenario associated with the host weapon. For example, the ESU may determine that the host weapon dropped into a body of water based on a slow pressure increase below the data boundary 706 (e.g. a long rise time), or that a squib load occurred when a fast pressure increase occurs below the data boundary 706 (e.g. a short rise time). In the present disclosure, rise time refers to an amount of time it takes for a characteristic (e.g. pressure, velocity, acceleration, force) to reach a specified level. According to embodiments, sound may be measured by the ESU using a sound sensor (e.g. audio sensor 1006), and event determinations may be performed based on a rise time of the measured sound.

In embodiments, the ESU may record the scenario or event determined in memory and report the scenario or event to external sources (e.g., data storage 220 or third party dispatch system 221). In some embodiments, the ESU may determine whether a notification should be made, and which type of notification the ESU is to be made to the external sources, based on sensory input from other sensors in addition to the pressure sensor. In an example, a notification may indicate escalation is needed (e.g., possible injured officer due to a firearms failure, etc.).

In embodiments, pressure data from the pressure sensor of the ESU may also be used by the at least one processor of the ESU to determine its altitude, air density as a part of ballistic trajectory calculation, etc. The altitude and air density data, alongside other data obtained by the ESU, may be provided to, for example, a third party dispatch system for reporting and forensics analysis. The air density, altitude, combined distance, and weapon orientation data may also be used by the at least one processor of the ESU, or other processors, to determine target point of aim corrections.

FIG. 19 illustrates a graph 708 of acceleration of a host weapon, along a single axis, that is detected by an ESU. The acceleration may be detected based on, for example, an accelerometer of the sensor array 202 of the ESU. As illustrated in FIG. 19, a maximum acceleration (e.g., maximum acceleration 710) may be used to determine a scenario occurring. For example, based on the accelerations detected, the ESU may determine recoil of the host weapon under discharge, as well as forces enacted by manual manipulation of the host weapon, or environmentally imparted forces (e.g., dropped weapon, etc.), which allow for a wide variety of scenario identification.

In embodiments, the at least one processor of the ESU may apply a data boundary 712 with respect to the acceleration measured to determine a specific event of the host weapon. For example, the at least one processor may compare the maximum acceleration 710 with the data boundary 712 to determine the specific event. The boundaries of the data boundary 712 may be a standard deviation (SD) obtained by the at least one processor from an average of acceleration readings obtained by the at least one processor. In an embodiment, the average of the acceleration readings may be, for example, an average maximum acceleration of the acceleration readings, or any other average of the acceleration readings.

The acceleration readings, for obtaining the average and the SD, may be obtained wholly or partly from the data from one or more sensors (e.g., sensory array 202) included in the ESU. Alternatively or additionally, one or more of the acceleration readings may be provided to the ESU from an external source (e.g., data storage 220 or another ESU) via communication. The ESU may store information indicating the data boundary 712, the average, and the SD in memory of the ESU. The ESU may further update the data boundary 712 by updating the average and the SD based on new acceleration readings obtained.

Using a SD from the average acceleration readings for the specific axis, allows for the establishment of standard operating force levels for the host weapon and the specific ammunition being fired under specific conditions. Utilizing onboard memory and/or organizational data with respect to the ESU to store acceleration readings obtained by the ESU, enables the ESU to increase scenario detection accuracy as a larger sample size of acceleration readings is obtained, which refines the operating parameters for the weapon/ammo selection of the host organization within their normal operating environment.

In an embodiment, the at least one processor of the ESU may determine that an exceptional situation (e.g., squib load, over-pressured ammunition, weapon drop, etc.) occurred, with respect to the host weapon, when the maximum acceleration 710 obtained is outside the data boundary 712. That is, for example, the maximum acceleration 710 is beyond the SD in either positive or negative direction. In the example illustrated in FIG. 19, the ESU may determine that over-pressured ammunition is fired from the host weapon due to the maximum pressure 710 being above the data boundary 712. In a case, where the maximum acceleration 710 is within the data boundary 712, the ESU may determine that a standard situation occurred.

In embodiments, the ESU may record the scenario or event determined in memory and report the scenario or event to external sources (e.g., data storage 220 or third party dispatch system 221). In some embodiments, the ESU may determine whether a notification should be made, and which type of notification the ESU is to be made to the external sources, based on sensory input from other sensors in addition to the acceleration sensor. In an example, a notification may indicate escalation is needed (e.g., Officer no longer in control of weapon, weapon malfunction/possibly injured officer, etc.). In some embodiments, the ESU may perform the determination referenced with respect to FIG. 19, by detecting force or velocity, rather than acceleration.

With reference to FIG. 20, further aspects of pressure detection and event determination is described below. FIG. 20 illustrates a graph 714 of five example pressure profiles (T1-T5) of pressure of a host weapon that is detected by an ESU. Each of the pressure profiles representing a difference weapon discharge.

In embodiments, the at least one processor of the ESU may apply a data boundary 716 with respect to the pressures (or sound) measured to determine a specific event of the host weapon for each of the discharges. The data boundary 716 may be generated in a same or similar way as the manner in which data boundary 706, illustrated in FIG. 18, is generated. For example, the boundaries of the data boundary 716 may be a standard deviation (SD) of the average maximum pressure measured over several discharges, such as the discharges indicated in pressure (or sound) profiles T1-T5, obtained by the at least one processor from such pressure (or sound) readings.

Utilizing an SD for the average maximum pressure (or sound) measured over several discharges, such as the discharges indicated in pressure profiles T1-T5, allows for the establishment of standard operating discharge pressure (or sound) level boundaries, indicated by data boundary 716, for the host weapon and the specific ammunition being fired under specific conditions. Utilizing onboard memory and/or organizational data with respect to the ESU to store pressure (or sound) readings obtained by the ESU, enables the ESU to increase scenario detection accuracy as a larger sample size of pressure (or sound) readings is obtained, which refines the operating parameters for the weapon/ammo selection of the host organization within their normal operating environment.

In embodiments, the ESU may alternatively or additionally determine a rise-time 720 associated with each of the pressures (or sounds) detected, which the ESU may use to determine the scenarios associated with the host weapon. For example, the ESU may determine that the host weapon dropped into a body of water based on a slow pressure increase below the data boundary 716 (long rise time), or that a squib load occurred when a fast pressure increase occurs below the data boundary 716 (short rise time).

Figure 21:
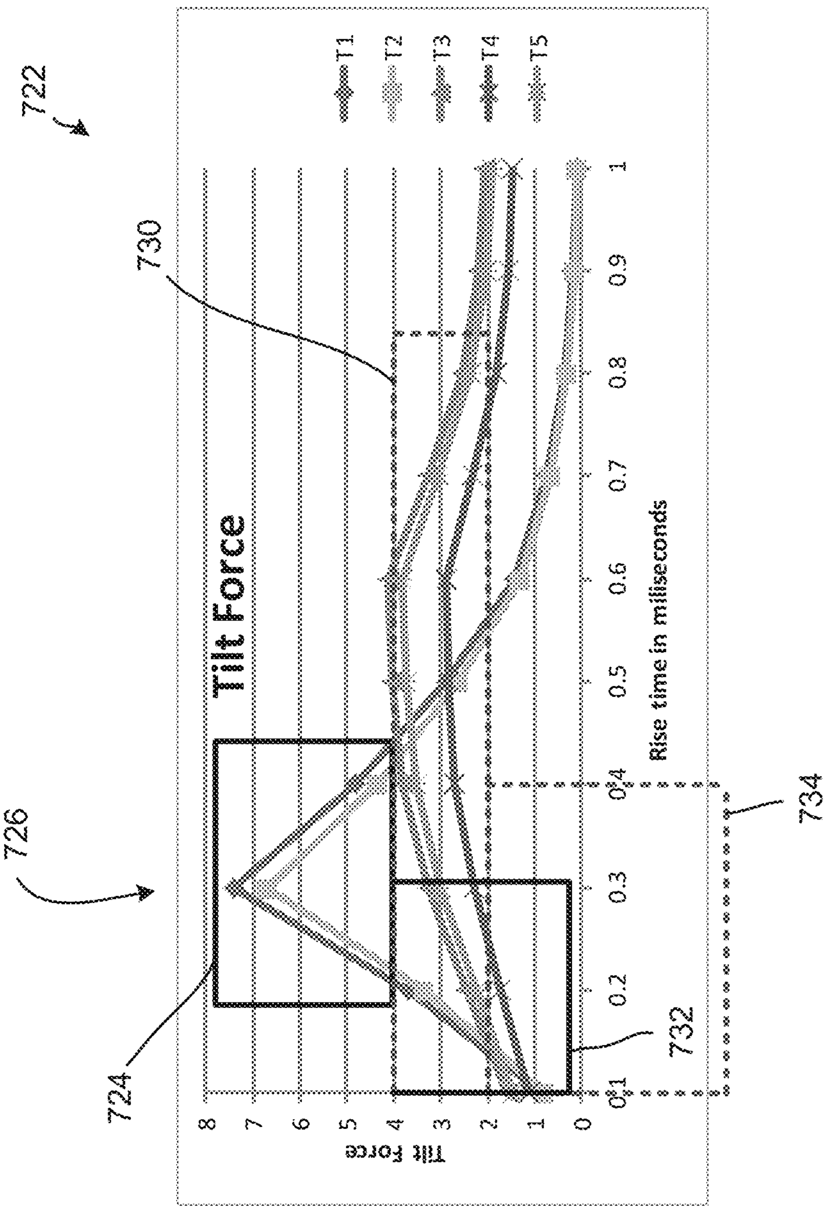
FIG. 21 illustrates a graph of tilt forces of a host weapon.

With reference to FIG. 21, further aspects of acceleration detection and event determination is described below. FIG. 21 illustrates a graph 722 of five example profiles (T1-T5) of tilt force of a host weapon that is detected by an ESU. Each of the tilt force profiles representing a different rotation force instance. In an embodiment, the tilt force measured may refer to acceleration ($m/s^2$) in the tilt direction, velocity (m/s) in the tilt direction, or by force (e.g., Newtons) applied in the tilt direction.

As illustrated in FIG. 21, maximum tilt forces of each of the profiles may be used to determine a scenario occurring with respect to each of the profiles. For example, based on the tilt forces detected, the ESU may determine recoil of the host weapon under discharge, as well as forces enacted by manual manipulation of the host weapon, or environmentally imparted forces (e.g., dropped weapon, etc.), which allow for a wide variety of scenario identification.

In embodiments, the at least one processor of the ESU may apply one or more data boundaries with respect to the tilt force measured to determine a specific event of the host weapon for each of the rotation force instances. For example, as illustrated in FIG. 21, the at least one processor may apply a data boundary 724 and a data boundary 730. The data boundaries 724 and 730 may be generated in a same or similar way as the manner in which data boundary 710, illustrated in FIG. 19, is generated. For example, the boundaries of the data boundaries 724 and 730 may each be a standard deviation (SD) of the average tilt force (e.g., average acceleration or force) or average maximum tilt force measured over respective sets of rotation force instances. In an embodiment, data boundary 724 may be generated based on a set of rotation force instances, based on such instances corresponding to a first specified event (e.g., weapon discharge), and the data boundary 730 may be generated based on a second set of rotation force instances, based on such instances corresponding to a second specified event (e.g., manual slide manipulation).

In embodiments, the at least one processor of the ESU may determine that the first specified event (e.g., weapon discharge) occurred with respect to a profile, when the maximum tilt force of the profile is within the data boundary 724. For example, as illustrated in FIG. 21, the at least one processor may determine that a weapon discharged occurred with respect to profile T1 because the maximum tilt force 726 of profile T1 is within the data boundary 726. In an embodiment, the at least one processor may alternatively determine that the weapon discharged occurred based on the maximum tilt force being above a data boundary, such as data boundary 730.

In embodiments, the at least one processor of the ESU may determine that the second specified event (e.g., manual slide manipulation) occurred with respect to a profile, when the maximum tilt force of the profile is within the data boundary 730. For example, as illustrated in FIG. 21, the at least one processor may determine that the second specified event (e.g., manual slide manipulation) occurred with respect to profiles T3-T5 because the maximum tilt force of such profiles are within the data boundary 730.

Using a SD for the average maximum rotational force, velocity, or acceleration measured over several discharges allows for the establishment of standard operating rotational force level boundaries, indicated by data boundaries 724 and 730 illustrated in FIG. 21, for the host weapon and the specific ammunition being fired under specific conditions. Utilizing onboard memory and/or organizational data with respect to the ESU to store acceleration readings obtained by the ESU, enables the ESU to increase scenario detection accuracy as a larger sample size of acceleration readings is obtained, which refines the operating parameters for the weapon/ammo selection of the host organization within their normal operating environment.

In embodiments, the ESU may record the scenario or event determined in memory and report the scenario or event to external sources (e.g., data storage 220 or third party dispatch system 221). In some embodiments, the ESU may determine whether a notification should be made, and which type of notification the ESU is to be made to the external sources, based on sensory input from other sensors in addition to the acceleration sensor. In an example, a notification may indicate escalation is needed (e.g., Officer no longer in control of weapon, weapon malfunction/possibly injured officer, etc.).

In embodiments, the ESU may alternatively or additionally determine rise times associated with each of the tilt forces detected, which the ESU may use to determine the scenarios associated with the host weapon. In an embodiment, a rise time 732 to data boundary 724 may be determined for the profiles which include a maximum tilt force within the data boundary 724, and a rise time 734 to data boundary 730 may be determined for the profiles which include a maximum tilt force within the data boundary 730. In the embodiment, the at least one processor may determine a scenario or event that occurred with respect to a profile, based on a rise time(s) and a data boundary(s).

The use of rise times (e.g., rise times 732 and 734) in combination with standard operating force levels (e.g., data boundaries 724 and 730) for certain scenarios allow for consistent and high accuracy determination of the scenarios (e.g., normal discharge versus manual slide manipulation).

Figure 22:
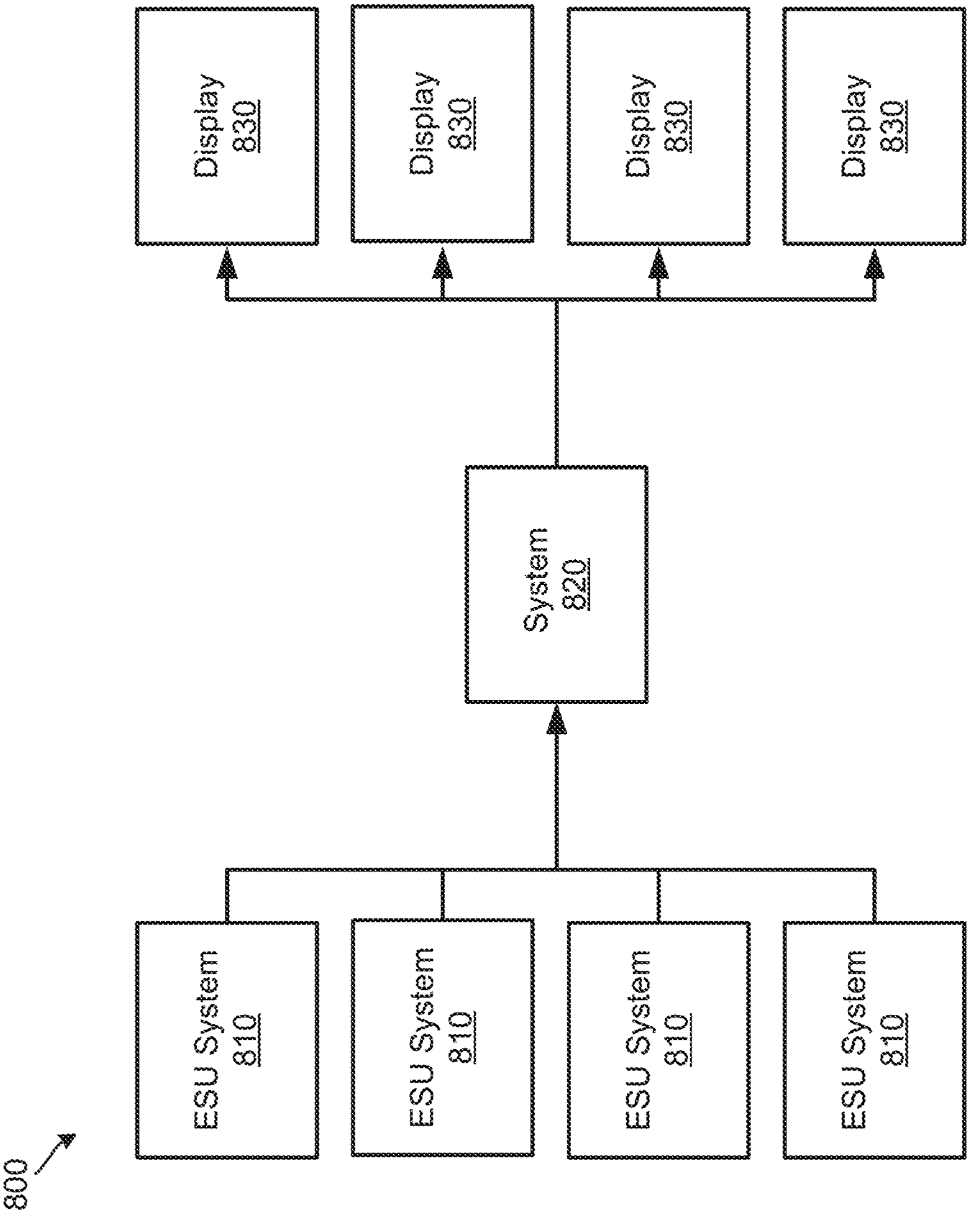
FIG. 22 illustrates a system of an embodiment.

With reference to FIG. 22, a system 800 of an embodiment is described.

System 800 may include one or more ESU systems 810, a system 820, and one or more displays 830.

The ESU systems 810 may each be, for example, a respective ESU system 201 illustrated in FIG. 6. The ESU systems 810 may each be associated with a respective host weapon, and may send their respectively obtained sensor data and/or notifications that indicate, for example, weapon events or situations, to the system 820. In embodiments, ESU systems 810 may track (via sensors and at least one processor of the ESU systems) and record (via at least one storage) weapon movement history, GPS locations of the weapon or user of the weapon, and weapon cardinal directions. Accordingly, the ESU systems (e.g. ESU systems 810) of the present disclosure may track weapon history and create a digital footprint of an incident by recording, for example, location, bearing, grid, and azimuth when a weapon is fired. In embodiments, when an ESU system 810 detects that a host weapon is unholstered, the ESU system 810 may automatically start relaying sensor data (e.g. GPS data, compass data, microphone data, gyro/incline data, accelerometer data, barometric data, data from external sources) and/or weapon state information to the system 820 in real-time or near-real time.

The system 820 may comprise a data storage implemented by, for example, the storage 220 illustrated in FIG. 6. The data storage of the system 820 may be configured to obtain the sensor data (e.g. GPS data, compass data, microphone data, gyro/incline data, accelerometer data, barometric data, data from external sources) and/or weapon state information from the ESU systems 810. In embodiments, the system 820 may also comprise at least one processor and memory storing computer code configured to, when performed by the at least one processor, cause the at least one processor to perform processing functions of the system 820. In embodiments, one or more processors of the system 820 may obtain at least a part of the sensor data (e.g. GPS data, compass data, microphone data, gyro/incline data, accelerometer data, barometric data, data from external sources) and/or weapon state information stored in the data storage of the system 820, and cause displays 830 to display images based on the sensor data and weapon state information received.

The system 820 may include, for example, a third party dispatch system such as third party dispatch system 221 illustrated in FIG. 6. In embodiments, the system 820 may process the sensor data and/or notifications received from the ESU systems 810, and cause one or more of the displays 830 to display an image based on the processed sensor data and/or notifications. For example, the system 820 may be configured to process the sensor data and/or the weapon state information so as to generate a 2D or 3D image that is a virtual representation of an incident and that displays one or more locations, orientations, and weapon states of the ESUs of the ESU systems 810, populate a digital report (e.g. an after action report relating to department and/or legal administrative paperwork for an event), and/or obtain institutional logistics involving the number of discharges of a host weapon and associated maintenance needs of the host weapon. In an embodiment, the system 820 may be configured to cause the displays 830 to display one or more of the 2D or 3D image, the digital report, or the institutional logistics. In a case where the 2D or 3D image is provided, the 2D or 3D image may be displayed in real-time or near real-time so as to allow a situation to be evaluated in real time by, for example, dispatch and responders so as to enable tactics to be appropriately adjusted to ensure the best possible outcome. Alternatively, the 2D or 3D image may be displayed and analyzed after the situation for post event forensics, public safety statements, legal proceedings, or training purposes.

In an embodiment of the present disclosure, the system 820 may receive and process a part or all of the data obtained by the ESU systems 810. In an embodiment, as an alternative to the ESU systems 810 performing one or more of the analysis/interpretation steps 326 and 342 that are illustrated in FIG. 9, the system 820 may receive the sensor data (e.g. GPS data, compass data, microphone data, gyro/incline data, accelerometer data, barometric data, data from external sources) from the ESU systems 820 and perform one or more of the analysis/interpretation steps 326 and 342.

The displays 830 may each be a respective digital display that is configured to display the images. Each of the displays 830 may be, for example, a mobile phone display, computing tablet display, personal computer display, head mounted display for virtual reality or augmented reality applications, etc. As an example, one or more of displays 830 may be associated with a law enforcement officer, or provided within a respective vehicle of a law enforcement officer. In embodiments, one or more of the displays 830 may be provided in respective ESU systems 810. In embodiments, the individuals, that are associated with the displays 830, may also be the individuals that use the ESU systems 810. In embodiments, one or more of the displays 830 may be integrated with one or more of the processors of the system 820.

Figure 23:
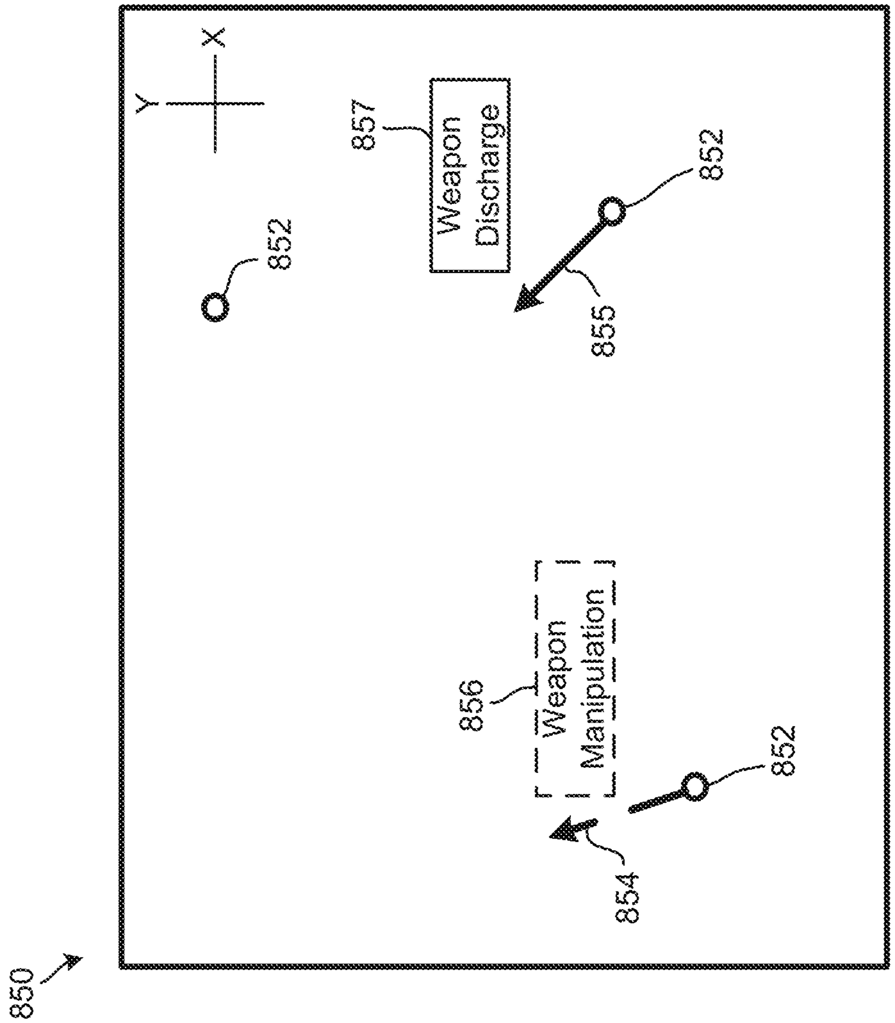
FIG. 23 illustrates a display of an embodiment.
Figure 24:
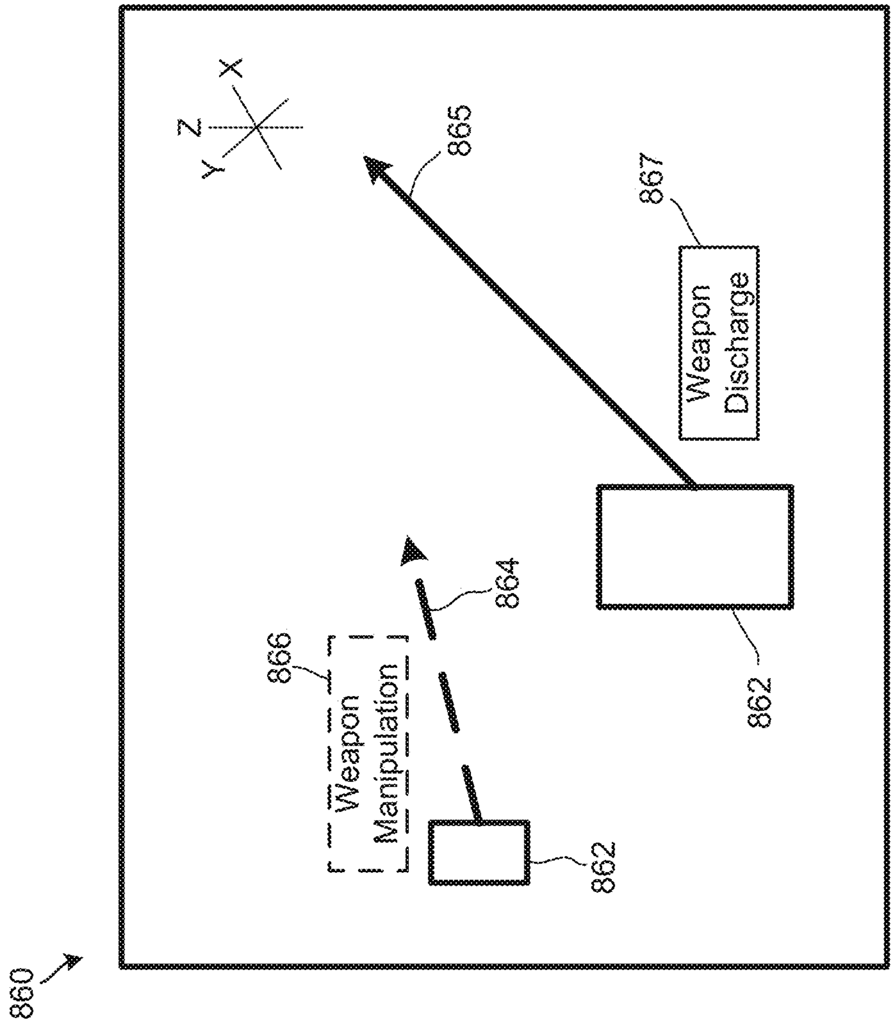
FIG. 24 illustrates a display of an embodiment.

FIGS. 23-24 illustrate example displays that the system 820 may cause the displays 830 to display, based on sensor data and scenario identification provided by one or more of the ESU Systems 810 and/or based on the processing by the system 820.

As illustrated in FIG. 23, a display 850 may be provided. The display 850 may include a plurality of user elements 852 overlaid on an image of a two-dimensional map. The user elements 852 may each correspond to a respective user of one of the ESU systems 810. The system 820 may cause the user elements 852 to be positioned in locations on the map, corresponding to the positions of the users of the ESU systems 810, based on the location data retrieved by the system 820 from the ESU systems 810. For example, the location data may be GPS data from a GPS of a sensor array of the ESU.

The display 850 may further include one or more of weapon direction elements 854 and 855. The weapon direction elements 854 and 855 may be graphics indicating an orientation (e.g., muzzle direction) of host weapons associated with the ESU systems 810. The weapon direction elements 854 and 855 may each extend from a corresponding user element 852 that indicates the user of the host weapon with the ESU system 810. The system 820 may cause the weapon direction elements 854 and 855 to be positioned based on, for example, the location data (e.g., GPS data) and orientation data of the host weapons (e.g., compass, accelerometer, gyroscopic, inclination data) retrieved by the system 820 from the ESU systems 810. In other words, the system 820 may cause the weapon direction elements 854 and 855 to indicate a direction in which host weapons are pointed.

In an embodiment, the system 820 may cause the weapon direction elements 854 and 855 to be displayed in a particular manner (e.g., specified line type, line color, line thickness) based on a notification, received by the system 820 from an ESU system 810, indicating a particular event or situation of the corresponding host weapon.

For example, as illustrated in FIG. 22, the weapon direction element 854 may be displayed in a broken line based on the indicated particular event of the corresponding host weapon being “weapon manipulation,” and the weapon direction element 855 may be a solid line when the indicated particular event of the corresponding host weapon is “weapon discharge.” Additionally, the system 820 may cause, for example, no weapon direction element 854 and

855 to be displayed with a user element 852 in certain situations where orientation of a host weapon is not needed to be known. For example, no weapon direction element 854 and 855 may be displayed when the corresponding host weapon is holstered, and may be displayed in response to the host weapon being unholstered or another event (e.g., weapon discharge).

The system 820 may also cause any number of notifications, such as notifications 856 and 857 to be displayed, based on the notifications retrieved by the system 820 from the ESU systems 810. In an embodiment, the notifications may indicate any of the events and situations of corresponding host weapons that may be determined to occur by the ESU systems 810. The system 820 may cause the notifications to be displayed in a particular manner (e.g., specified line type, line color, line thickness, fill color, fill pattern) based on a notification to be indicated. For example, the display 850 may include a notification 856 that includes text and a broken line shape to indicate a weapon manipulation of a correspond host weapon, and the display 850 may include a notification 857 with text and a closed-line shape to indicate a weapon discharge.

As illustrated in FIG. 24, a display 860 may be provided. The display 860 may be similar to display 850, except that users' elements, weapon direction elements, and notifications are overlaid on an image of a three-dimensional map, and have three-dimensional characteristics.

For example, the display includes user elements 862 that may be similar to user elements 852, but are elements represented in 3D space. The display 860 may also include weapon direction elements 864 and 865 that are similar to weapon direction elements 854 and 855, but are elements oriented in 3D space. The display 860 may further include notification elements such as notification elements 866 and 867 that are similar to notification elements 856 and 857, but are elements positioned in 3D space.

In some embodiments, the system 820 may cause 3D environment recreation to be displayed on the displays 830, based on either video feed or frame based images being received from cameras of the ESU systems 810 and processed by the system 820.

With reference to FIGS. 25-31, an example configuration 900 of the system 800 is described.

Figure 25:
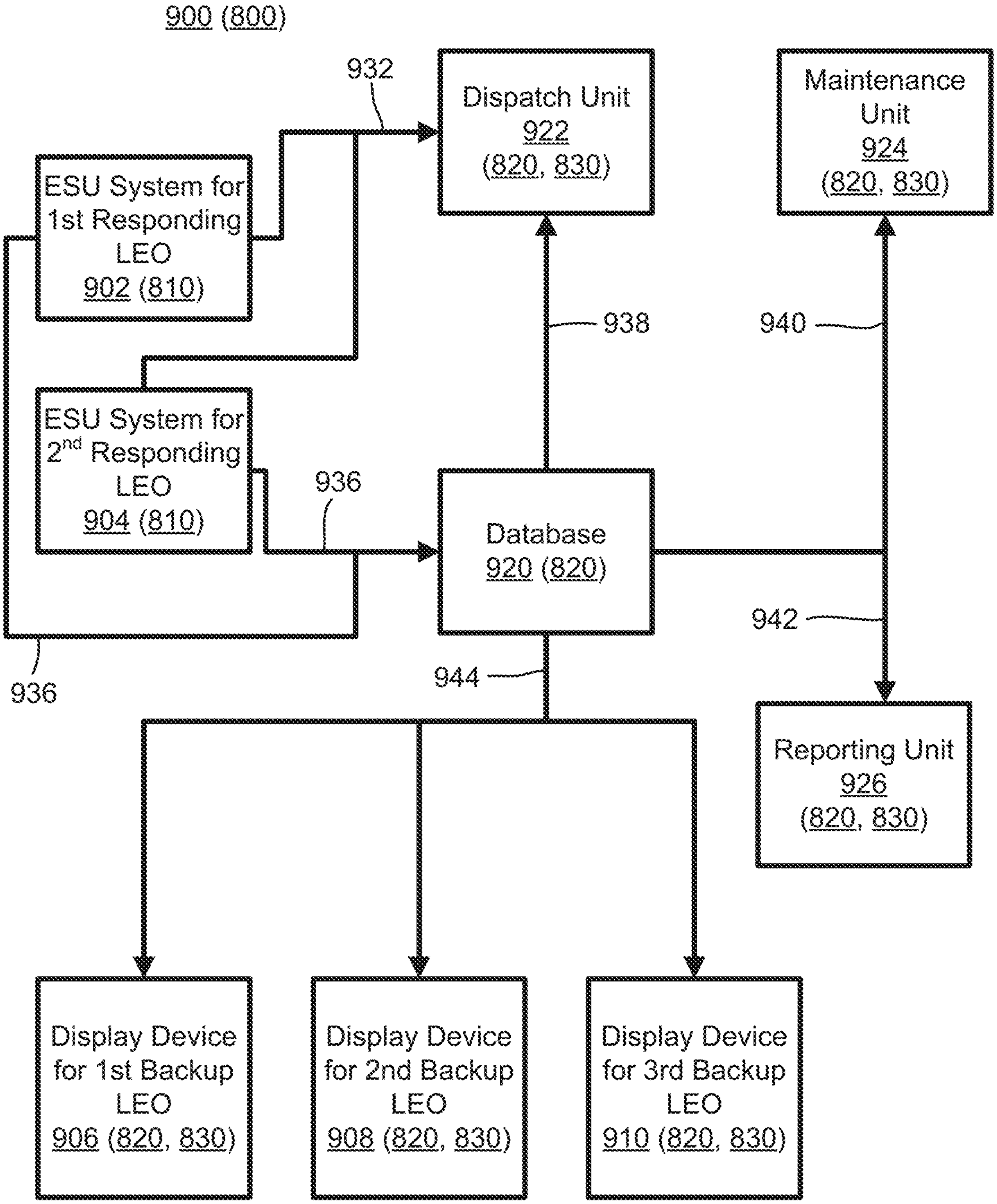
FIG. 25 illustrates an example configuration of the system of FIG. 22.

As illustrated in FIG. 25, the configuration 900 may include a plurality of ESU systems 810. For example, as one or more of the ESU systems 810, the configuration 900 may include an ESU system 902 for a first responding LEO and an ESU system 904 for a second responding LEO. In embodiments, the ESU systems 810 may each include one or more processors and storages to record and track locations, orientations, and weapons states of a respective host weapon of a respective individual. Here, the individuals are LEOs as an example. The ESU systems 810, as described further below, may also include digital displays.

The configuration 900 may further include the system 820 as a decentralized processing system. As an example, the system 820 may comprise a database 920, one or more processors and memory of a dispatch unit 922, one or more processors and memory of a maintenance unit 924, one or more processors and memory of a reporting unit 926, and one or more processors and memory of each of display devices 906, 908, and 910. The memory of the dispatch unit 922, the maintenance unit 924, the reporting unit 926, and of each of devices 906, 908, and 910 may each comprise computer instructions configured to cause the corresponding unit to perform its functions. In embodiments, one or more of the dispatch unit 922, the maintenance unit 924, and the reporting unit 926 may be implemented by the same one or more processors and memory so as to be integrated together. The database 920 may correspond to the data storage 220 illustrated in FIG. 6. The dispatch unit 922 may correspond to the third party dispatch system 221 illustrated in FIG. 6.

The configuration 900 may further include a plurality of the displays 830. As an example, with reference to FIG. 25, each of the dispatch unit 922, the maintenance unit 924, and the reporting unit 926 may include a respective digital display so as to each function as a respective component of the system 820 and also as a respective display 830. In embodiments, one or more of the dispatch unit 922, the maintenance unit 924, and the reporting unit 926 may be integrated together as a same component of the system 820 and also as a same display 830. The configuration 900 may also include the display device 906 for a first backup LEO, display device 908 for a second backup LEO, and a display device 910 for a third backup LEO, etc. The display devices 906, 908, and 910 may each function as a respective display 830 and also as a respective component of the system 820.

In embodiments, the backup LEOs may refer to LEOs that are not actively engaged in an event in which the responding LEOs are engaged. According to embodiments, the responding LEOs may have their weapons drawn and may be broadcasting event data therefore, and the backup LEOs may be notified that the event has occurred (possibly in their vicinity), typically while the backup LEOs weapons are still holstered. According to embodiments, the system 820 may include software that includes a rule that only pushes notifications (e.g. event notification) to, for example, a display device (e.g. one of display devices 906, 908, or 910) or any other device (e.g. a communication device) of each officer within a predetermined distance (e.g. 5 miles) of the event. Officers outside of the predetermined distance can see the notifications (e.g. event notifications) via their display device (e.g. one of display devices 906, 908, or 910) by pulling data by looking at either icons on a map displayed on their display device, or an "Active Event" listing.

The ESU system 902 and the ESU system 904 may be configured to communicate via an API 932 with the dispatch unit 922, and send data via connections 936 to the database 920. The connections 936/932 may be encrypted data connections. In embodiments, all communications, transmissions, and data stored within the configuration 900 may be encrypted due to the nature of the information and custody chain considerations. The dispatch unit 922 via an API 938, the maintenance unit 924 via an API 940, the reporting unit 926 via an API 942, and the display devices 906, 908, and 910 via an API 944 may obtain at least a portion of the stored sensor data (e.g. GPS data, compass data, microphone data, gyro/incline data, accelerometer data, barometric data, data from external sources) and/or weapon state information from the database 920.

Figure 26:
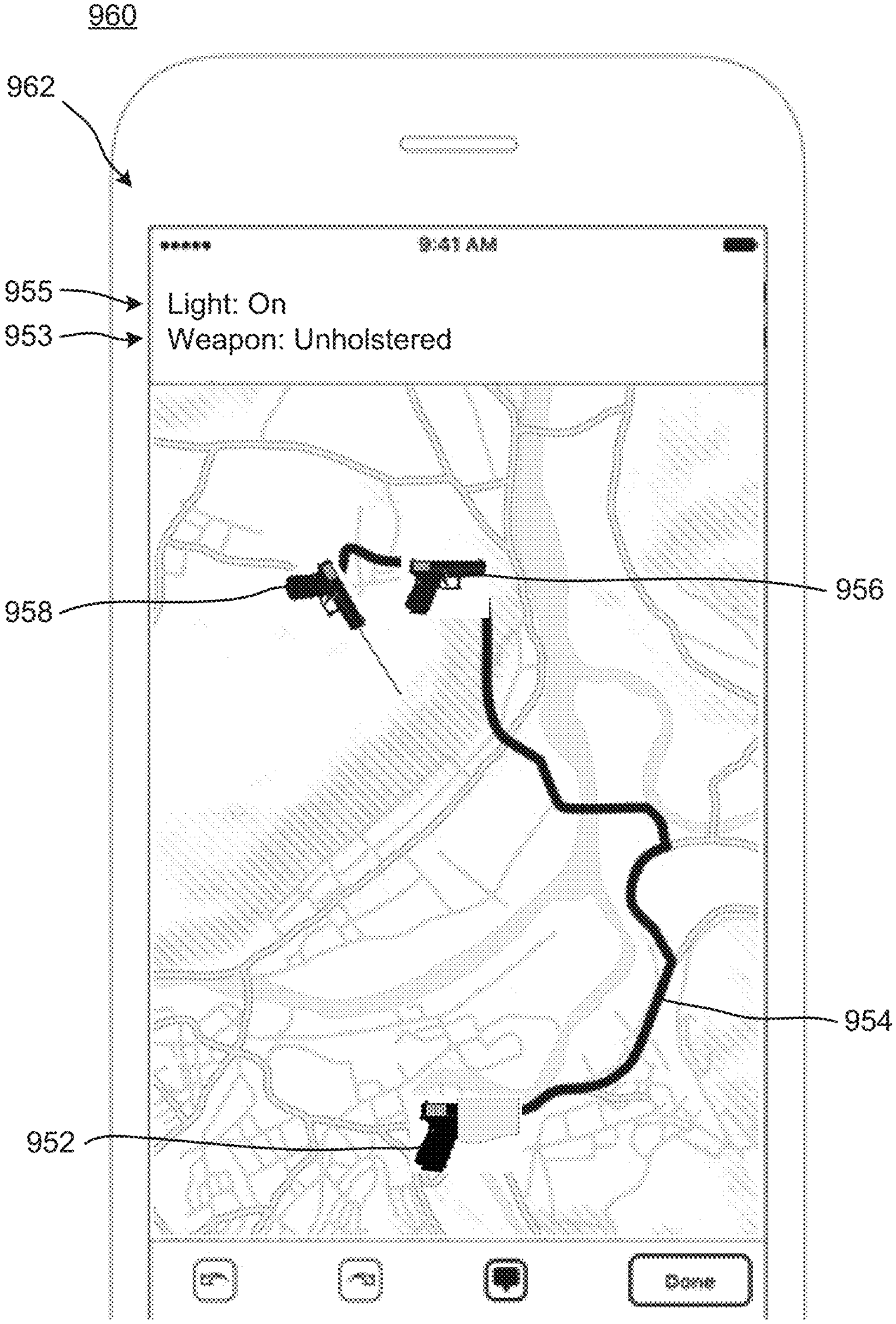
FIG. 26 illustrates a computing device of a first ESU system of the configuration of FIG. 25.

The ESU systems 902 and 904 may be configured to track locations, orientations, and weapons states of a respective host weapon of a respective individual. The ESU systems 902 and 904 may each be configured as the ESU system 201 illustrated in FIG. 6. As illustrated in FIG. 26, the ESU system 902 may also include a computing device 960 with a display 962. The computing device 960 may correspond to the mobile data transmission device 219 illustrated in FIG. 6. A least one processor of the ESU system 902 (e.g. at least one processor of the computing device 960) may be configured to cause the display 962 to display locations, orientations, and weapon states of the host weapon associated with the user of the ESU system 902 in accordance with any of the processes of the present disclosure. For example, the display 960 may be caused to display an identifier(s) 952 indicating a holster state of the host weapon, a path(s) 954 indicating a movement of the ESU of the ESU system 902 (and the corresponding host weapon), an identifier(s) 956 indicating an unholstered state of the host weapon, and an identifier(s) 958 indicating a discharge of the host weapon. The paths and identifiers may be located based on, for example, the location data (e.g., GPS data) obtained by the ESU system 902. The identifiers 956 and 958 may also be orientated, based on orientation data of the host weapon (e.g., accelerometer, gyroscopic, inclination data) from the ESU system 902, to display an orientation of host weapon so as to indicate where the host weapon is pointed or discharged. The display 962 may also be caused to display a state 953 of the host weapon (e.g. holstered, unholstered, discharged) and a state 955 of one or more secondary functions of the ESU (e.g. light on or off) of the ESU system 902 based on sensor data of the ESU system 902 and weapon state determination by the ESU system 902.

Figure 27:
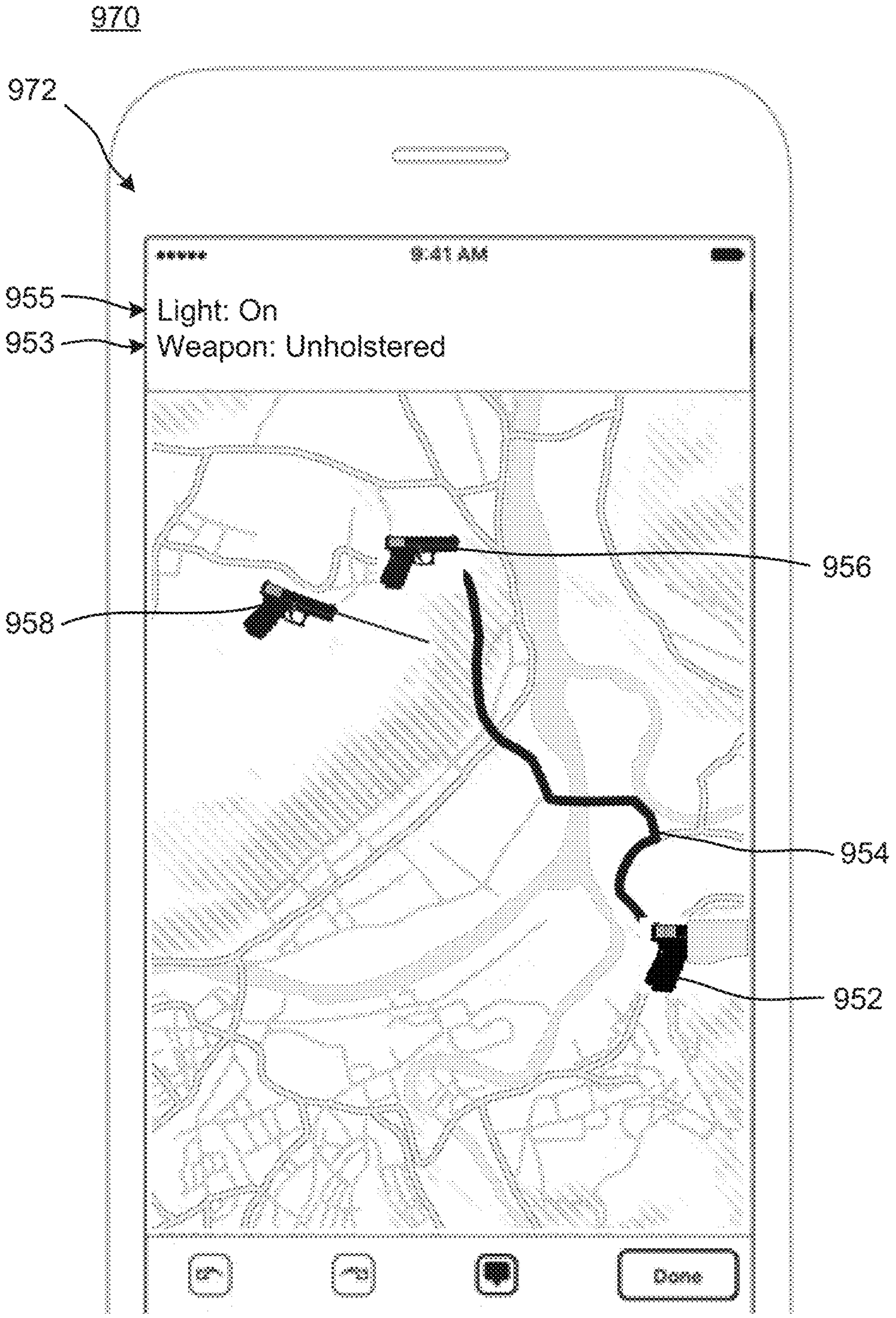
FIG. 27 illustrates a computing device of a second ESU system of the configuration of FIG. 25.

Similarly, as illustrated in FIG. 27, the ESU system 904 may include a computing device 970 with a display 972, in which at least one processor of the ESU system 904 (e.g. at least one processor of the computing device 970) may be configured to cause to display locations, orientations, and weapon states of the host weapon associated with the user of the ESU system 904 in accordance with any of the processes of the present disclosure. That is, identifiers 952, 956, and 958 and a path(s) 954 may also be displayed based on determinations by at least one processor of the ESU system 904. The display 970 may also be caused to display a state 953 of the host weapon (e.g. holstered, unholstered, discharged) and a state 955 of one or more secondary functions of the ESU (e.g. light on or off) of the ESU system 904. In an embodiment, the computing device 970 may correspond to the mobile data transmission device 219 illustrated in FIG. 6.

Sensor data obtained by the ESUs of the ESU systems 902 and 904 and analytical information (e.g. weapon states) obtained therefrom by the ESUs of the ESU systems 902 and 904 to track, for example, locations, orientations, and weapon states of the corresponding host weapons may be sent by the ESU systems 902 and 904 to the database 920.

Figure 28:
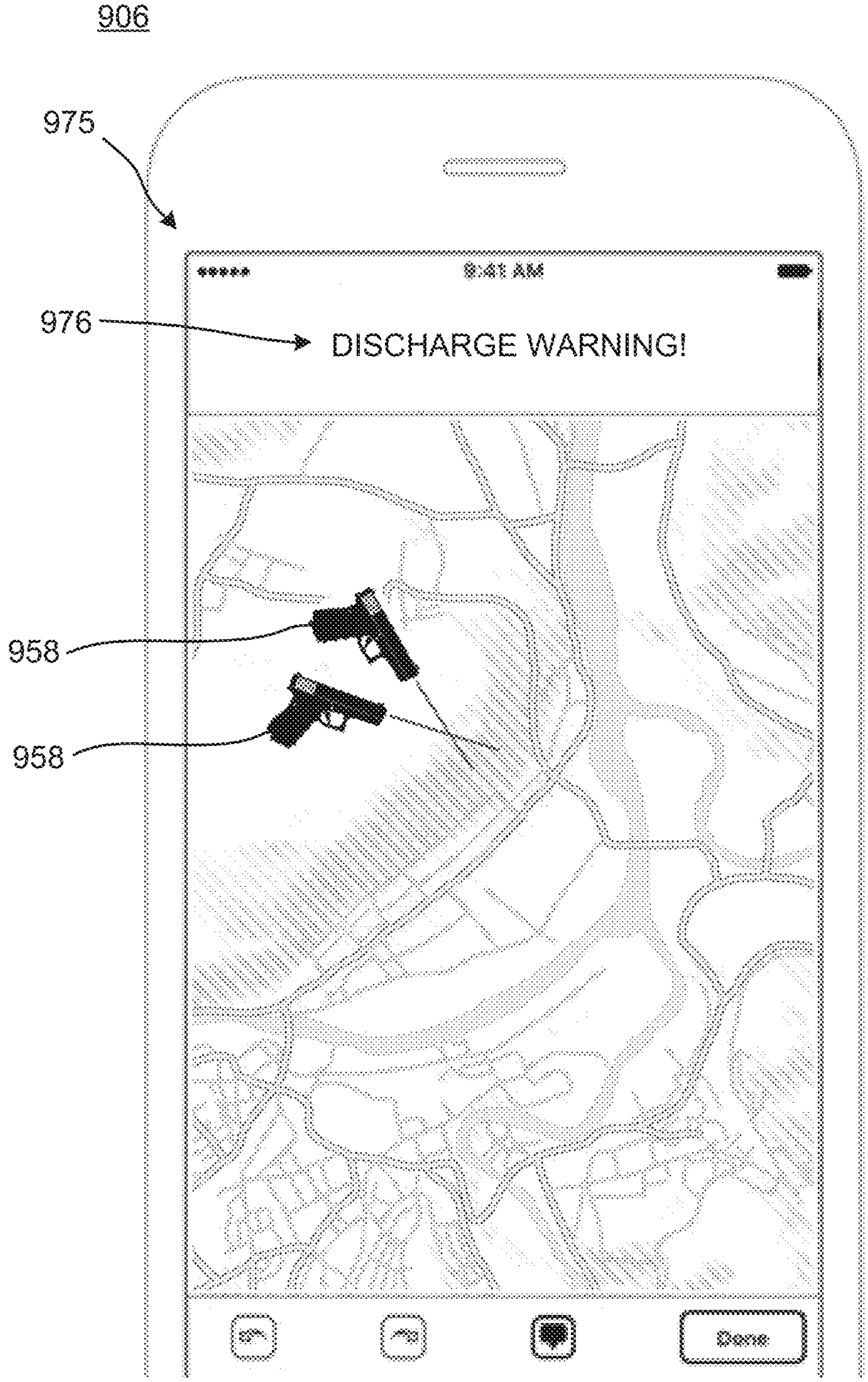
FIG. 28 illustrates a display device of the configuration of FIG. 25.

With reference to FIG. 28, the display device 906 for the first backup LEO may be configured to receive at least a portion of the data received by the database 920 from the ESU systems 902 and 904 and display on a display 975, of the display device 906, one or more locations and orientations of the ESUs of the ESU systems 902 and 904 (and by extension, the corresponding host weapons), and weapon states of the host weapons associated with each ESU of the ESU systems 902 and 904 based on the data obtained (e.g. location data, orientation data, and weapon state information). For example, as illustrated in FIG. 27, the display device may display the identifiers 958, corresponding to respective discharges of the host weapons associated with the ESU systems 902 and 904, without displaying identifiers 952 indicating a holster state of the host weapons and without displaying paths 954 indicating a movement of the ESUs. However, any number and type of identifiers and paths may be set to be displayed or not displayed based on various configurations. As illustrated in FIG. 28, the display of identifiers 958 for multiple ESU systems may enable the user of the display device 906 to more accurately identify a position of a potential threat based on the positions and orientations of the identifiers 958. The display device 906 may also display a text indicator 976 of a weapon event, such as a discharge event. Although FIG. 27 is described with reference to the display device 906 for the first backup LEO, display devices 908 and 910 of the second and third backup LEO may also function in a same or similar manner.

Figure 29:
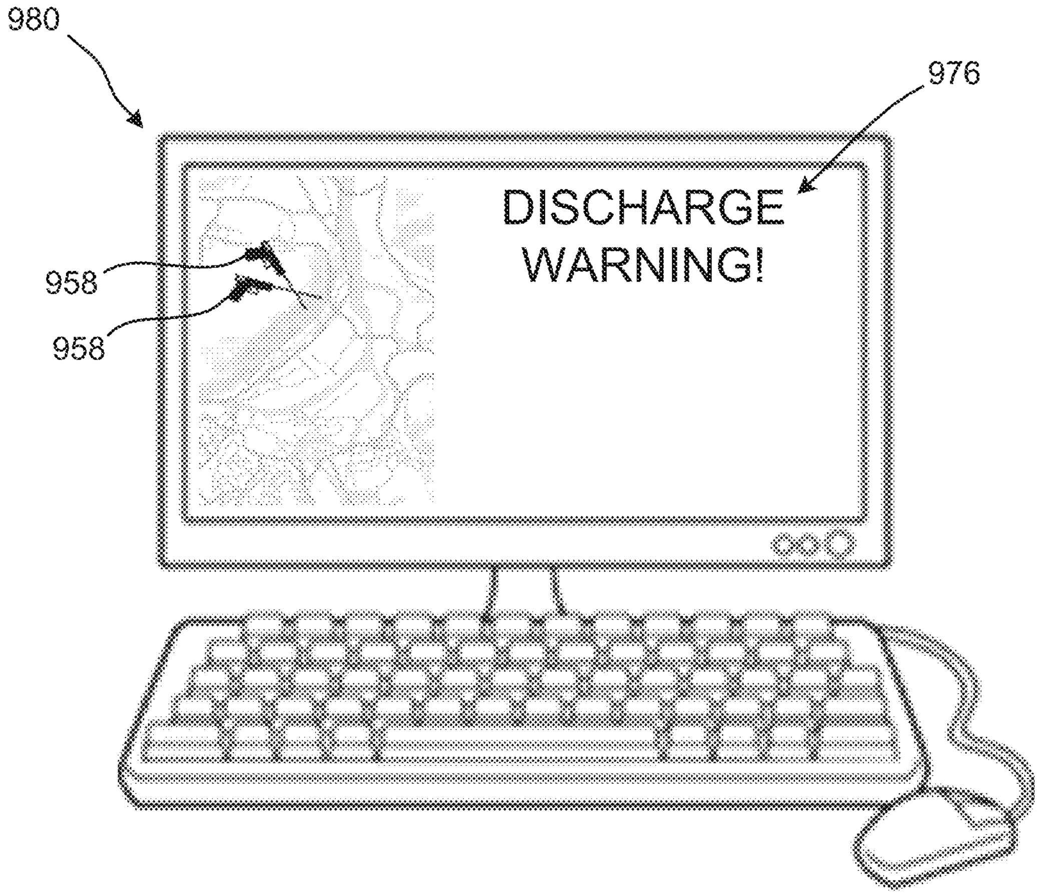
FIG. 29 illustrates a display of a dispatch unit of the configuration of FIG. 25.

With reference to FIG. 29, the dispatch unit 922 may be configured to obtain, via API 938, at least a portion of the data received by the database 920 from the ESU systems 902 and 904, via connections 936, and display one or more locations, orientations, and weapon states of the ESUs of the ESU systems 902 and 904 on a display 980 based on the portion of the data (e.g. location data, orientation data, and weapon state information). In an embodiment, the dispatch unit 922 may additionally or alternatively be configured to obtain, via API 932, data (e.g. location data, orientation data, and weapon state information) directly from the ESU systems 902 and 904 and display the one or more locations, orientations, and weapon states of the ESUs of the ESU systems 902 and 904 on a display 980 based on the data. In an embodiment, and as illustrated in FIG. 29, the display 980 may display the same or similar information as the display devices 906, 908, and 910. In an embodiment, the dispatch unit 922 may be a computer with the display 980.

According to embodiments, dispatch or a security ops using the dispatch unit 922 may automatically monitor the movement of a drawing weapon, without having to rely on active input by individual officers. Accordingly, the dispatch or security ops may provide a better coordinated effort that reduces the public threat and enable tactics to be adjusted to fit the developing theatre situation.

Figure 30:
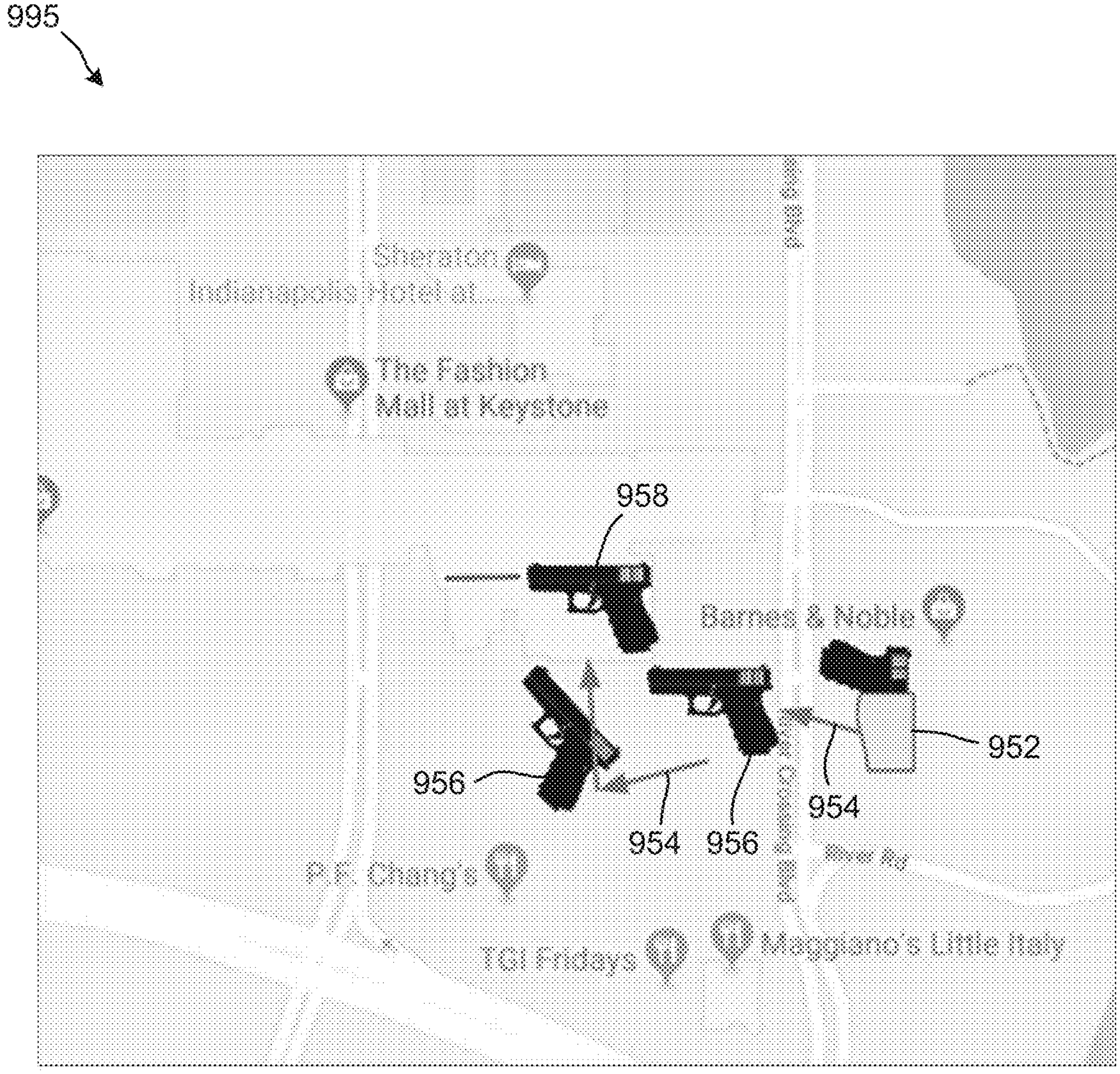
FIG. 30 illustrates a first example image displayable by displays of the configuration of FIG. 25.
Figure 31:
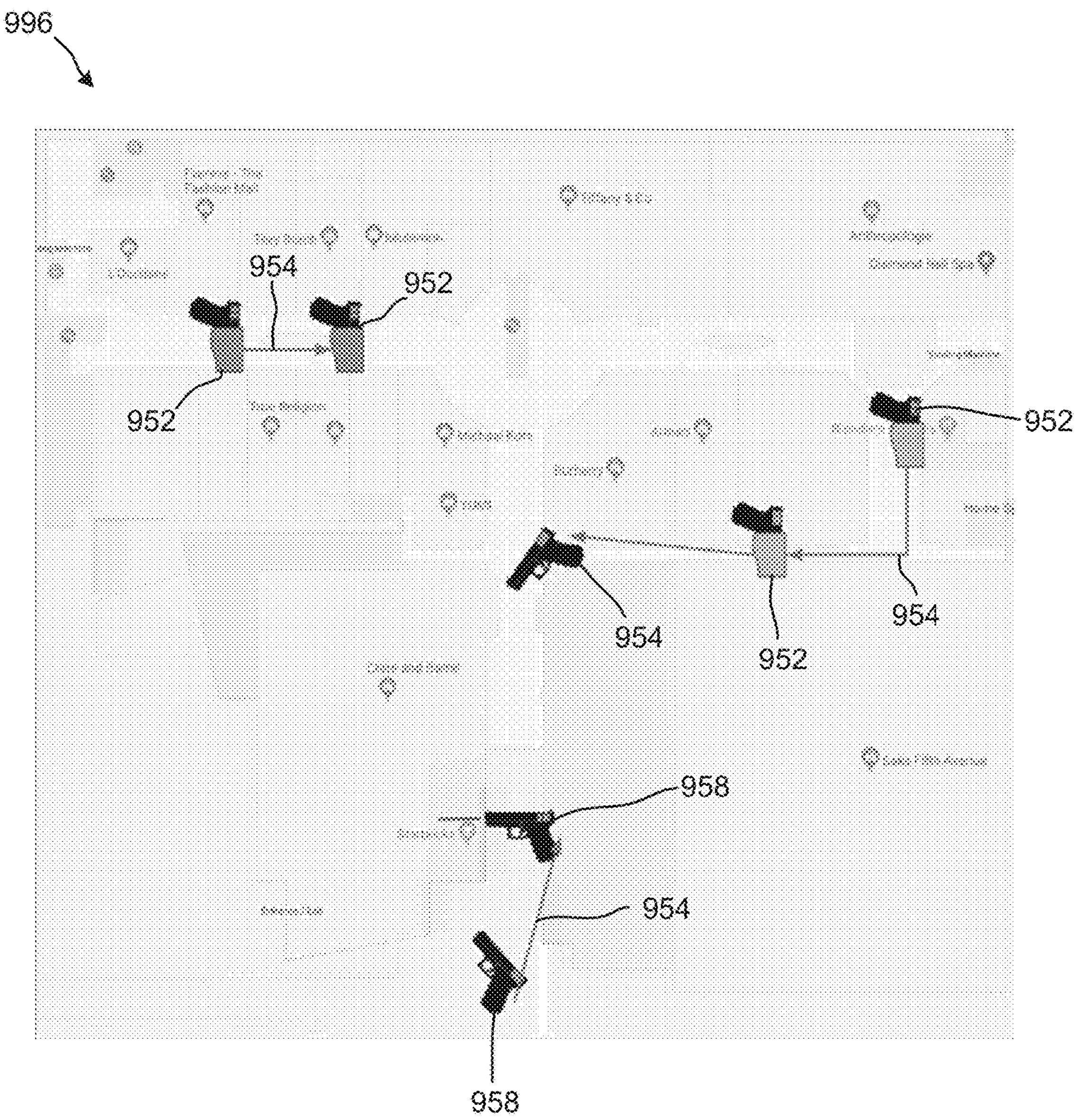
FIG. 31 illustrates an second example image displayable by displays of the configuration of FIG. 25.

FIGS. 30-31 illustrate other examples of the images that the displays of the dispatch unit 922 and the displays 906, 908, and 910 may display, in accordance with the above display manners. With reference to FIG. 30, image 995 illustrates a conflict moving from one parking lot to another parking lot of a mall, with an eventual weapon discharge inside the mall, by mall security staff. With reference to FIG. 31, image 996 illustrates multiple units responding so as to divert the general public from a threat area and to contain a suspect.

Figure 32:
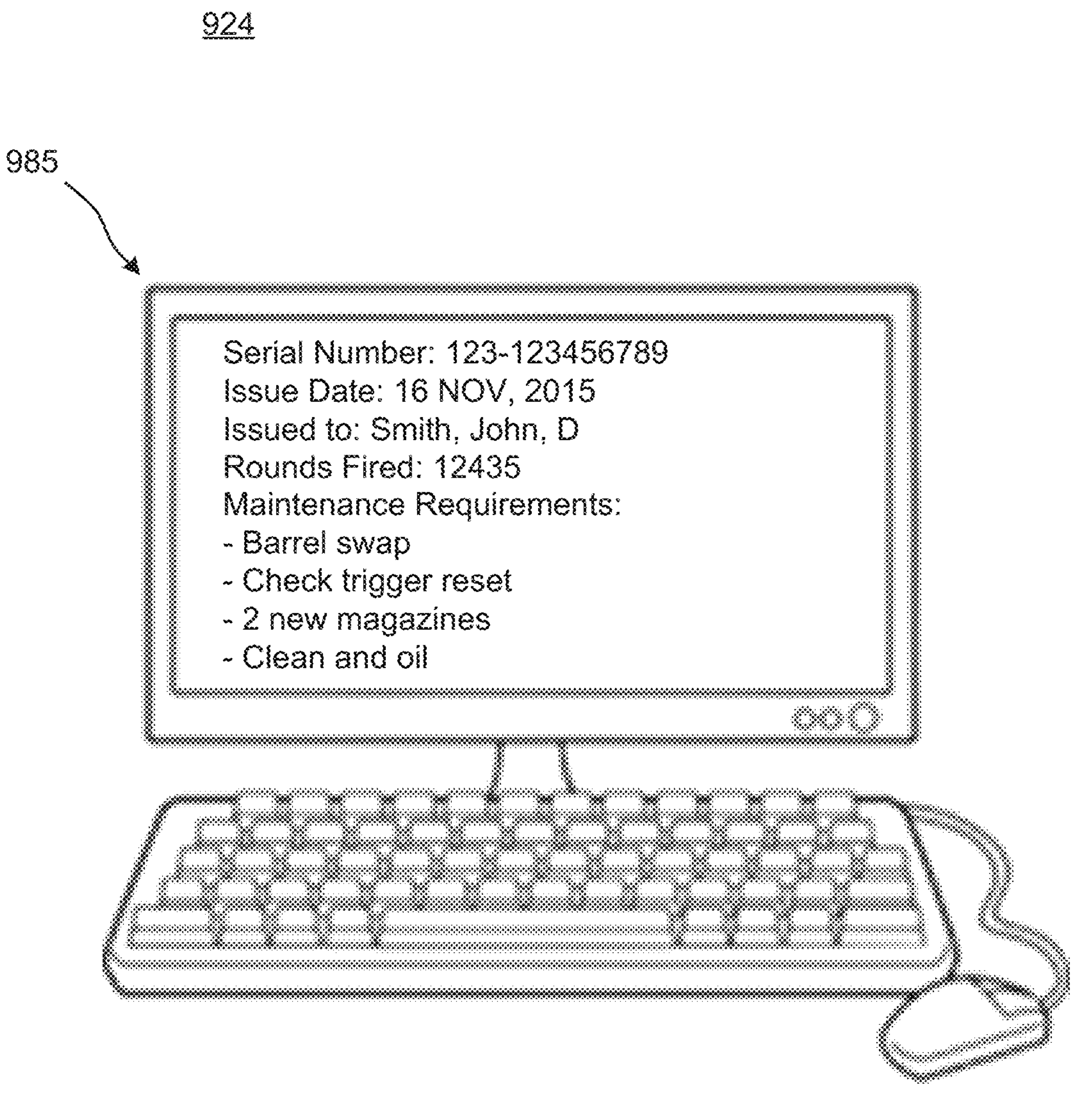
FIG. 32 illustrates a display of a maintenance unit of the configuration of FIG. 25.

With reference to FIG. 32, the maintenance unit 924 may be configured to cause a display 985 to display information concerning maintenance requirements of host weapons associated with ESU systems (e.g. ESU systems 902 and 904). The maintenance unit 924 may be configured to determine maintenance requirements, and display the corresponding information, based on data obtained by the maintenance unit 924 from the database 920 via API 940. All or part of the data obtained by the maintenance unit 924 from the database 920 may be obtained by the database 920 from one or more of the ESU systems (e.g. ESU systems 902 and 904) via connections 936. As illustrated in FIG. 30, with respect to one host weapon associated with an ESU system, the display 985 may be caused to display, for example, a serial number of an ESU or a host weapon, an issue date of the ESU or the host weapon, identifying information of the user of the ESU or the host weapon, rounds fired by the host weapon based on sensor data of the ESU associated with the host weapon, and maintenance requirements. In an embodiment, the maintenance unit 924 may be a computer with the display 985. In an embodiment, the processing of the maintenance unit 924 to determine maintenance requirements may alternatively be performed by the ESU systems 902 and 904.

Figure 33:
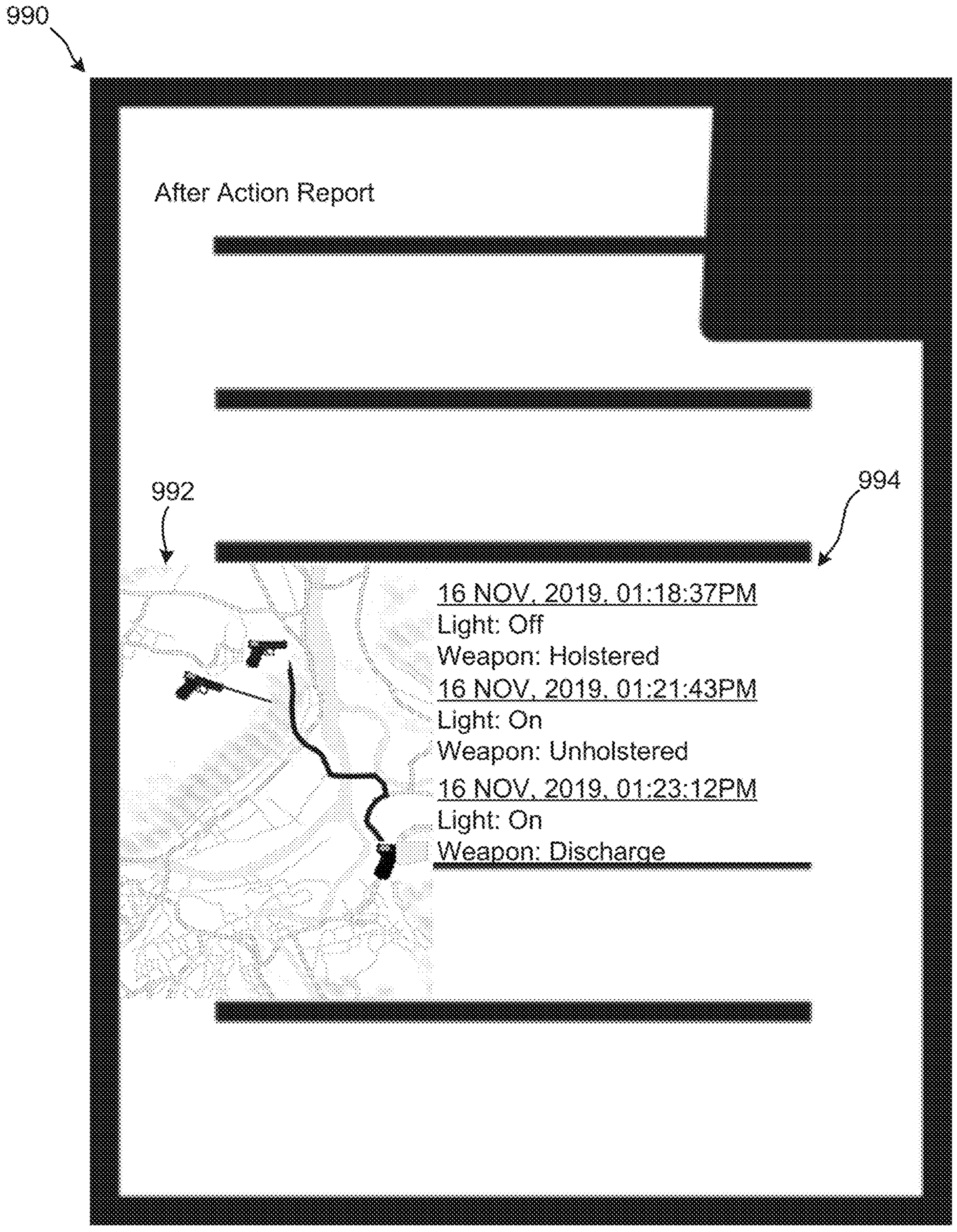
FIG. 33 illustrates a report of an embodiment.

With reference to FIG. 33, the reporting unit 926 may be configured to populate a report 990 concerning a scenario involving one or more host weapons associated with ESU systems (e.g. ESU systems 902 and 904). With reference to FIG. 25, the report 990 may be populated based on data obtained by the reporting unit 926 from the database 920 via API 942, that may at least be partially obtained by the database 920 from the ESU systems 902 and 904 via connections 936. For example, the reporting unit 924 may be configured to populate the report 990 with an image(s) 992, indicating locations, orientations, and weapon states of a host weapon(s) of one or more of ESU systems (e.g. ESU systems 902 and 904), and report text 994 based on data obtained from the database 920 (e.g. location data, orientation data, and weapon state and secondary functionality information). The image(s) 992 may have the same or similar information as the image information displayed by one or more of the ESU systems 902, 904, the display devices 906, 908, 910, and the dispatch unit 922. For example, the image(s) 992 may include identifiers 952, 956, and 958 and paths 954 corresponding to any number of the ESUs of ESU systems and corresponding host weapons. The report text 994 may indicate, for example, date, time, weapon state (e.g. discharged, holstered, unholstered, etc.), and the state of one or more secondary functions (e.g. a light), associated with one or more of the host weapons. The report may be an after action report, and may relate to department and/or legal administrative paperwork. In an embodiment, the reporting unit 926 may be a computer with a display configured to display the report 990.

According to the above embodiments, users of the displays 830 may quickly assess a present situation, including the location, orientation, and condition of ESU system 810 users and their host weapons. Further, the users of the ESU systems 810 may provide situational information to users of the displays 830 (e.g., other law enforcement officers and dispatch) without compromising their ability to engage a potential threat.

According to some embodiments described above, the detection of the combination of forces (along multiple axis and rotation points) and rise times provides for high accuracy determinations as well as the ability to interpret non-discharge events.

In some embodiments, the displays 830 may include a speaker, and the system 820 may process the sensor data and/or notifications received from the ESU systems 810, and cause one or more of the speakers of the displays 830 to output a message based on the processed sensor data and/or notifications. The message may orally present a part or all of the notifications described above.

In some embodiments of the present disclosure, the embodiments include a method, system, and computer program product that allows for the real-time determination of a host weapon being unholstered, manipulated, and/or discharged and any other weapon status and usage that can be determined by the sensor suite.

In some embodiments of the present disclosure, data collected by an ESU and determinations obtained by the ESU are stored in memory of the ESU and/or are transmitted in real time for safety and engagement awareness. The ESUs of the disclosure may include various means to communicate weapon manipulation, -usage and discharge, in real time, or near real time, back to a centralized dispatch point.

In some embodiments of the present disclosure, ESU systems provide data logging for reconstruction of incidents involving the weapon being manipulated and/or discharged, institutional logistics involving the number of discharges of the weapon and associated maintenance of the weapon, advanced battle space awareness and any and organizational administrative functions either directly or indirectly associated with the operating of a weapon system equipped with the ESU.

In some embodiments of the present disclosure, the ESU system comprises an ESU configured to be non-permanently coupled to the host weapon, utilized for monitoring the weapon manipulation, orientation, and discharge when in a coupled condition. The ESU may provide notification for maintenance based on number and/or quality of shots discharged, and notification of general manipulation of the weapon and/or potential damage events like dropping the weapon on solid/hard surfaces.

In some embodiments of the present disclosure, the ESU includes at least one sensor that obtains a reading and automatically turns on the CPU of the ESU, based on the reading, a storage means that stores the readings obtained, and a means to display a read-out of ESU available sensor data.

In some embodiments of the present disclosure, an ESU is configured facilitate communication between the ESU and a mobile computing device allowing data transfer, personal computer (PC), or integrated data connection, enabling management of the ESU configuration and offloading of sensor obtained and system determined data values.

In some embodiments of the present disclosure, a ESU includes secondary operational functionality, such as, but not limited to, one or more of a flashlight, laser designator, IR illuminator, range finder, video and/or audio capture, and less lethal capabilities.

In some embodiments, ESU may be turned off or in a deep sleep mode. After manually, or automatically, turning on the ESU, the ESU may boot up and collects, analyze, and record all available data. Upon completion of the data collection cycle, the ESU may store the information with a date/time stamp (as well as any other configured/available data) and transmits the data/findings. Upon completion of this process the ESU goes to sleep mode waiting for a timer interrupt, or any other input method restarting the data collection/analysis cycle.

In some embodiments of the present disclosure, the ESU contains a central processor unit (CPU) capable of turning the ESU into a deep sleep mode to conserve power.

In some embodiments of the present disclosure, the ESU contains a transmitter for data transfer and communication between the ESU and external sensors and/or a mobile computing/digital communication device allowing data transfer in real time to a centralized dispatch.

In some embodiments of the present disclosure, transmitter utilizes industry standard data transmission means like Bluetooth Low Energy, NFC, RFID or similar protocols as appropriate for the indicated short distance communication demands with nearby external sensors or a long range communication/data transmission device.

In some embodiments of the present disclosure, the transmitter utilizes industry standard data transmission means like LAN, WAN, CDMA, GMS or similar protocols as appropriate for the indicated long distance communication means associated with dispatch notification.

In some embodiments of the present disclosure, the transmitter is capable of waking up external sensors on demand.

In some embodiments of the present disclosure, the external sensor data may be a health monitoring device (e.g., fitbit, smart watch, etc.) and/or software application on the configured mobile computing/digital communication device.

In some embodiments of the present disclosure, the ESU further comprises a housing containing electronic components, attached to a mounting solution allowing the attachment to a projectile weapon.

In some embodiments of the present disclosure, the ESU further comprises a magnetic switch, paired between the ESU and a holster designed to retain a weapon outfitted with the ESU.

In some embodiments of the present disclosure, the magnetic switch (e.g., reed switch or similar) will turn the ESU into a low power state when the weapon is holstered.

In some embodiments of the present disclosure, the ESU further comprises an accelerometer sensor responsive to the g-force level generated by the weapons discharge along multiple axis.

In some embodiments of the present disclosure, the ESU further comprises a barometric pressure sensor responsive to the pressure level change generated by the weapons discharge.

In some embodiments of the present disclosure, the CPU of the ESU upon detection of a break in the magnetic switch powers up the system and signals the sensor suite (e.g., sensor array) to take readings.

In some embodiments of the present disclosure, CPU of the ESU upon detection of a sufficient spike in g-force, powers up the system and signals the sensor suite to take a reading.

In some embodiments of the present disclosure, the CPU of the ESU upon detection of a sufficient spike in barometric pressure (within configured boundaries for the host weapon/ammo type) powers up the system and signals the sensor suite to take a reading.

In some embodiments of the present disclosure, the ESU is capable of recording data and allowing the CPU to access said data in analyzing system activation based upon unholstering, discharge, or based on a means other than weapon discharge.

In some embodiments of the present disclosure, the ESU further comprises an antenna array that transfers data and operating commands to external sensors.

In some embodiments of the present disclosure, the antenna array allows transfer of said data to a centralized storage and dispatch system.

In some embodiments of the present disclosure, the ESU further comprises user interface buttons to control secondary functions of the system (e.g., light, laser, etc.) as well power up the system and trigger activation of the sensor suite.

In some embodiments of the present disclosure, the ESU further comprises a wired and/or wireless interface to allow data transfer from the storage to a computer or other data collection and/or transmission device.

In some embodiments of the present disclosure, a GPS location is determined via a sensor within the ESU.

In some embodiments of the present disclosure, a cardinal compass bearing is provided via an electronic compass within the ESU.

In some embodiments of the present disclosure, an angle/rotation/tilt/cant reading is provided via a multi-axis MEMS sensor within the ESU.

In some embodiments of the present disclosure, an altitude reading is provided to the ESU by using the ambient barometric pressure to calculate altitude.

In some embodiments of the present disclosure, an altitude reading is provided to the ESU by using GPS to determine orthometric heights.

In some embodiments of the present disclosure, the altitude reading is presented in metric or imperial measurements, or in estimated building floors.

In some embodiments of the present disclosure, a temperature reading is provided via a temperature sensor within the ESU.

In some embodiments of the present disclosure, a date/time reading is provided via the internal clock within the CPU of the ESU.

In some embodiments of the present disclosure, audio is recorded for a preconfigured loop duration for both shot detection and environment awareness. With reference to FIG. 6, audio may be recorded in storage 210 and used by the CPU 208 or a system that receives the audio therefrom (e.g. third party dispatch system 221) for shot detection and environment awareness. Audio for environmental awareness may include the ambient sound at the time of an event, and may be used for both forensic and court evidence purposes.

In some embodiments of the present disclosure, rise-time of measurements is used in scenario refinement.

In some embodiments of the present disclosure, an application programming interface (API) allowing for 3rd party consumption of the ESU stored data for event monitoring and alert status notifications is provided.

In some embodiments of the present disclosure, a system (3rd party in certain configurations) is provided, where ESU generated data is used for event notification and escalation; including but not limited or restricted to: Email notifications, Instant Message notifications, Short Mail Message (SMS/SMM/TXT), and Push Notification (e.g. app based or automated voice based). For example, with reference to FIG. 22, one or more of the ESU systems and the system 820 may be configured as the system.

In some embodiments of the present disclosure, a system (3rd party in certain configurations) is provided, where the ESU captured and analyzed data generates event notifications and escalations, allowing for distribution group based, as well as individual user, notifications. For example, with reference to FIG. 22, one or more of the ESU systems and the system 820 may be configured as the system.

In some embodiments of the present disclosure, a system (3rd party in certain configurations) is provided, where ESU captured and analyzed data allows forensic recreation of the event in cartography, virtual- or augmented reality. For example, with reference to FIG. 22, the system 820 (or another system with at least one processor) may be configured to cause one of the displays 830 to display a 2D or 3D map with a recreation of an event in accordance with, for example, the display manner of image 850 that is referenced with images illustrated in FIG. 23 or FIG. 24. Alternatively or additionally, the system 820 (or another system with at least one processor) may be configured to cause one of the displays 830 to display a virtual reality or augmented reality image in accordance with, for example, the display manner of image 860 that is referenced with FIG. 24. In such embodiment, the display 830 used may be a head mounted display (HMD) configured to display a virtual reality image or an augmented reality image.

In some embodiments of the present disclosure, a system (3rd party in certain configurations) is provided, where ESU captured and analyzed data allows for documentation prepopulation in line with organizational and/or legal requirements (e.g., police reports, after action reports, insurance claims, etc.). For example, with reference to FIG. 22, one or more of the ESU systems and the system 820 may be configured as the system.

In some embodiments of the present disclosure, weapon movement from an at-rest state can be determined by the ESU based on sensor data obtained by the ESU.

In some embodiments of the present disclosure, the dropping of the weapon can be determined by the ESU based on sensor data obtained by the ESU.

In some embodiments of the present disclosure, bolt- or slide-manipulation (racking of a round) of the weapon can be determined by the ESU based on sensor data obtained by the ESU.

In some embodiments of the present disclosure, the discharge of the weapon can be determined by the ESU based on a combination of one or more of the following: three dimensional g-force detection profiles (including but not limited to force and rise-time), barometric pressure change profiles, and ambient audio change profiles.

In some embodiments of the present disclosure, the separation of the ESU equipped host weapon and the transmission device can be detected by the ESU or the transmission device of the system and can trigger weapon loss notification.

In some embodiments of the present disclosure, the maintenance needs of the weapon can be determined by the ESU based on shots fired and/or weapon manipulation characteristics at both the individual and organizational level.

In some embodiments of the present disclosure, the maintenance needs of the host weapon are caused by a processor of the ESU system to be indicated on an associated mobile computing device.

In some embodiments of the present disclosure, the maintenance needs of the host weapon are indicated on an organization maintenance dashboard displayed on a display, thereby allowing for grouping and/or scheduling of weapons requiring similar maintenance.

In some embodiments of the present disclosure, analysis of the captured data described in the present disclosure may be performed by at least one processor that is instructed by Artificial Intelligence/Machine Learning code stored in memory to refine scenario detection parameters. For example, with reference to FIGS. 6 and 9, the ESU 201 or the third party dispatch system 221 may perform the analyze/interpret data step 326 and/or the analyze/interpret data step 342 using artificial intelligence/machine learning code stored with the ESU 201, the dispatch unit 922, or the database 920.

In some embodiments of the present disclosure, the configuration of primary and secondary functionality, functionality triggers, scenario identification, and sensor recording target boundaries for scenario detection of the ESU system, can be configured as well any secondary organizational desired data (including, but not limited to: assigned owner, weapon-make, model, serial, caliber, barrel length, accessories, etc.).

In some embodiments of the present disclosure, a configured ESU low battery threshold can cause the ESU to trigger a low battery warning notification.

In some embodiments of the present disclosure, data from the ESU can be represented on the screen incorporated within, or externally linked with, the ESU. For example, the screen (e.g. a display) may be mounted on top of a weapon (e.g. like an optic), or may be implemented in a screen of an electro-optic to indicate data captured by the ESU and/or notifications as described in embodiments of the present disclosure. According to embodiments, the ESU or the electro-optic may optimize the data and/or notifications that is displayed for screen size and/or resolution.

In some embodiments of the present disclosure, data from other ESUs can be represented on the mobile data transmission device (e.g. mobile data transmission device 219).

In some embodiments of the present disclosure, an ESU 810 may include or otherwise be associated with a display and the ESU 810 may be configured to display representations of data from other ESUs that is received by the ESU 810.

In some embodiments of the present disclosure, data from one or more ESUs is reviewed, analyzed, and associated by at least one processor of the ESU system or at least one processor external to the ESU system, via a web (internet) based interface.

In some embodiments of the present disclosure, data from the ESU(s) is represented in augmented reality either on a display screen connected to the ESU or connected to a mobile data transmission device (e.g., a mobile phone, computing tablet, or similar device).

In some embodiments of the present disclosure, a computer useable storage medium having computer executable program logic stored thereon for executing on a processor, the program logic implementing the processes performed by the ESU.

In some embodiments of the present disclosure, the flashlight function of the ESU is automatically turned on by the CPU of the ESU, based on detecting the unholstering of the host weapon, and turned off by the CPU, based on detecting the holstering of the host weapon.

In some embodiments of the present disclosure, the light output level of the flashlight is determined by the CPU of the ESU based on configured scenarios, as identified by the sensor readings. Light output level may be controlled based on, for example, motion patterns, weapon manipulation/racking, weapon discharge, ambient light conditions, and/or verbal commands. According to embodiments, based on a scenario determined by the ESU, the weapon light may be controlled by the CPU of the ESU to turn on to a brightness level that is appropriate for a scenario based on configuration settings obtained by the ESU. The scenario may include item parameters like time of day, GPS location (e.g. inside a building or in a parking lot), and an ambient light, wherein the item parameters may be obtained by sensors in or connected to the ESU, or obtained from external systems.

In some embodiments of the present disclosure, the target laser function of the ESU is automatically turned on by the CPU of the ESU, based on detecting the unholstering of the host weapon, and turned off by the CPU, based on the detecting of the holstering of the host weapon.

In some embodiments of the present disclosure, the ESU is configured to use the laser functionality to determine target distance based on "time of flight" principles and/or multiple frequency phase-shift. According to embodiments of the present disclosure, the use of the laser functionality aids, for example, 3D recreation of an event in virtual reality, and responding officers to know the distance to a target based on data from officers already on the scene.

In some embodiments of the present disclosure, the laser functionality employs a Doppler effect encoding configured specific to the ESU to differentiate it from other nearby ESUs.

In some embodiments of the present disclosure, the camera function of the ESU is automatically turned on by the CPU of the ESU, based on detecting unholstering of the host weapon, and turned off by the CPU, based on detecting holstering of the host weapon.

In some embodiments of the present disclosure, one or more cameras is provided in the ESU, the one or more cameras provide a field of view up to 300 degrees centered from the front of the host weapon.

In some embodiments of the present disclosure, the one or more cameras provide overlapping fields of view that allow for 3D video processing.

In some embodiments of the present disclosure, at least one processor of the ESU system (or, for example, the system 820) is configured to perform stereo (3D) video processing so as to provide target distance determination based on the determination of the video field of view, relative to the host weapon bore-axis.

In some embodiments of the present disclosure, the stereo (3D) video processing allows for the at least one processor to cause a display to display a virtual- and/or augmented-reality recreation of the event/presentation of the captured data.

According to embodiments of the present disclosure, the above mentioned camera related functionalities aid 3D recreation of events in virtual reality. Embodiments of the present disclosure may also incorporate stereo-video, which enables depth (e.g. distance) to be determined and allows for Quaternion creation for rotation functionality of a virtual environment.

In some embodiments, recoil is measured by the ESU or a system with at least one processor in communication with the ESU (e.g. third party dispatch system 221) via a combination of angle/rotation/tilt/cant readings provided via a multi-axis MEMS sensor within the ESU.

According to embodiments, at least one processor (e.g. CPU 208) of an ESU system(s) (e.g. ESU systems 810) and/or a system (e.g. system 820) connected to the ESU system(s) may determine that one or more of a plurality of events has occurred based on any number of outputs of sensors included in the ESU system(s) that are obtained and/or outputs from sensors outside of the ESU system(s) but on or nearby the user(s) of the ESU system(s) that are obtained. According to embodiments, the ESU systems and/or systems connected to the ESU system(s) of the present disclosure may cause notifications to be outputted based on the determined events, in accordance with any notification method, including the notification methods of the present disclosure. Example events, how the events may be determined, and corresponding notifications are described below.

(1) Weapon Discharge Event

According to embodiments, this event may be determined based on an output from a microphone (e.g. an audio sensor 1006), that is associated with a weapon, and outputs from an accelerometer(s) (e.g. accelerometer 1002, such as a multi-axis accelerometer), that is associated with the weapon. For example, this event may be determined based on an output from the microphone being a high spike that indicates a weapon discharge sound from the weapon, and outputs of the accelerometer(s), which respectively correspond to acceleration measurements of the weapon along at least two axis, indicating weapon discharge recoil by increasing over a threshold(s) with a short rise-time. According to embodiments, the "high spike" (or "spike") may refer to the output from the microphone increasing to become equal to or greater than a first predetermined threshold, with a rise time that is less than a second predetermined threshold, and/or decreasing to a third pre-determined threshold after the increase, with a fall time that is less than a fourth predetermined threshold. According to embodiments, the outputs of the accelerometer(s) may be determined to indicate weapon discharge recoil based on each of such outputs being over a respective predetermined fifth threshold and having a respective rise time that is below a respective predetermined sixth threshold.

According to embodiments, a determination of a weapon discharge event based on sound may be based on a slope of the output of the microphone. For example, a weapon discharge event may be determined based on the output of the microphone having a very steep positive or negative slope. According to embodiments, the slopes may be computed every 100 microseconds. According to embodiments, a weapon discharge event may be determined based on the output of the microphone, over a period of 100 microseconds, increasing by at least 2% over its full scale (e.g. over a baseline ambient noise reading). From a rise-time perspective, this means the weapon discharge event may be determined based on a very short rise time to a threshold level, wherein the threshold level may be 2% over the baseline ambient noise reading. Mitigation of false positives is aided by also qualifying the weapon discharge detection with specific inertial measurements (e.g. acceleration measurements).

According to embodiments, the weapon discharge event may be alternatively or additionally based on an output of a pressure sensor (e.g. barometric pressure sensor 1001) as described in embodiments of the present disclosure.

According to embodiments, the weapon discharge event may be alternatively or additionally determined based on an output of an ammunition level sensor that indicates an ammunition level within a magazine of the weapon. For example, the ammunition level sensor may be configured to detect a position of a follower of the magazine, that changes position based on an ammunition level within the magazine. According to embodiments, the ammunition level sensor may include, for example, at least one magnetic sensor such as a Hall effect sensor, and may be included in or on a body of the magazine that includes the follower. According to embodiments, the at least one magnetic sensor may be a part of the sensor array 202 and may be connected to the CPU 208 of the system 200. According to embodiments, the ammunition level sensor may be implemented in embodiments of the present disclosure by implementing the configurations described in U.S. Pat. No. 8,215,044, issued Jul. 10, 2012, which is incorporated herein by reference in its entirety. According to embodiments, the weapon discharge event may be determined based on a combination of one or more from among a detection of a decrease in ammunition level, weapon discharge sound (or pressure), and weapon discharge recoil.

Based on this event being determined, the notification provided may be a weapon discharge notification.

(2) Weapon Slide Manipulation Event

According to embodiments, this event may be determined based on an output from the microphone and outputs from the accelerometer(s). For example, this event may be determined based on an output from the microphone maintaining relatively constant, consistent with a weapon slide manipulation sound, and outputs of the accelerometer(s), which respectively correspond to acceleration measurements of the weapon along at least two axis, indicating weapon slide manipulation by increasing over a threshold(s) with a long rise-time. According to embodiments, the outputs of the accelerometer(s) may be determined to indicate weapon slide manipulation based on each of such outputs being over a respective predetermined first threshold and having a respective rise time that is above a respective predetermined second threshold.

Based on this event being determined, the notification provided may be a weapon manipulation warning.

(3) Weapon Dropped in Liquid (e.g. Water) Event

According to embodiments, this event may be determined based on an output from a pressure sensor (e.g. the barometric pressure sensor 1001), associated with the weapon, and outputs from the accelerometer(s). For example, this event may be determined based on an output from the pressure sensor indicating that pressure around the weapon is increasing with a long rise time, consistent with the weapon freely descending in a liquid (e.g. water), and outputs of the accelerometer(s), which respectively correspond to acceleration measurements of the weapon along at least two axis, indicating that the weapon is freely descending in the liquid. According to embodiments, this event may be determined based on the outputs of the accelerometer(s) having long rise times and then settling at respective predetermined acceleration values (e.g. zero) or acceleration ranges (e.g. near zero), consistent with the weapon being dropped in the liquid and then settling at an orientation while freely descending in the liquid. According to embodiments, this event may be further determined based on the outputs of the accelerometer(s) then spiking, consistent with the weapon hitting a bottom surface of the body of the liquid.

Based on this event being determined, the notification provided may be a weapon lost and/or submerged notification.

(4) Nearby Weapon Discharge Event

According to embodiments, this event may be determined based on an output from the microphone and outputs from the accelerometer(s). For example, this event may be determined based on an output from the microphone being a spike that indicates a weapon discharge sound from a second weapon, other than the weapon to which the microphone is associated, and outputs of the accelerometer(s), which respectively correspond to acceleration measurements of the weapon along at least two axis, indicating that the weapon is not recoiling from a weapon discharge. According to embodiments, the "spike" may refer to the output from the microphone increasing to become equal to or greater than a first predetermined threshold, with a rise time that is less than a second predetermined threshold, and/or decreasing to a third pre-determined threshold after the increase, with a fall time that is less than a fourth pre-determined threshold. According to embodiments, this event may be determined based on a maximum value of the spike being less than a fifth pre-determined threshold which indicates that the weapon discharge sound may be from the second weapon, in contrast to the weapon discharge sound being from the weapon to which the microphone is associated. According to embodiments, the outputs of the accelerometer(s) may be determined to indicate no weapon discharge recoil based on each of such outputs not indicating recoil as, for example, described in the present disclosure.

According to embodiments, as an addition or an alternative to determining this event based on the output from the microphone, an output from the pressure sensor may be used to determine this event. For example, this event may be determined based on an output from the pressure sensor being a spike that indicates a weapon discharge pressure from a second weapon, other than the weapon to which the pressure sensor is associated. According to embodiments, the "spike" may refer to the output from the pressure sensor increasing to become equal to or greater than a sixth predetermined threshold, with a rise time that is less than a seventh predetermined threshold, and/or decreasing to an eighth pre-determined threshold after the increase, with a fall time that is less than a ninth pre-determined threshold. According to embodiments, this event may be determined based on a maximum value of the spike being less than a tenth pre-determined threshold which indicates that the weapon discharge pressure may be from the second weapon, in contrast to the weapon discharge pressure being from the weapon to which the pressure sensor is associated.

Based on this event being determined, the notification provided may be a possible nearby weapon discharge notification.

(5) Weapon Laid Down and Left Event

According to embodiments, this event may be determined based on an output from the microphone and outputs from the accelerometer(s). For example, this event may be determined based on an output from microphone indicating low level background noise (e.g. being maintained below a predetermined threshold), without a discernible noise pattern, and outputs of the accelerometer(s), which respectively correspond to acceleration measurements of the weapon along at least two axis, indicating that the weapon starts to rotate and then settles down to a stationary position (e.g. velocity of the weapon along the respective axes become zero).

Based on this event being determined, the notification provided may be a possible lost weapon alert.

(6) Weapon Falling Uncontrolled Event

According to embodiments, this event may be determined based on an output from the microphone, associated with the weapon, and outputs from the accelerometer(s). For example, this event may be determined based on an output from microphone indicating low level background noise (e.g. being maintained below a predetermined threshold), with a discernible noise pattern consistent with the weapon hitting the ground, and outputs of the accelerometer(s), which respectively correspond to acceleration measurements of the weapon along at least two axis, indicating that the weapon starts to rotate and then abruptly settles down to a stationary position (e.g. velocities of the weapon along the respective axes become zero). According to embodiments, occurrence of the weapon laid down and left event and the weapon falling uncontrolled event may be distinguished from each other based on one or more of whether the discernible noise pattern (e.g. whether a input from the microphone is above or below a predetermined value), consistent with the weapon hitting the ground, is obtained, and how abruptly the weapon reaches the stationary position after rotation. For example, the weapon falling uncontrolled event may be determined based on outputs from the accelerometer(s) indicating that the weapon reaches the stationary position after large spike(s) of acceleration (or deceleration). In contrast, the weapon laid down and left event may be determined based on the outputs from the accelerometer(s) indicating that the weapon reaches the stationary position without the large spike(s) of acceleration (or deceleration).

Based on the weapon falling uncontrolled event being determined, the notification provided may be a weapon falling uncontrolled notification and/or a weapon compromised notification.

(7) Weapon Falling While Held/Retained Event

According to embodiments, this event may be determined based on an output from the microphone and outputs from the accelerometer(s). For example, this event may be determined based on an output from the microphone indicating low level background noise (e.g. being maintained below a predetermined threshold), with a minimal discernible noise pattern consistent with the weapon hitting the ground, and outputs of the accelerometer(s), which respectively correspond to acceleration measurements of the weapon along at least two axis, indicating that the weapon starts to rotate and then abruptly settles down to a stationary position (e.g. velocities of the weapon along the respective axes become zero).

According to embodiments, occurrence of the weapon laid down and left event, the weapon falling while held/ retained event, and the weapon falling uncontrolled event may be distinguished from each other based on the presence and degree of discernible noise pattern, that is consistent with the weapon hitting the ground and that may be obtained at the time the weapon transitions to the stationary position. For example, the weapon laid down and left event may be determined to occur based on a (maximum) value of the output from the microphone, at the time the weapon transitions to the stationary position, being below a first predetermined threshold; the weapon falling while held/retained event may be determined to occur based on the (maximum) value of the output from the microphone being equal to or greater than the first predetermined threshold and less than a second predetermined threshold that is greater than the first predetermined threshold; and the weapon falling uncontrolled event may be determined to occur based on the (maximum) value of the output from the microphone being equal to or greater than the second predetermined threshold.

Based on the weapon falling while held/retained event being determined, the notification provided may be a weapon falling while held/retained notification and/or a possible officer compromised/injured notification.

(8) Weapon Drawn and/or Pointed Event (or Escalation Event)

According to embodiments, this event may be determined based on outputs from the accelerometer(s). For example, this event may be determined based on outputs of the accelerometer(s), which respectively correspond to acceleration measurements of the weapon along at least two axis, indicating that weapon is drawn (e.g. unholstered) and/or pointed. For example, the weapon may be determined to be pointed based on the outputs of the accelerometer(s) indicating that the weapon is moving in a sustained, small movement pattern, consistent with the weapon being pointed at a target (e.g. a suspect).

According to embodiments, the event may be further determined based on an output of a microphone (e.g. audio sensor 1006) that is associated with the weapon or a user of the weapon. For example, this event may be further determined based on the output of the microphone indicating background noise, and/or the output of the microphone including at least one spike indicating that the user of the weapon is orally issuing commands to a suspect (and, in some cases, at a raised volume). According to embodiments, the event may be determined based on identifying (e.g. by the ESU system or the system connected to the ESU system) certain spoken language by the user from the output of the microphone.

Based on this event being determined, the notification provided may be a weapon drawn and/or pointed notification, and/or an escalation notification that indicates that a situation with a suspect has escalated.

(9) Weapon Transitioned from Pointed to At-Rest Event (or De-Escalation Event)

According to embodiments, this event may be determined based on outputs from the accelerometer(s). For example, this event may be determined based on outputs of the accelerometer(s), which respectively correspond to acceleration measurements of the weapon along at least two axis, indicating that weapon transitioned from a pointing state to an at-rest position (e.g. at-ease position). According to embodiments, the at-rest position may refer to a position in which the weapon is pointed downward (e.g. at a roughly 45 degree angle) while being held close to the chest of the user.

According to embodiments, the event may be further determined based on an output of a microphone (e.g. audio sensor 1006) that is associated with the weapon or a user of the weapon. For example, this event may be further determined based on the output of the microphone indicating background noise, and/or the output of the microphone including at least one spike indicating that the user of the weapon is orally issuing commands to a suspect (and, in some cases, at a raised volume). According to embodiments, the event may be determined based on identifying (e.g. by the ESU system or the system connected to the ESU system) certain spoken language by the user from the output of the microphone.

Based on this event being determined, the notification provided may be a weapon transitioned from pointed to at-rest notification, and/or an de-escalation notification that indicates that a situation with a suspect has de-escalated but may still be active.

(10) Multiple Weapons Pointed at a Single Target Event

According to embodiments, this event may be determined based on outputs from GPSs (e.g. a plurality of GPS units 1004), that are associated with weapons of respective users, and outputs from accelerometers (e.g. a plurality of accelerometers 1002), that are associated with the weapons of the respective users.

According to embodiments, individual weapon drawn and/or pointed events (or escalation events) may be determined to occur for each user based on the outputs from the accelerometer(s) associated with the user's weapon as, for example, described in the present disclosure. According to embodiments, the outputs from the GPSs, that are associated with weapons of respective users, may be used to respectively determine locations and/or orientations of the weapons of the respective users. According to embodiments, for each weapon, outputs of at least one from among the GPS and the accelerometer(s) associated with the weapon may be used to determine a cardinal pointing direction of the weapon.

According to embodiments, based on the outputs and determinations described above, the multiple weapons pointed at single target event may be determined to occur based on determining that two or more of the weapons of the users are in close proximity (e.g. within a predetermined distance from each other, such as within a predetermined boundary area), and based on determining that the two or more weapons (that are in close proximity to each other) are in the pointed state towards a same location. According to embodiments, the predetermined boundary area may be, for example, a defined virtual bubble having a 300 yard radius. Accordingly, when the two or more of the weapons of the users are determined to be within the same defined virtual bubble (e.g. within 600 yards from each other), the two or more of the weapons of the users may be determined to be in close proximity. According to embodiments, the size and shape of the predetermined boundary area are not limited to the above, and may be other sizes and shapes.

According to embodiments, the event may be further determined based on outputs of microphones (e.g. audio sensors 1006) that are respectively associated with the two or more weapons or users of the two or more weapons. For example, this event may be further determined based on the outputs of the microphones indicating background noise, and/or one or more of the outputs of the microphones including at least one spike indicating that one or more of the users is orally issuing commands to the target (and, in some cases, at a raised volume). According to embodiments, the event may be determined based on identifying (e.g. by the ESU systems or the system connected to the ESU systems) certain spoken language by the user(s) from the output(s) of the microphone(s).

Based on this event being determined, the notification provided may be a multiple weapons within close proximity are pointed at a single target notification (e.g. multiples officers within close proximity targeting a single target notification).

(11) Multiple Weapons Discharged at a Single Target Event

According to embodiments, this event may be determined based on outputs from GPSs (e.g. GPS units 1004), that are associated with weapons of respective users, and outputs from microphones (e.g. audio sensors 1006), pressure sensors (e.g. barometric pressure sensors 1001), and/or accelerometers (e.g. accelerometers 1002), that are associated with the weapons of the respective users.

According to embodiments, individual weapon discharge events may be determined to occur for each user based on the outputs from the microphone, pressure sensor, and/or accelerometer(s) associated with a user's weapon as, for example, described in the present disclosure. According to embodiments, the outputs from the GPSs, that are associated with weapons of respective users, may be used to respectively determine locations and/or orientations of the weapons of the respective users. According to embodiments, for each weapon, outputs of at least one from among the GPS and the accelerometer(s) associated with the weapon may be used to determine a cardinal discharge direction of the weapon.

According to embodiments, based on the outputs and determinations described above, the multiple weapons discharged at a single target event may be determined to occur based on determining that two or more of the weapons of the users are in close proximity (e.g. within a predetermined distance from each other, such as within a predetermined boundary area), and based on determining that the two or more weapons (that are in close proximity to each other) are discharged towards a same location.

According to embodiments, the event may be further determined based on outputs of the microphones that are respectively associated with the two or more weapons or the users of the two or more weapons. For example, this event may be further determined based on the outputs of the microphones indicating background noise, and/or one or more of the outputs of the microphones including at least one spike indicating that one or more of the users is orally issuing commands to the target (and, in some cases, at a raised volume). According to embodiments, the individual discharge events may also be determined based on the outputs of the respective microphones including a large decibel spike, that has a maximum value above a predetermined threshold. Such a large decibel spike may be consistent with a discharge event and larger than a spike indicating the oral issuance of a command. According to embodiments, the event may be determined based on identifying (e.g. by the ESU systems or the system connected to the ESU systems) certain spoken language by the users from the outputs of the microphones.

Based on this event being determined, the notification provided may be a multiple weapons in close proximity are discharged at a single target notification (e.g. multiples officers within close proximity are engaging a single target notification).

(12) Multiple Weapons Pointed at Multiple Targets Event

According to embodiments, this event may be determined in a same way as the multiple weapons pointed at a single target event, except this event may be determined to occur based on determining that the two or more weapons (that are in close proximity to each other) are pointed (e.g. aimed) towards different locations (e.g. different cardinal directions).

Based on this event being determined, the notification provided may be a multiple weapons in close proximity are pointed at multiple targets notification (e.g. multiple officers within close proximity are targeting multiple targets notification).

(13) Multiple Weapons Discharged at Multiple Targets Event

According to embodiments, this event may be determined in a same way as the multiple weapons engaged at a single target event, except this event may be determined to occur based on determining that the two or more weapons (that are in close proximity to each other) are discharged towards different locations (e.g. different cardinal directions).

Based on this event being determined, the notification provided may be a multiple weapons in close proximity are discharged at multiple targets notification (e.g. multiple officers within close proximity are engaging multiple targets notification).

(14) Manual Round Ejection Event

According to embodiments, this event may be determined based on an output from the ammunition level sensor, that is associated with the magazine of the weapon, and outputs from the accelerometer(s), that are associated with the weapon. For example, this event may be determined based on an output from the ammunition level sensor indicating that the ammunition level of the magazine of the weapon decreases, and outputs of the accelerometer(s), which respectively correspond to acceleration measurements of the weapon along at least two axis, having respective long rise-times consistent with an operation of manually ejecting a round from the weapon.

Based on this event being determined, the notification provided may be a manual round ejection notification.

(15) Low Battery Event

According to embodiments, an ESU of the present disclosure may include a sensor configured to measure a battery voltage of a battery (e.g. battery 213) of the ESU. According to embodiments, the CPU (e.g. CPU 208) of the ESU may determine whether the battery voltage is below a predetermined threshold. Based on the CPU (or another component of the ESU system) determining that the battery voltage is below the predetermined threshold, the ESU (or another component of the ESU system) may be configured to determine that a low battery event has occurred. Based on determining that the low battery event has occurred, a low battery warning may be provided. According to embodiments, the low battery warning may be indicated to the user of the weapon and/or sent to a dispatch.

While example events have been described above, a person of ordinary skill in the art understands that the present disclosure includes determination of other events based on descriptions in the present disclosure. Also, while example methods of determining the events has been described above, a person of ordinary skill in the art understands that the present disclosure includes alternative and/or additional methods of determining events, based on descriptions in the present disclosure. According to embodiments, events determined may alternatively be named after the corresponding notification.

Figure 34:
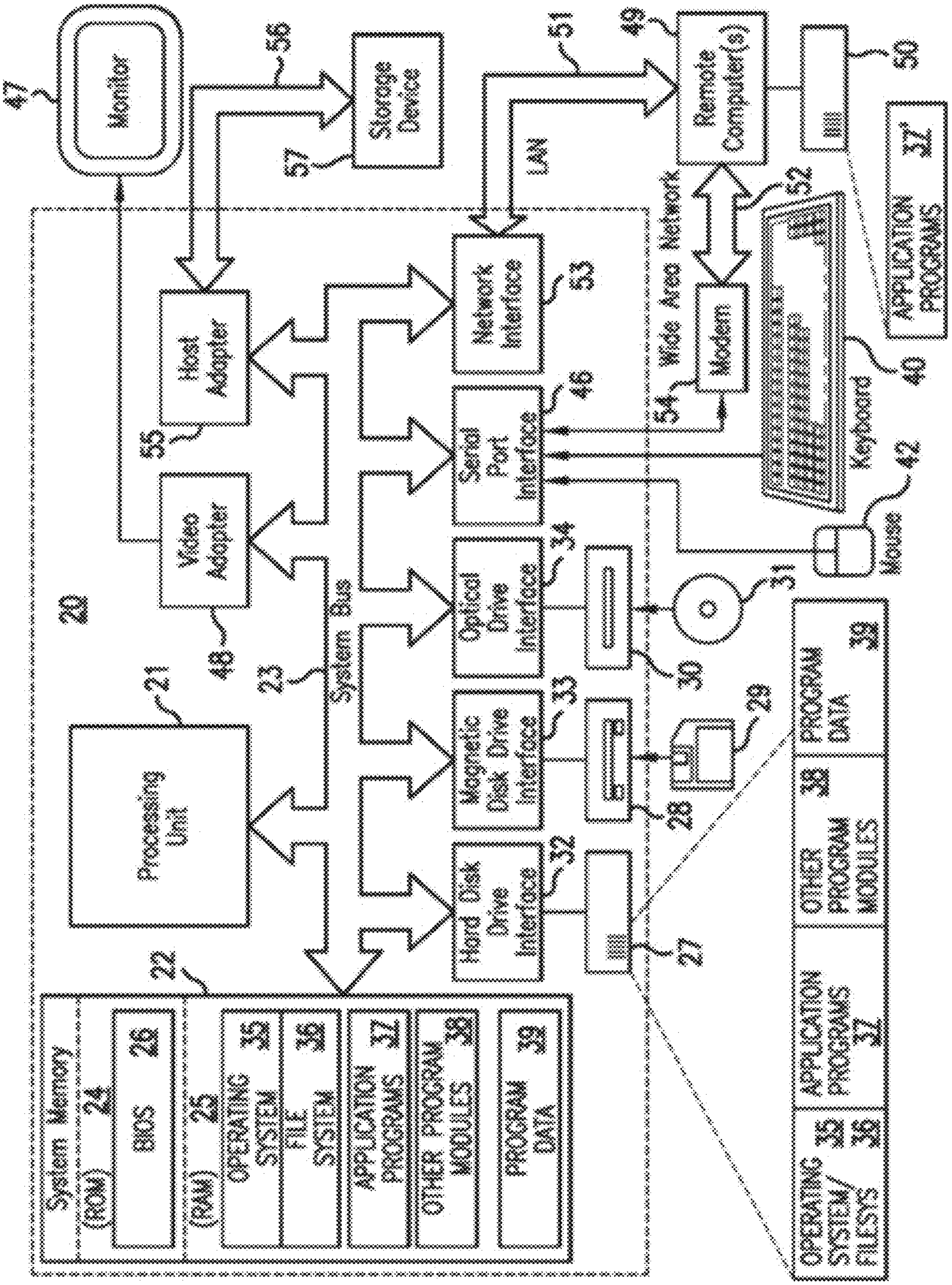
FIG. 34 illustrates a system of an embodiment.

With reference to FIG. 34, a non-limiting example system is described that may implement embodiments of the present disclosure, including the ESU systems, the ESUs, the third party dispatch systems, the processing systems, and the display devices of the present disclosure. The system may include a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

According to embodiments of the present disclosure, organizations may evaluate a situation and direct backup based on real time data so as to keep responders up to date and able to adjust tactics to ensure the best possible outcome. According to embodiments of the present disclosure, the amount of time it takes for an organization to become aware of a (possible) threat situation decreases, and early engagement and neutralization of a threat is more likely to occur. According to embodiments of the present disclosure, the recording and tracking of weapon states (e.g. weapon movement and discharge events) enables real time tactics adjustments which may result in reduced threat event duration and heightened safety for engaging security professionals. According to embodiments of the present disclosure, post event forensics, public safety statements, and legal proceedings may no longer be dependent on witness statements alone; and corroboration or mis-recollection can quickly be identified before statements are made that may later need to be changed.

According to embodiments of the present disclosure, the display of virtual recreation of situations may aid with review of training scenarios (e.g. shoot house and urban training). For example, instructors may review the movement and shot placement of students, teach situational awareness techniques and strategies to the students, as well as gain a better insight into the individual student so as to allow the instructors to tailor the remaining training to better suit the needs of each individual participant.

Embodiments of the present disclosure may achieve the advantages described herein. It should also be appreciated that various modifications, adaptations, and alternative embodiments thereof may be made within the scope and spirit of the present disclosure.

What is claimed is:

1. A device attachable to or integrated into a firearm, the device comprising:

a plurality of sensors, each configured to sense a respective attribute of the firearm or of an environment surrounding the firearm, and further configured to provide corresponding signals based on sensing the respective attribute;

at least one processor; and memory comprising computer instructions, the computer instructions configured to, when executed by the at least one processor, cause the at least one processor to determine an event from among a plurality of events based on the corresponding signals provided by the plurality of sensors, wherein the computer instructions are configured to cause the at least one processor to determine the event as being a weapon slide manipulation event of the firearm based on a first signal from among the corresponding signals indicating sound of the firearm, and a second signal from among the corresponding signals indicating movement of the firearm.

2. The device according to claim 1, where the computer instructions are further configured to cause the at least one processor to determine the event as being the weapon slide manipulation event of the firearm based on a rise time of velocity or acceleration of the firearm indicated in the second signal.

3. A device attachable to or integrated into a firearm, the device comprising:

a plurality of sensors, each configured to sense a respective attribute of the firearm or of an environment surrounding the firearm, and further configured to provide corresponding signals based on sensing the respective attribute;

at least one processor; and memory comprising computer instructions, the computer instructions configured to, when executed by the at least one processor, cause the at least one processor to determine an event from among a plurality of events based on the corresponding signals provided by the plurality of sensors, wherein the computer instructions are configured to cause the at least one processor to determine the event as being that the firearm is dropped in a liquid based on a first signal from among the corresponding signals indicating pressure in the environment of the firearm, and a second signal from among the corresponding signals indicating movement of the firearm.

4. The device according to claim 3, wherein the computer instructions are further configured to cause the at least one processor to determine the event as being that the firearm is dropped in the liquid based on a rise time of pressure in the environment of the firearm indicated in the first signal.

5. A device attachable to or integrated into a firearm, the device comprising:

a plurality of sensors, each configured to sense a respective attribute of the firearm or of an environment surrounding the firearm, and further configured to provide corresponding signals based on sensing the respective attribute;

at least one processor; and memory comprising computer instructions, the computer instructions configured to, when executed by the at least one processor, cause the at least one processor to determine an event from among a plurality of events based on the corresponding signals provided by the plurality of sensors, wherein the computer instructions are further configured to cause the at least one processor to send a notification indicating a possible injury of a user of the firearm based on a first signal from among the corresponding signals that corresponds to sound in the environment of the firearm, and based on a second signal from among the corresponding signals that corresponds to movement of the firearm.

6. A device attachable to or integrated into a firearm, the device comprising:

a plurality of sensors, each configured to sense a respective attribute of the firearm or of an environment surrounding the firearm, and further configured to provide corresponding signals based on sensing the respective attribute;

at least one processor; and memory comprising computer instructions, the computer instructions configured to, when executed by the at least one processor, cause the at least one processor to determine an event from among a plurality of events based on the corresponding signals provided by the plurality of sensors, wherein the computer instructions are configured to cause the at least one processor to determine the event as being that the firearm was pointed at a target based on a plurality of first signals from among the corresponding signals that each indicate movement of the firearm with respect to a respective axis, and wherein the computer instructions are configured to cause the at least one processor to further determine the event as being that the firearm was pointed at the target based on identifying spoken language of a user of the firearm from a sound pattern that is included in a second signal from among the corresponding signals that corresponds to sound in the environment of the firearm.

7. A device attachable to or integrated into a firearm, the device comprising:

a plurality of sensors, each configured to sense a respective attribute of the firearm or of an environment surrounding the firearm, and further configured to provide corresponding signals based on sensing the respective attribute;

at least one processor; and memory comprising computer instructions, the computer instructions configured to, when executed by the at least one processor, cause the at least one processor to determine an event from among a plurality of events based on the corresponding signals provided by the plurality of sensors, wherein the computer instructions are configured to cause the at least one processor to determine the event as being that a round has been manually ejected from the firearm based on a first signal from among the corresponding signals indicating an ammunition level in a magazine of the firearm, and a second signal from among the corresponding signals indicating movement of the firearm.

8. An event detection system comprising:

a first user system comprising a first device attachable to or integrated into a first firearm, the first device comprising:

a plurality of first sensors, each configured to sense a respective first attribute of the first firearm or of an environment surrounding the first firearm, and further configured to provide corresponding first signals based on sensing the respective first attribute, wherein the event detection system further comprises, in the first device or in an external system that is remote from the first user system:

at least one processor; and memory comprising computer instructions, the computer instructions configured to, when executed by the at least one processor, cause the at least one processor to determine an event from among a plurality of events based on the corresponding first signals provided by the plurality of first sensors of the first device, wherein the event detection system further comprises:

a second user system comprising a second device attachable to or integrated in a second firearm, the second device comprising:

a plurality of second sensors that are each configured to sense a respective second attribute of the second firearm or of an environment surrounding the second firearm, and are further configured to provide corresponding second signals based on sensing the respective second attribute; and the external system, the external system remote from the first user system and the second user system, and the external system comprises:

the at least one processor; and the memory comprising the computer instructions, wherein the computer instructions are configured to, when executed by the at least one processor, cause the at least one processor to determine the event from among the plurality of events based on the corresponding first signals provided by the plurality of first sensors of the first device and the corresponding second signals provided by the plurality of second sensors of the second device, and wherein the computer instructions are configured to, when executed by the at least one processor, cause the at least one processor to determine the event as being that the first firearm and the second firearm are within a determined distance, with respect to each other, and are pointed at a same target based on:

a plurality of first signals from among the corresponding first signals that each indicate movement of the first firearm along a respective axis of the first firearm; and a plurality of second signals from among the corresponding second signals that each indicate movement of the second firearm along a respective axis of the second firearm;

a third signal from among the corresponding first signals indicating a global position of the first firearm; and a fourth signal from among the corresponding second signals indicating a global position of the second firearm.

9. An event detection system comprising:

a first user system comprising a first device attachable to or integrated into a first firearm, the first device comprising:

a plurality of first sensors, each configured to sense a respective first attribute of the first firearm or of an environment surrounding the first firearm, and further configured to provide corresponding first signals based on sensing the respective first attribute, wherein the event detection system further comprises, in the first device or in an external system that is remote from the first user system:

at least one processor; and memory comprising computer instructions, the computer instructions configured to, when executed by the at least one processor, cause the at least one processor to determine an event from among a plurality of events based on the corresponding first signals provided by the plurality of first sensors of the first device, wherein the event detection system further comprises:

a second user system comprising a second device attachable to or integrated in a second firearm, the second device comprising:

a plurality of second sensors that are each configured to sense a respective second attribute of the second firearm or of an environment surrounding the second firearm, and are further configured to provide corresponding second signals based on sensing the respective second attribute; and the external system, the external system remote from the first user system and the second user system, and the external system comprises:

the at least one processor; and the memory comprising the computer instructions, wherein the computer instructions are configured to, when executed by the at least one processor, cause the at least one processor to determine the event from among the plurality of events based on the corresponding first signals provided by the plurality of first sensors of the first device and the corresponding second signals provided by the plurality of second sensors of the second device, and wherein the computer instructions are configured to, when executed by the at least one processor, cause the at least one processor to determine the event as being that the first firearm and the second firearm are within a determined distance, with respect to each other, and are discharged at a same target based on:

a first signal from among the corresponding first signals indicating sound or pressure from the first firearm;

a second signal from among the corresponding first signals indicating movement of the first firearm;

a third signal from among the corresponding first signals indicating a global position of the first firearm;

a fourth signal from among the corresponding second signals indicating sound or pressure from the second firearm;

a fifth signal from among the corresponding second signals indicating movement of the second firearm; and a sixth signal from among the corresponding second signals indicating a global position of the second firearm.

* * * * *